United States Patent
Jeon et al.

(10) Patent No.: US 11,785,650 B2
(45) Date of Patent: Oct. 10, 2023

(54) RECEPTION OF SPLIT RANDOM ACCESS RESPONSE

(71) Applicant: BEIJING XIAOMI MOBILE SOFTWARE CO., LTD., Beijing (CN)

(72) Inventors: Hyoungsuk Jeon, Centreville, VA (US); Esmael Hejazi Dinan, McLean, VA (US); Hua Zhou, Vienna, VA (US); Yunjung Yi, Vienna, VA (US)

(*) Notice: Subject to any disclaimer, the term of this patent is extended or adjusted under 35 U.S.C. 154(b) by 23 days.

(21) Appl. No.: 17/565,109

(22) Filed: Dec. 29, 2021

(65) Prior Publication Data
US 2022/0201773 A1 Jun. 23, 2022

Related U.S. Application Data

(63) Continuation of application No. 16/993,636, filed on Aug. 14, 2020, now Pat. No. 11,252,765.

(60) Provisional application No. 62/887,601, filed on Aug. 15, 2019.

(51) Int. Cl.
*H04W 74/08* (2009.01)
*H04W 74/00* (2009.01)
*H04W 28/04* (2009.01)
*H04W 76/11* (2018.01)
*H04W 76/27* (2018.01)
*H04W 28/02* (2009.01)

(52) U.S. Cl.
CPC ..... *H04W 74/0858* (2013.01); *H04W 28/0205* (2013.01); *H04W 28/04* (2013.01); *H04W 74/004* (2013.01); *H04W 74/006* (2013.01); *H04W 76/11* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 10,897,708 B2* | 1/2021 | Shih | H04W 60/00 |
| 11,252,765 B2* | 2/2022 | Jeon | H04W 74/004 |
| 2016/0219626 A1* | 7/2016 | Martin | H04W 74/0833 |

(Continued)

OTHER PUBLICATIONS

3GPP TS 38.213 V15.6.0 (Jun. 2019); Technical Specification; 3rd Generation Partnership Project; Technical Specification Group Radio Access Network; NR;Physical layer procedures for control (Release 15).

(Continued)

*Primary Examiner* — Jutai Kao
(74) *Attorney, Agent, or Firm* — Arch & Lake LLP

(57) ABSTRACT

A wireless device transmit a first message comprising a first preamble and a first transport block. The first transport block comprises a contention resolution identifier of the wireless device. The wireless device receive a first random access response to the first message. The first random access response comprises the contention resolution identifier. The wireless device starts a first time window in response to receiving the first random access response. The wireless device monitor, during the first time window, a downlink channel for a second random access response to the first message. The wireless device determines a failure to receive the second random access response during the first time window. The wireless device transmits a second message comprising a second preamble in response to the failure.

20 Claims, 34 Drawing Sheets

(56) References Cited

U.S. PATENT DOCUMENTS

2021/0243809 A1* 8/2021 Uchino ............. H04W 74/0833
2021/0243818 A1* 8/2021 Lee ................... H04W 74/0833

OTHER PUBLICATIONS

3GPP TS 38.214 V15.6.0 (Jun. 2019); Technical Specification; 3rd Generation Partnership Project; Technical Specification Group Radio Access Network; NR; Physical layer procedures for data; (Release 15).

3GPP TS 38.300 V15.6.0 (Jun. 2019); Technical Specification; 3rd Generation Partnership Project; Technical Specification Group Radio Access Network; NR; NR and NG-RAN Overall Description; Stage 2; (Release 15).

3GPP TS 38.321 V15.6.0 (Jun. 2019); Technical Specification; 3rd Generation Partnership Project; Technical Specification Group Radio Access Network; NR; Medium Access Control (MAC) protocol specification; (Release 15).

3GPP TS 38.331 V15.6.0 (Jun. 2019); Technical Specification; 3rd Generation Partnership Project; Technical Specification Group Radio Access Network; NR; Radio Resource Control (RRC) protocol specification; (Release 15).

3GPP TSG RAN WG1 Meeting #97; Reno, USA, May 13-17, 2019; Title: RAN1 Chairman's Notes; 1 Opening of the Meeting (Day 1: 9.00 AM) 3.

R1 -1905990 Further discussions on 2-step RACH procedures-final; 3GPP TSG RAN WG1 Meeting #97 Reno, USA, May 13-17, 2019; ; Source:ZTE, Sanechips; Title: Further discussions on 2-step RACH procedures; Agenda Item:7.2.1.2.

R1-1906051; 3GPP TSG RAN WG1 Meeting #97; Reno, USA, May 13-May 17, 2019; Agenda Item:7.2.1.2; Source: Huawei, HiSilicon; Title:Discussion on 2-step RACH procedure.

R1-1906125; Discussion on procedure for 2-step RACH; 3GPP TSG RAN WG1 #97;Reno, USA, May 13-17, 2019; Source:vivo; Title:Discussion on 2-step RACH procedure; Agenda Item:7.2.1.2.

R1-1906193_Discussion on Procedure for Two-step RACH_final; 3GPP TSG RAN WG1 #97; Reno, USA, May 13-17, 2019; ; Source:NTT Docomo, Inc.; Title:Discussion on Procedure for Two-step RACH; Agenda Item:7.2.1.2.

R1-1906581; 3GPP TSG RAN WG1 #97; Reno, USA, May 13-17, 2019; Agenda Item:7.2.1.2; Source: OPPO; Title:On Procedure for 2-step RACH.

R1-1906582; On recognition of msgB or msg2; 3GPP TSG-RAN WG1 Meeting #97; Reno, Nevada, US, May 13-17, 2019; Agenda Item:7.2.1.2; Source: Fujitsu; Title:On recognition of msgB or msg2; Document for:Decision.

R1-1906718 LG; Discussion on Procedure for 2-step RACH_final; 3GPP TSG RAN WG1 Meeting #97; Reno, USA, May 13-17, 2019; Agenda Item:7.2.1.2; Source: LG Electronics; Title: Discussion on Procedure for 2-step RACH; Document for:Discussion and Decision.

R1-1906747 On 2-Step RACH Procedure; 3GPP TSG RAN WG1 #97; Reno, USA, May 13-17, 2019; Agenda Item:7.2.1.2; Source: Nokia, Nokia Shanghai Bell; Title: On 2-step RACH Procedure.

* cited by examiner

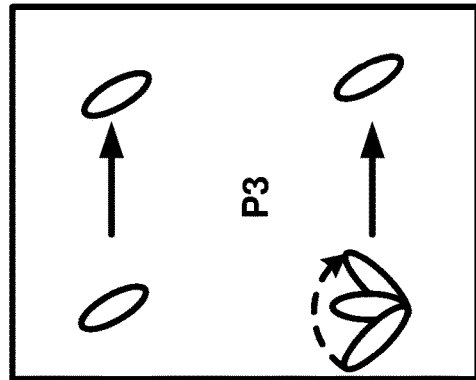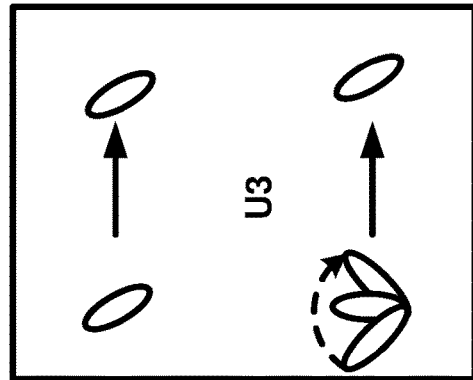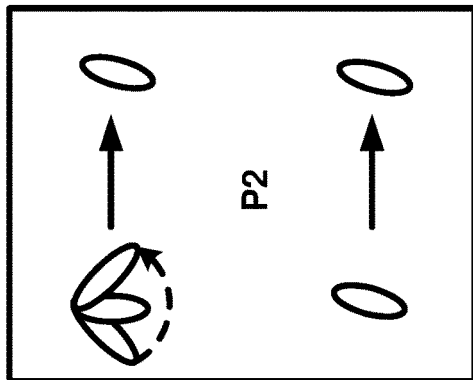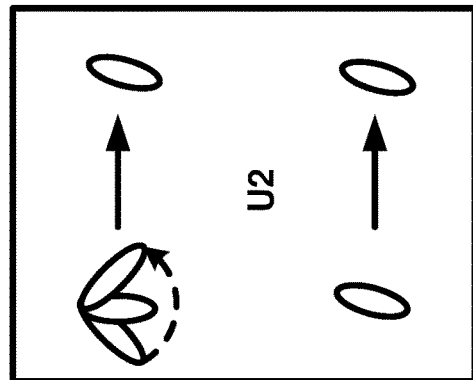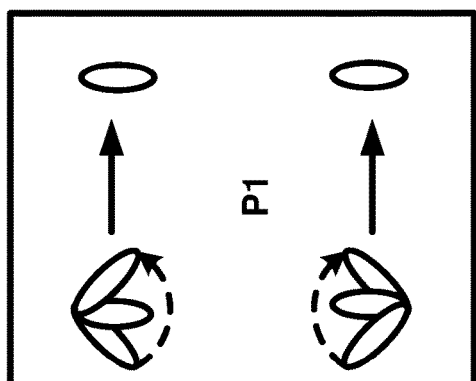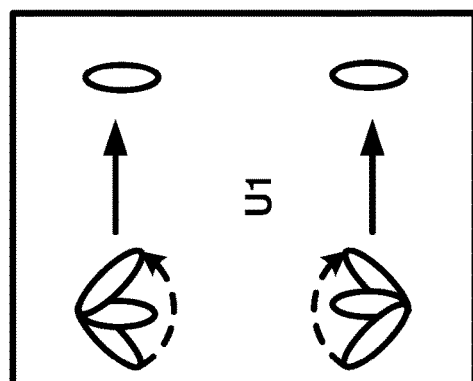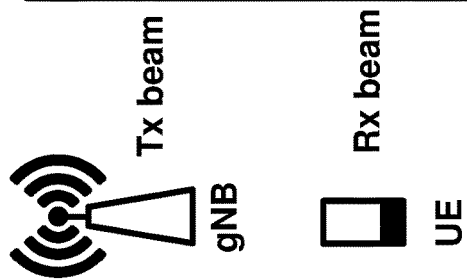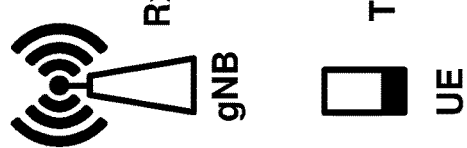
FIG. 12A
FIG. 12B

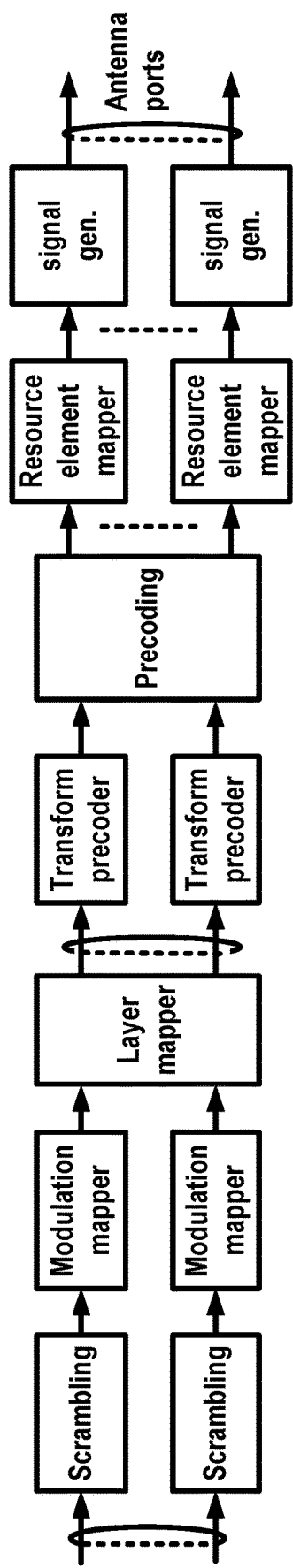
FIG. 16A
FIG. 16B
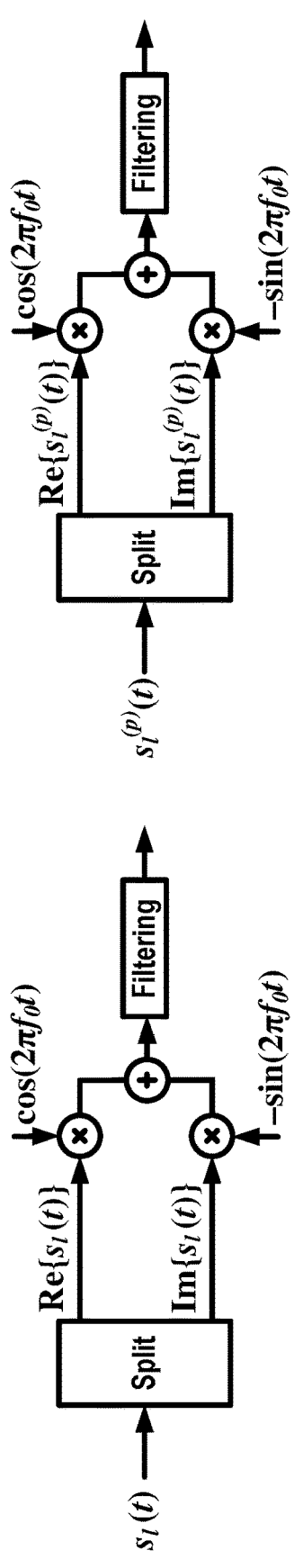
FIG. 16D
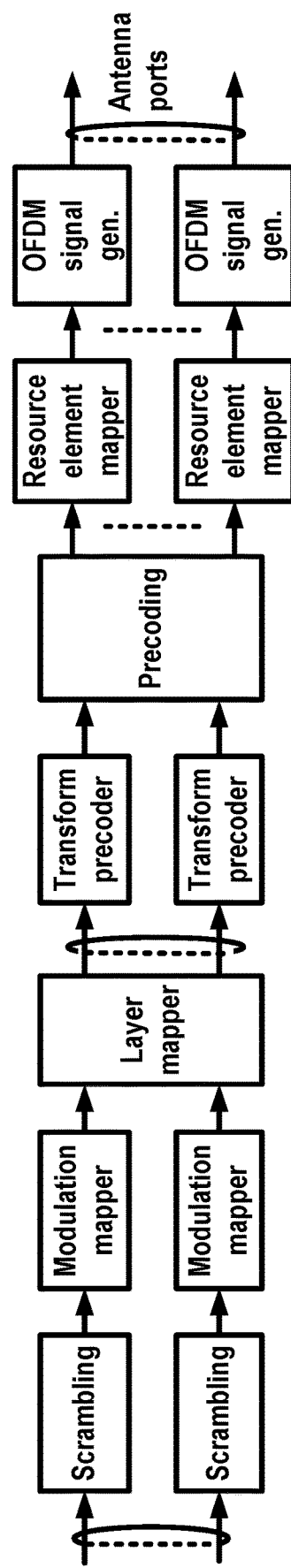
FIG. 16C

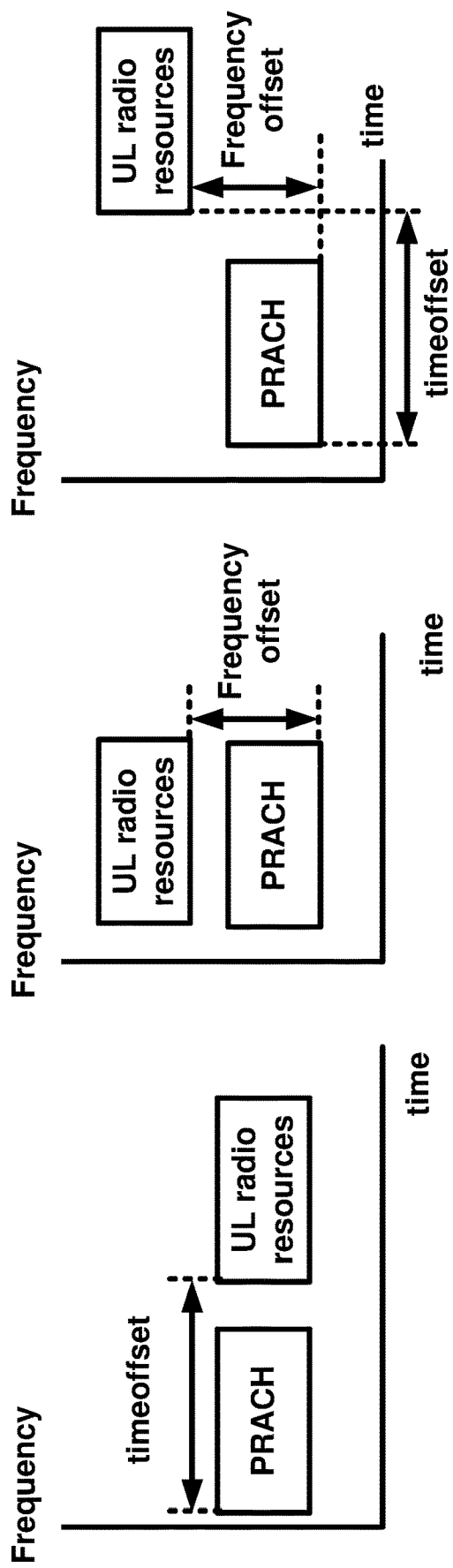

PRACH Mask index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

| | | | | | |
|---|---|---|---|---|---|
| R | UE contention resolution identity | UE contention resolution identity | UE contention resolution identity | UE contention resolution identity | UE contention resolution identity |
| Oct 1 | Oct 2 | Oct 3 | Oct 4 | Oct 5 | Oct 6 |

FIG. 22A

| | | | | | | | |
|---|---|---|---|---|---|---|---|
| R | Temporary C-RNTI | Temporary C-RNTI | TC-RNTI / UE contention resolution identity | UE contention resolution identity | UE contention resolution identity | UE contention resolution identity | UE contention resolution identity |
| Oct 1 | Oct 2 | Oct 3 | Oct 4 | Oct 5 | Oct 6 | Oct 7 | Oct 8 |

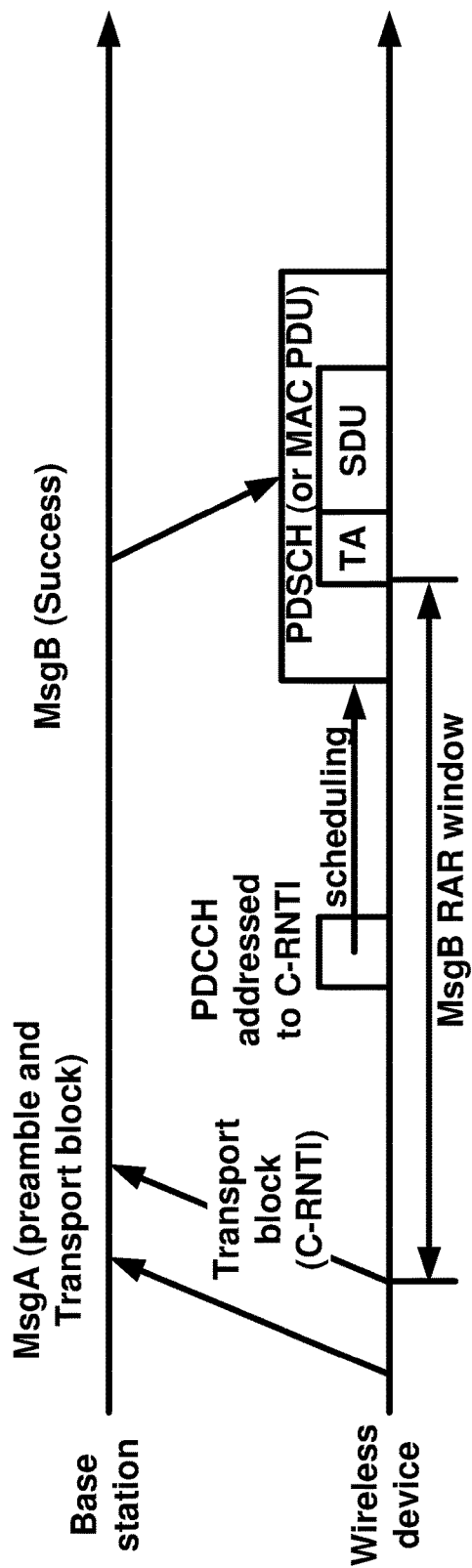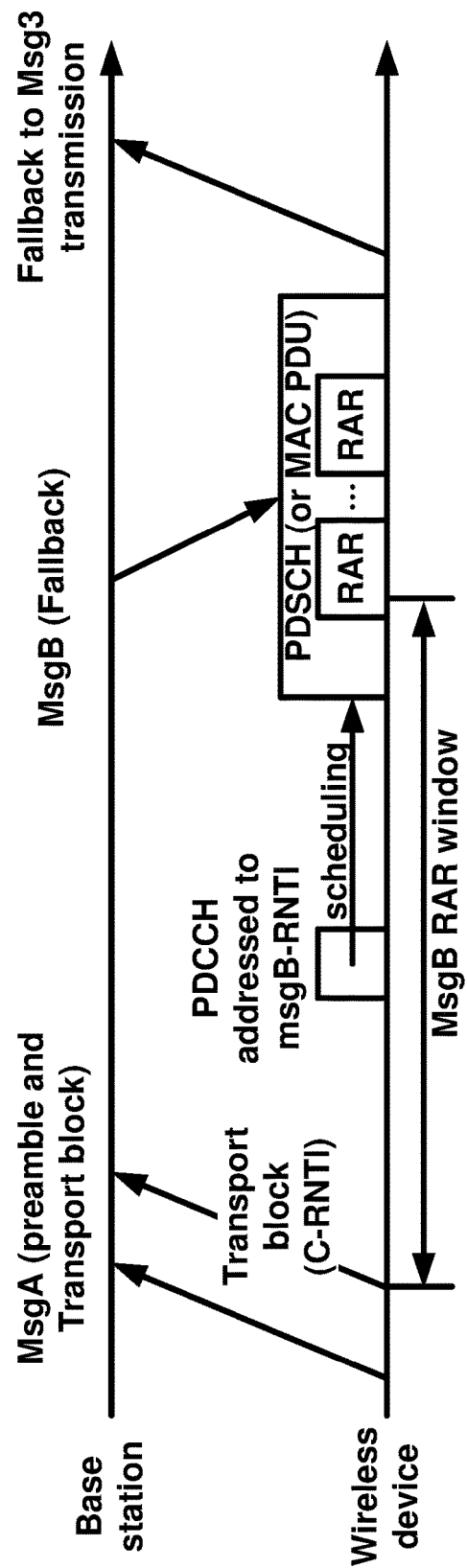
FIG. 24A
FIG. 24B

RECEPTION OF SPLIT RANDOM ACCESS RESPONSE

CROSS-REFERENCE TO RELATED APPLICATIONS

This application is a continuation of U.S. application Ser. No. 16/993,636, filed Aug. 14, 2020, which claims the benefit of U.S. Provisional Application No. 62/887,601, filed Aug. 15, 2019, all of which are hereby incorporated by reference in their entirety.

BRIEF DESCRIPTION OF THE DRAWINGS

Examples of several of the various embodiments of the present disclosure are described herein with reference to the drawings.

FIG. 12A illustrates an example of three downlink beam management procedures as per an aspect of an example embodiment of the present disclosure.

FIG. 12B illustrates an example of three uplink beam management procedures as per an aspect of an example embodiment of the present disclosure.

FIG. 16A illustrates an example structure for uplink and downlink transmission as per an aspect of an example embodiment of the present disclosure.

FIG. 16B illustrates an example structure for uplink and downlink transmission as per an aspect of an example embodiment of the present disclosure.

FIG. 16C illustrates an example structure for uplink and downlink transmission as per an aspect of an example embodiment of the present disclosure.

FIG. 16D illustrate an example structure for uplink and downlink transmission as per an aspect of an example embodiment of the present disclosure.

FIG. 17A is an example of a PRACH occasion TDMed with a UL radio resources as per an aspect of an example embodiment of the present disclosure.

FIG. 17B is an example of a PRACH occasion FDMed with a UL radio resources as per an aspect of an example embodiment of the present disclosure.

FIG. 17C is an example of a PRACH occasion TDMed and FDMed with a UL radio resources as per an aspect of an example embodiment of the present disclosure.

FIG. 18 shows an example of ra-ssb-OccasionMaskIndex values as per an aspect of an example embodiment of the present disclosure.

FIG. 22A is an example RAR format as per an aspect of an example embodiment of the present disclosure.

FIG. 22B is an example RAR format as per an aspect of an example embodiment of the present disclosure.

FIG. 24A is example diagram of a two-step RA procedure as per an aspect of an example embodiment of the present disclosure.

FIG. 24B is example diagram of a two-step RA procedure as per an aspect of an example embodiment of the present disclosure.

DETAILED DESCRIPTION

Figure 1A:
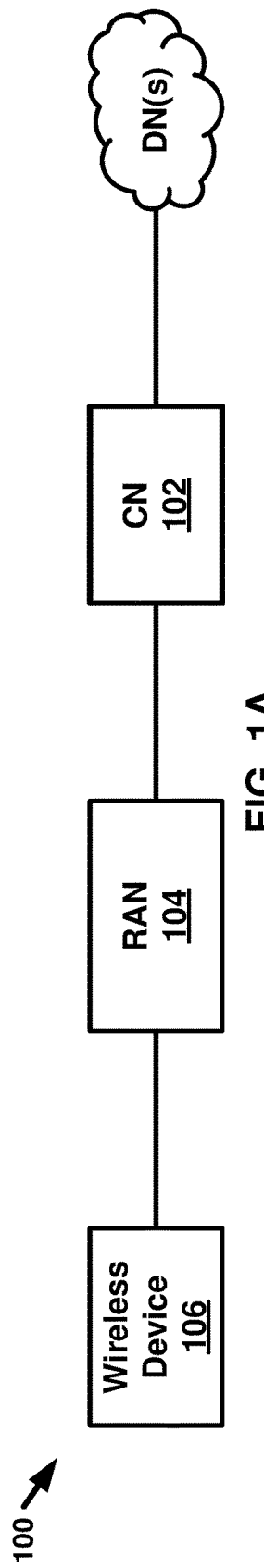
FIG. 1A and FIG. 1B illustrate example mobile communication networks in which embodiments of the present disclosure may be implemented as per an aspect of an example embodiment of the present disclosure.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
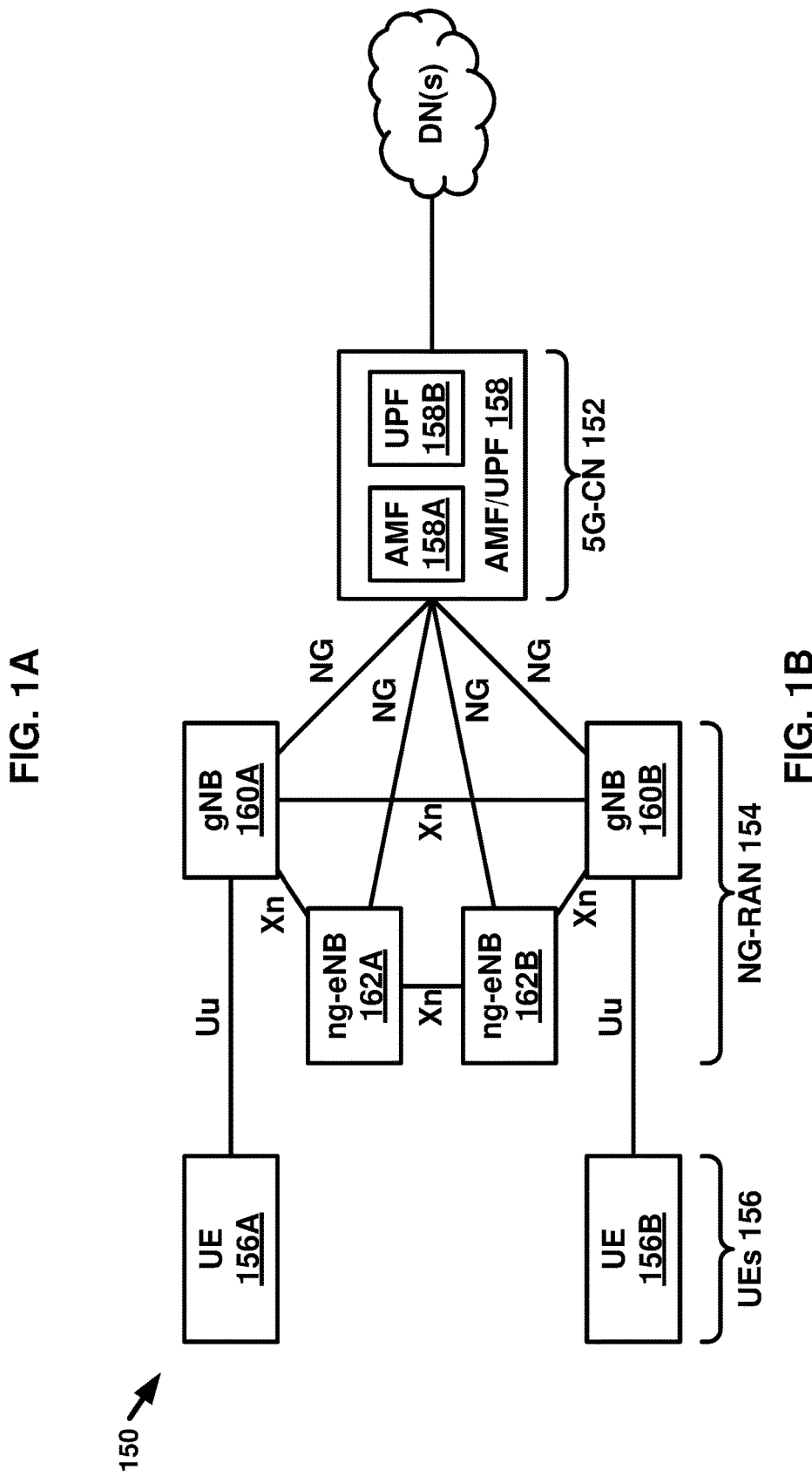

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
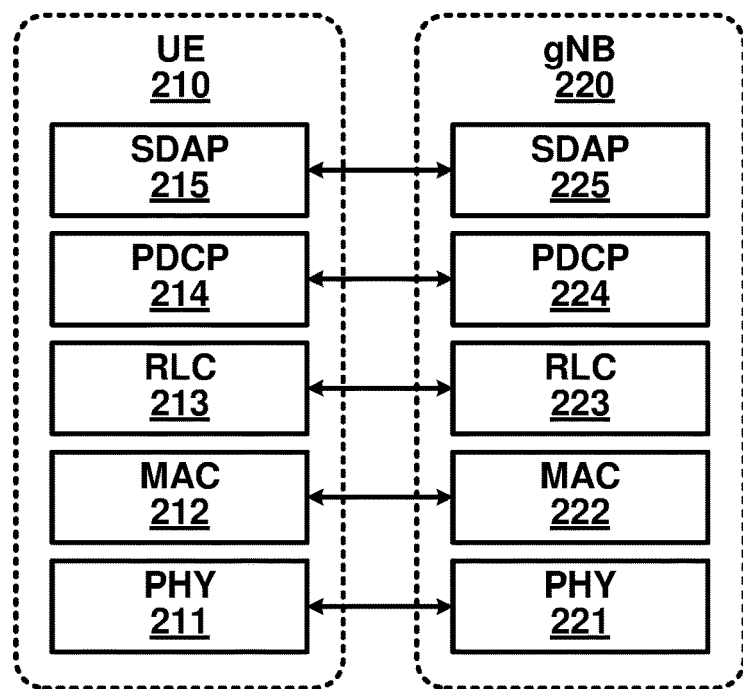
FIG. 2A and FIG. 2B respectively illustrate a New Radio (NR) user plane and control plane protocol stack as per an aspect of an example embodiment of the present disclosure.
Figure 2B:
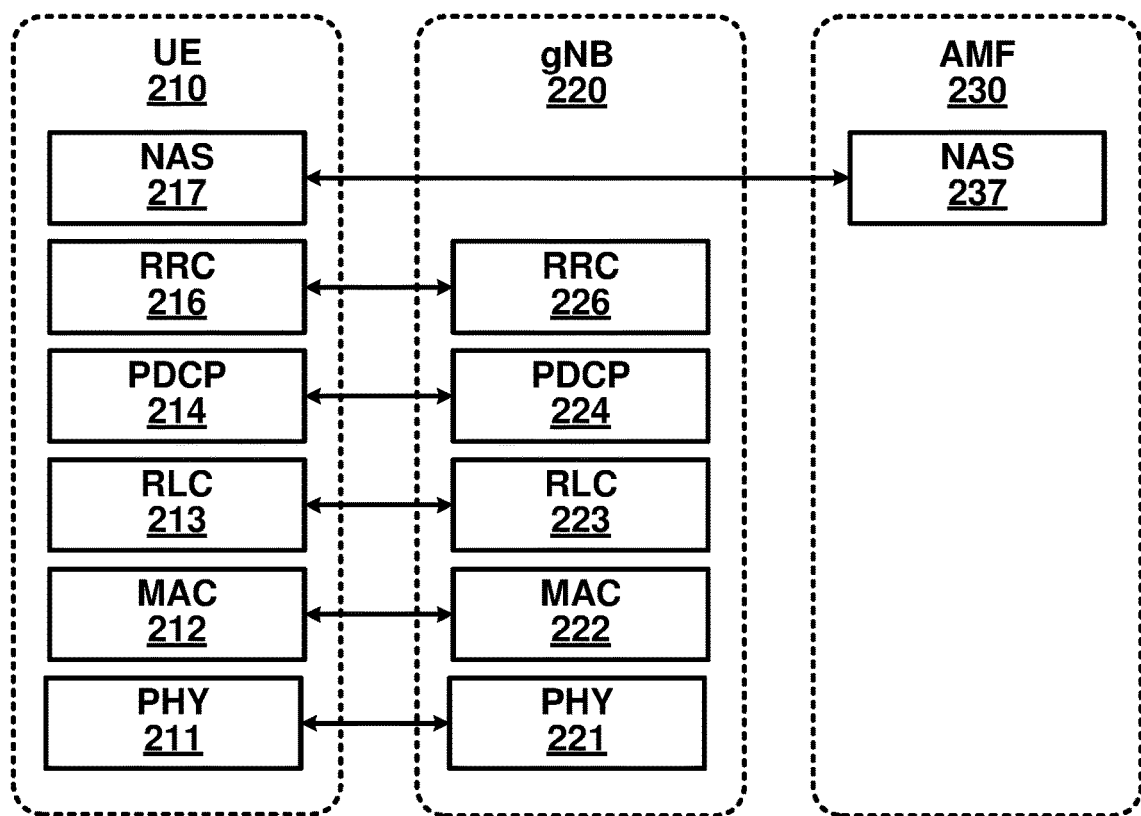

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
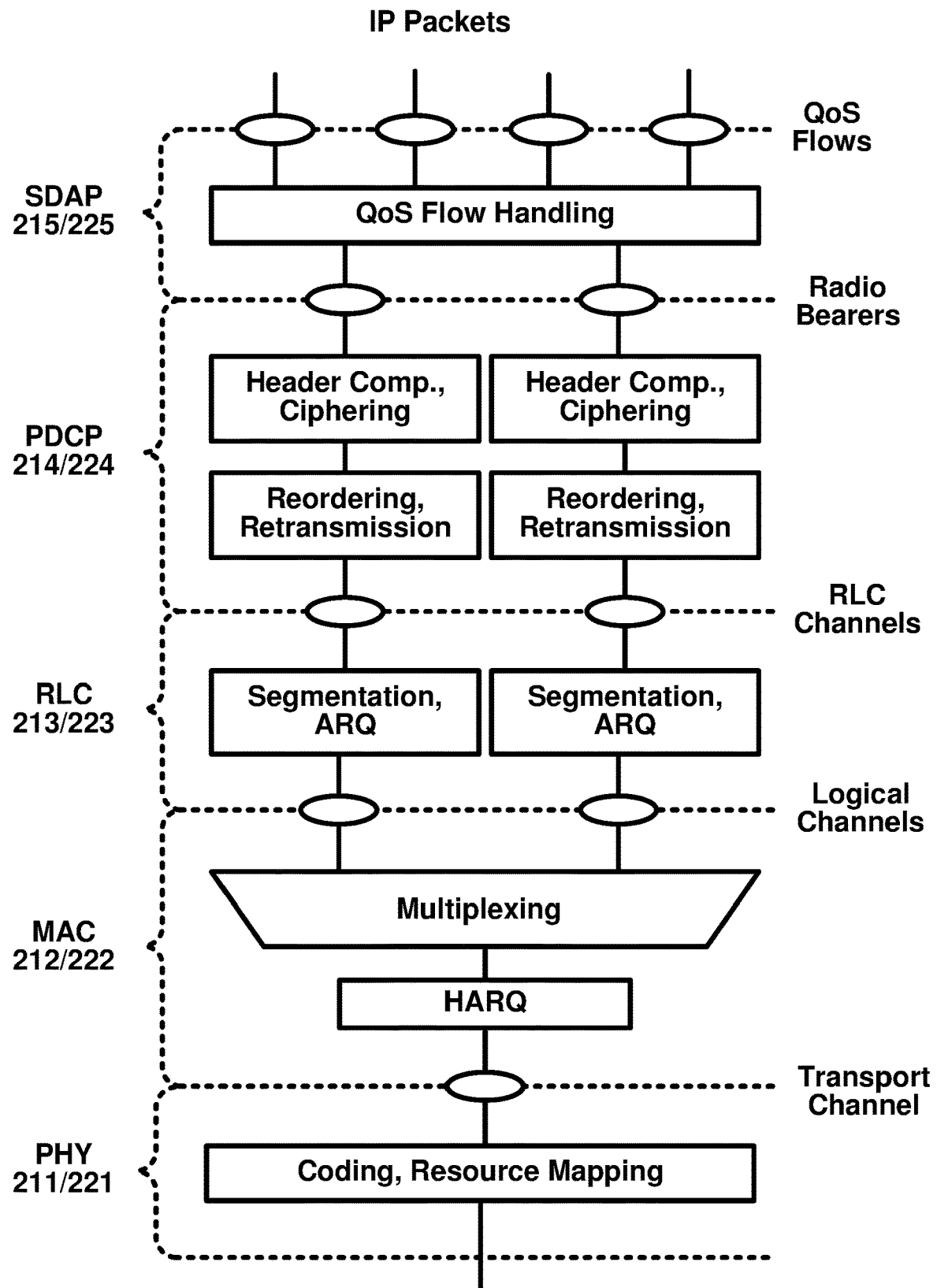
FIG. 3 illustrates an example of services provided between protocol layers of the NR user plane protocol stack of FIG. 2A as per an aspect of an example embodiment of the present disclosure.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
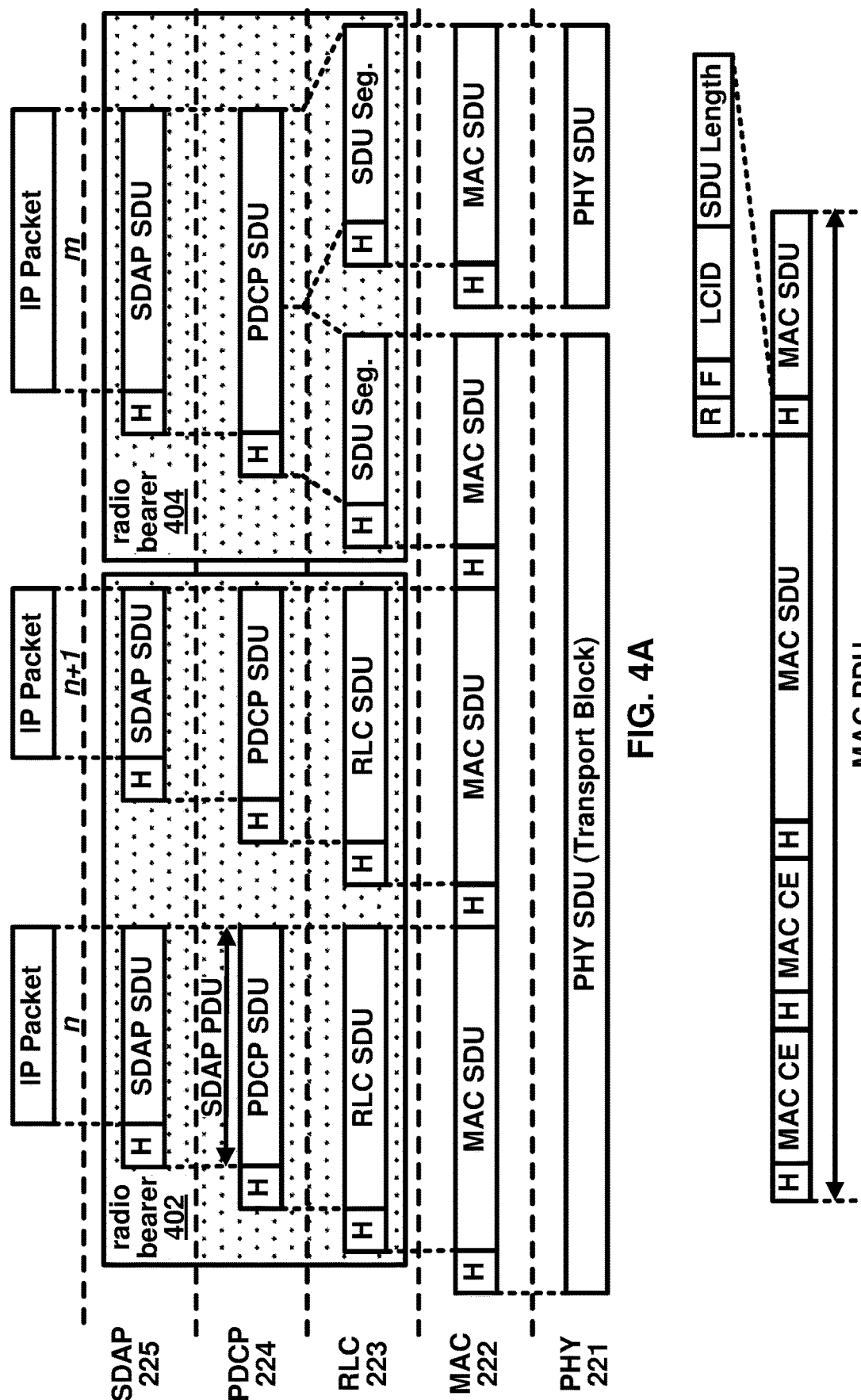
FIG. 4A illustrates an example downlink data flow through the NR user plane protocol stack of FIG. 2A as per an aspect of an example embodiment of the present disclosure.
FIG. 4B illustrates an example format of a MAC subheader in a MAC PDU as per an aspect of an example embodiment of the present disclosure.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
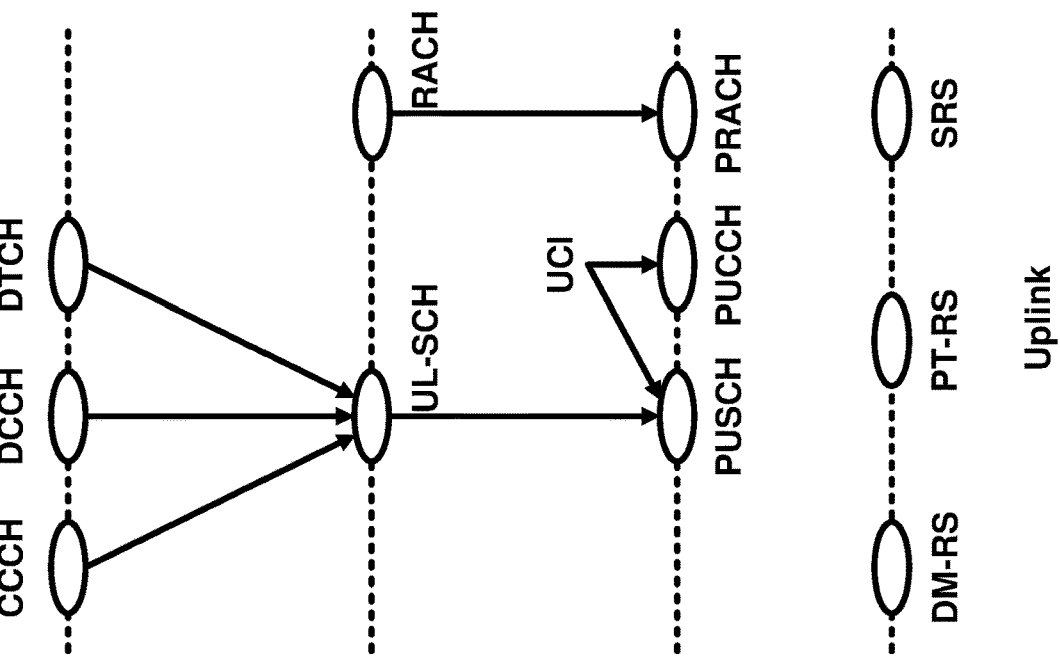
FIG. 5B illustrates a mapping between logical channels, transport channels, and physical channels for the uplink as per an aspect of an example embodiment of the present disclosure.
Figure 5A:
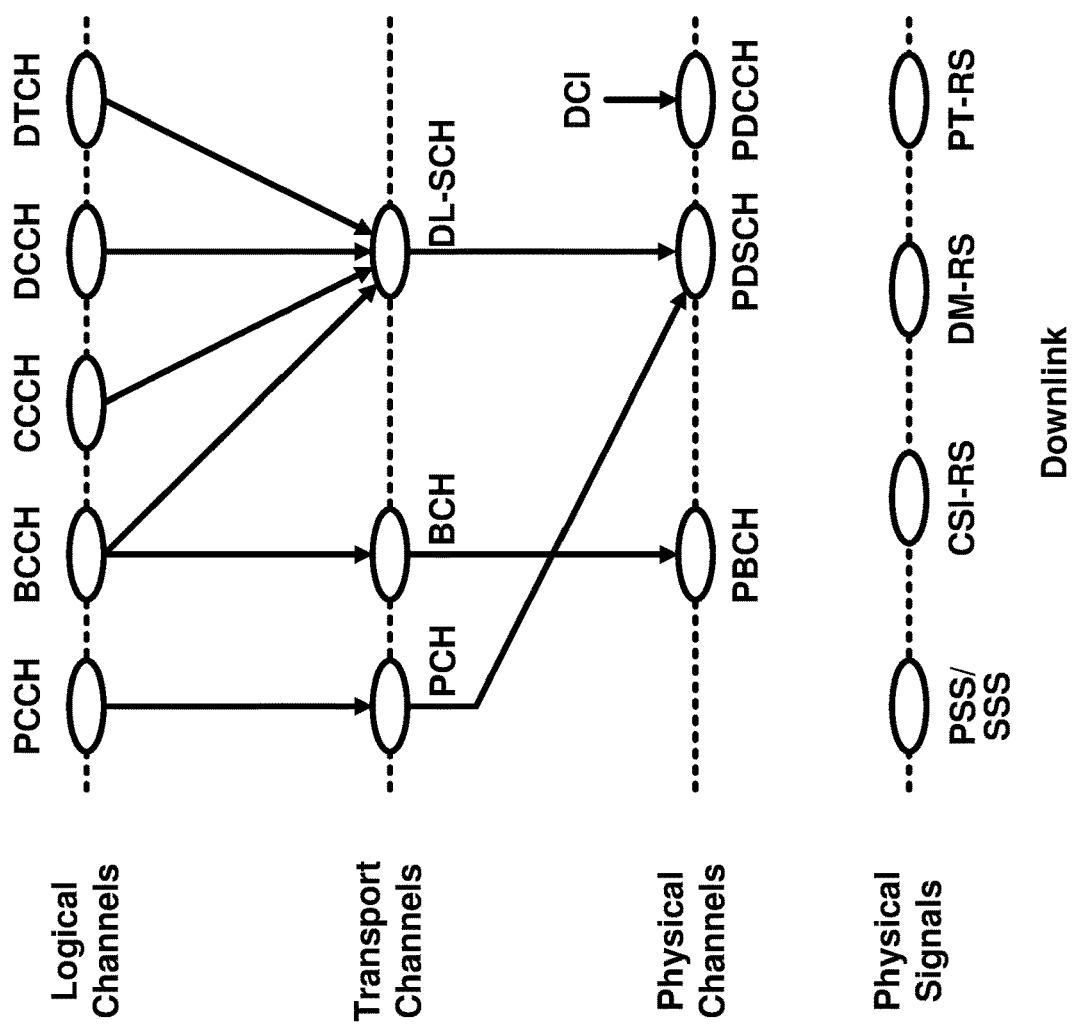
FIG. 5A illustrates a mapping between logical channels, transport channels, and physical channels for the downlink as per an aspect of an example embodiment of the present disclosure.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
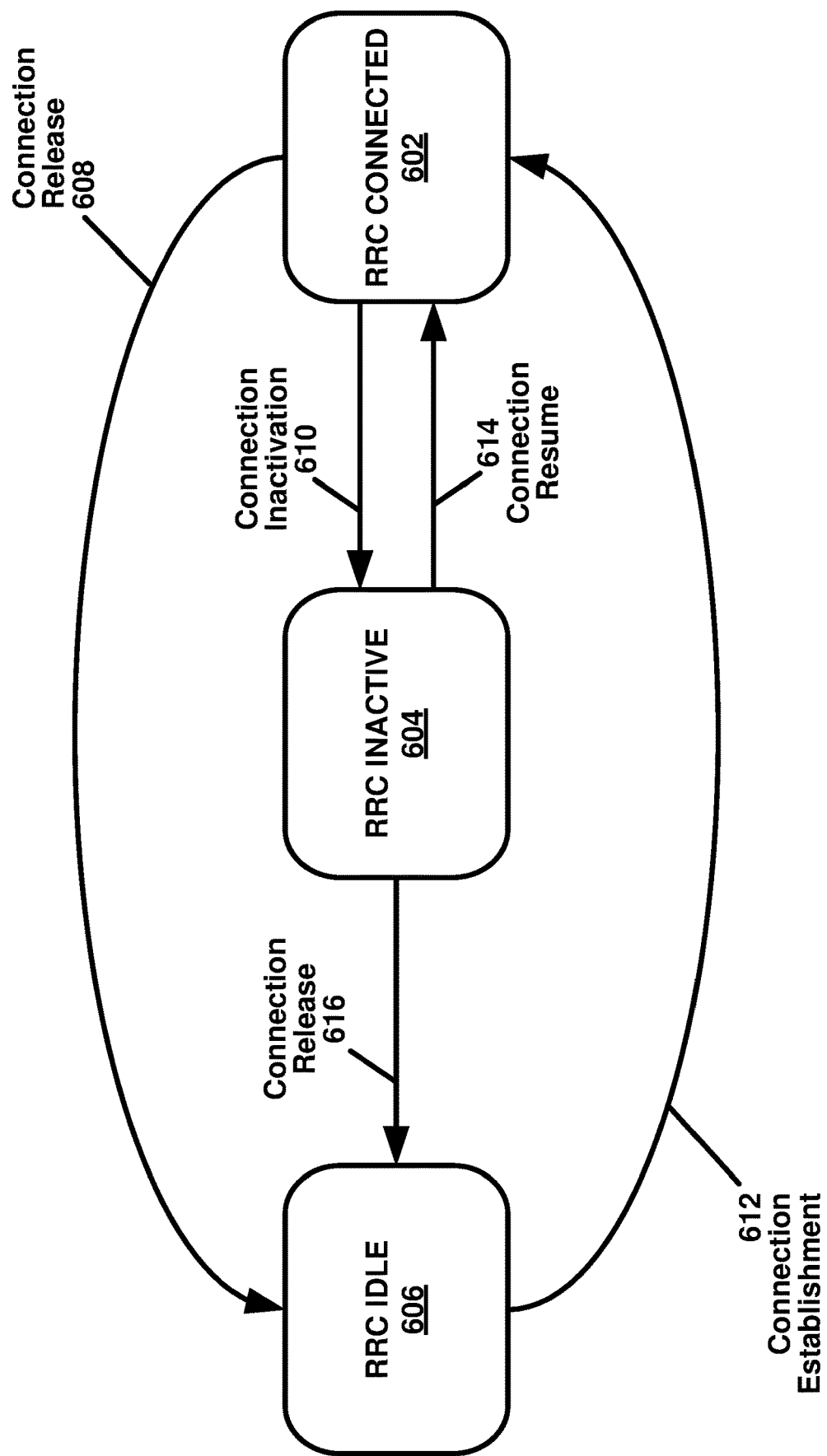
FIG. 6 is an example diagram showing RRC state transitions of a UE as per an aspect of an example embodiment of the present disclosure.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
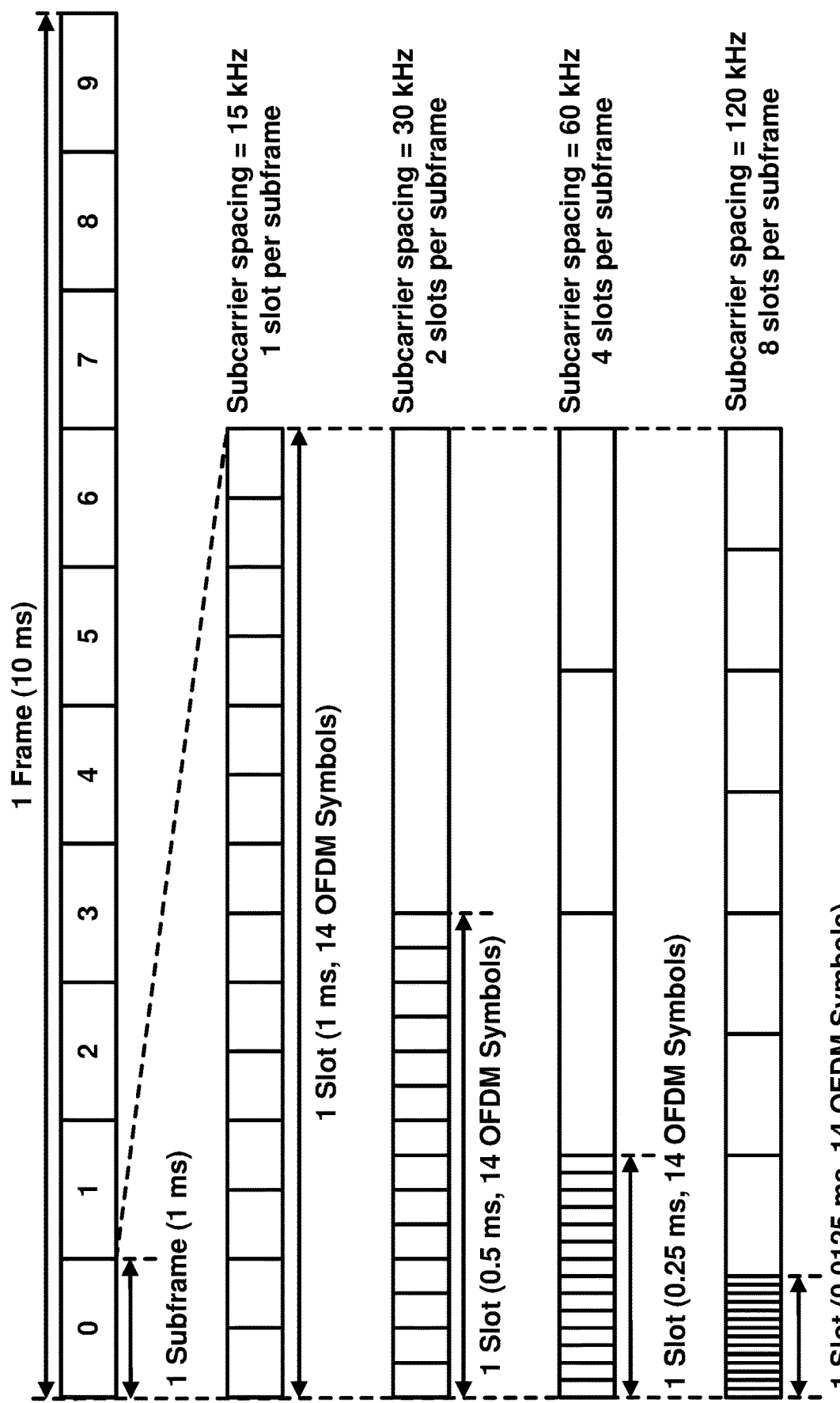
FIG. 7 illustrates an example configuration of an NR frame into which OFDM symbols are grouped as per an aspect of an example embodiment of the present disclosure.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
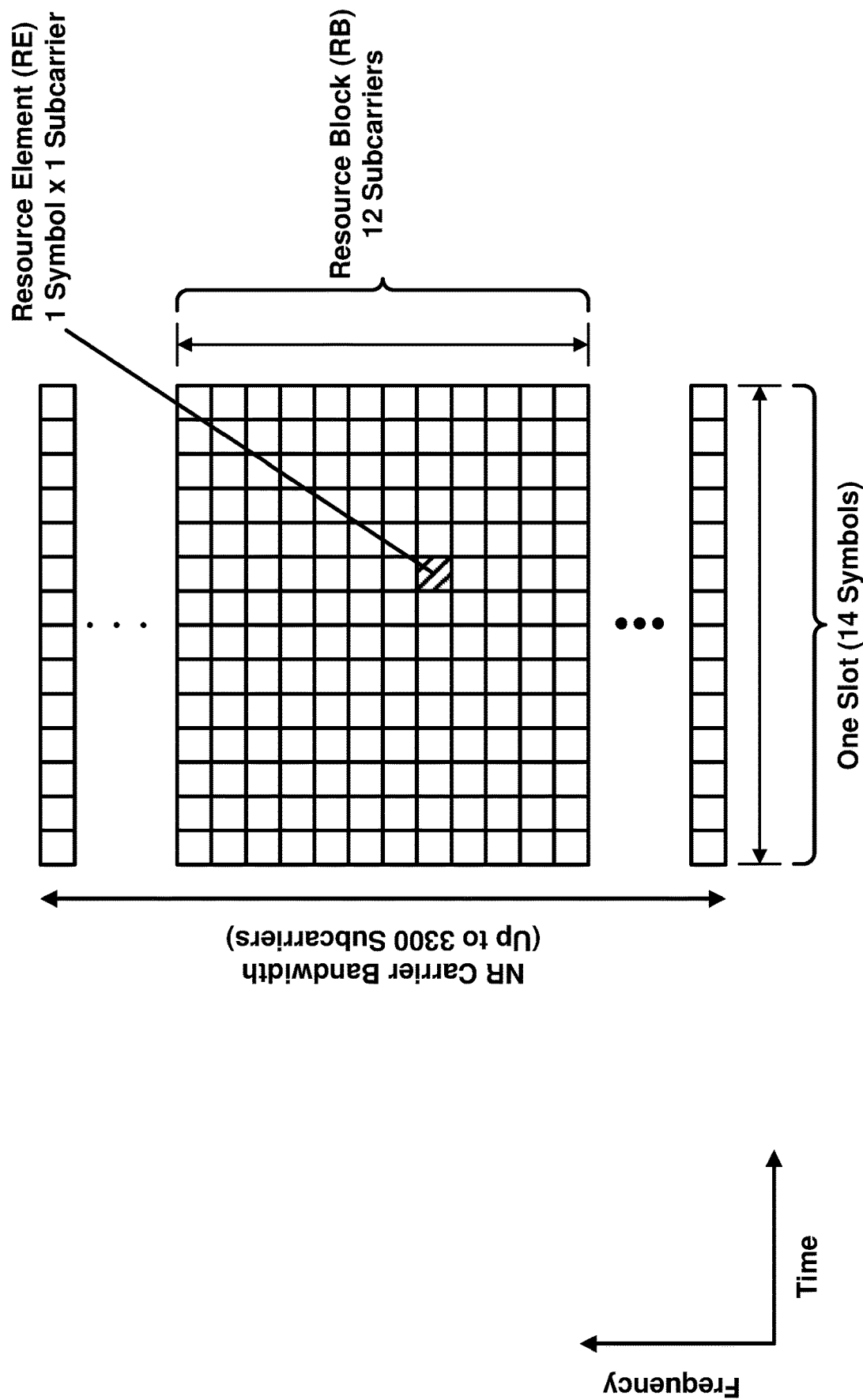
FIG. 8 illustrates an example configuration of a slot in the time and frequency domain for an NR carrier as per an aspect of an example embodiment of the present disclosure.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
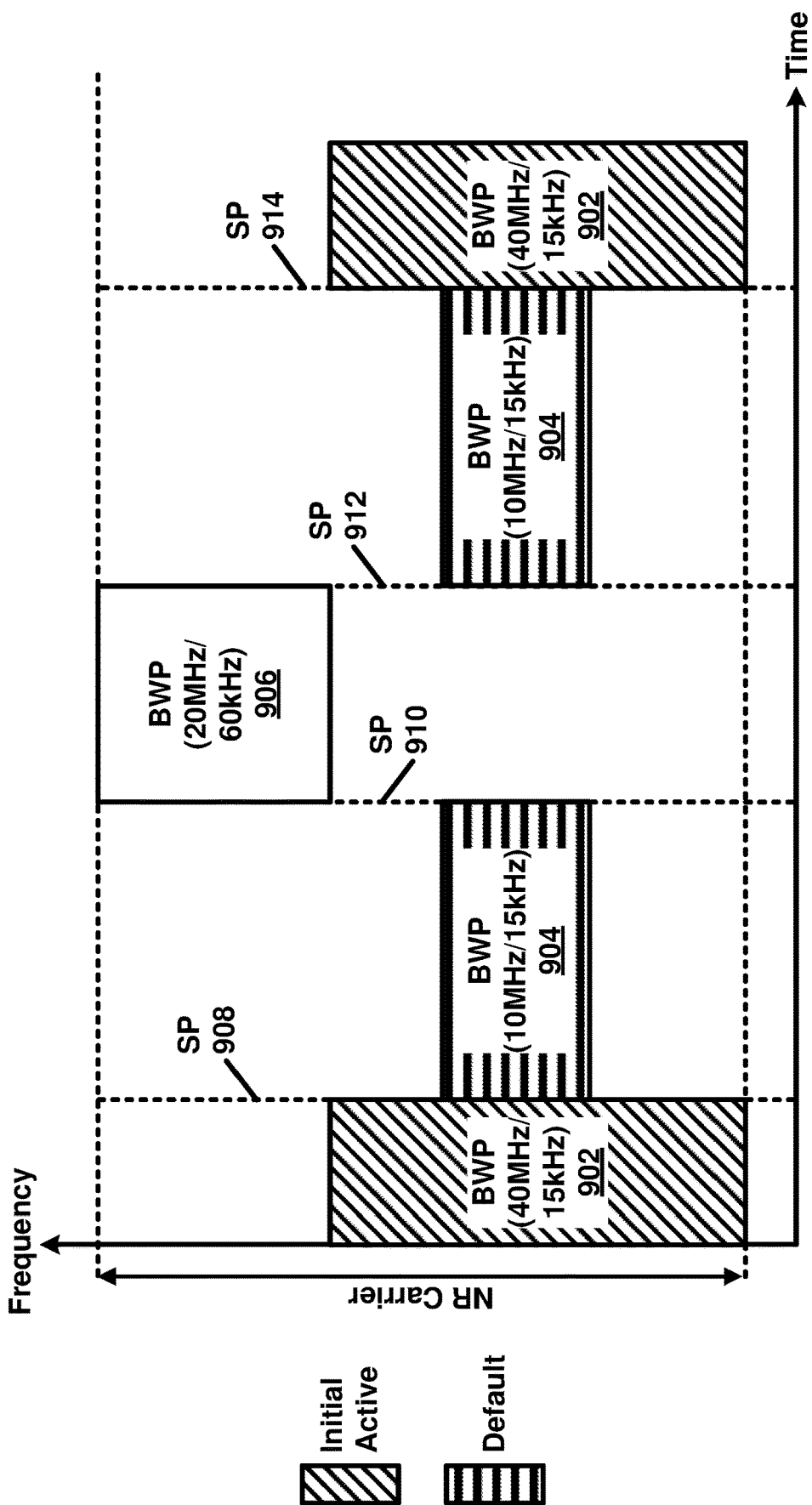
FIG. 9 illustrates an example of bandwidth adaptation using three configured BWPs for an NR carrier as per an aspect of an example embodiment of the present disclosure.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
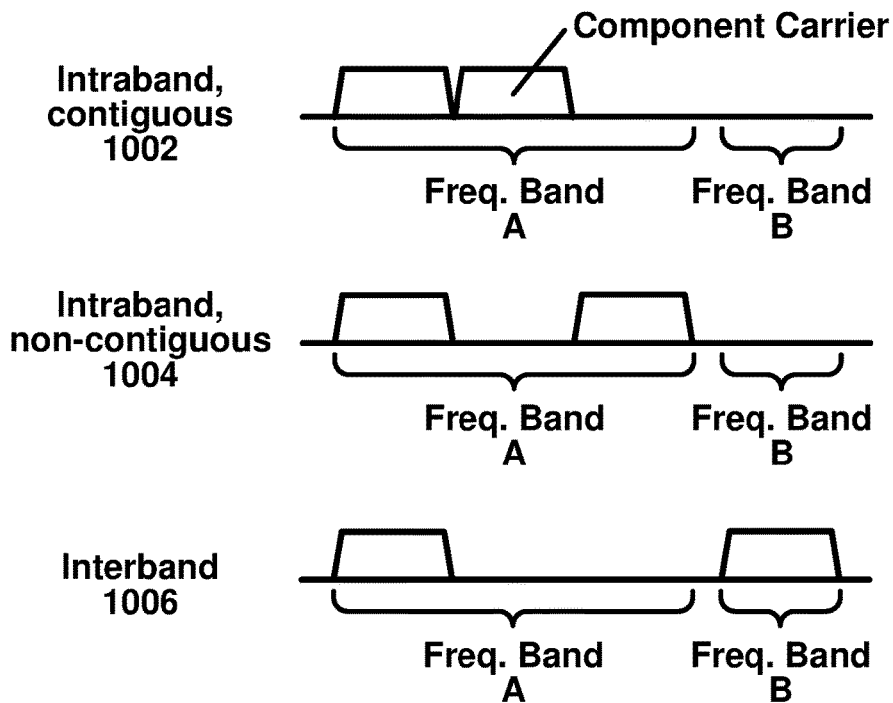
FIG. 10A illustrates three carrier aggregation configurations with two component carriers as per an aspect of an example embodiment of the present disclosure.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
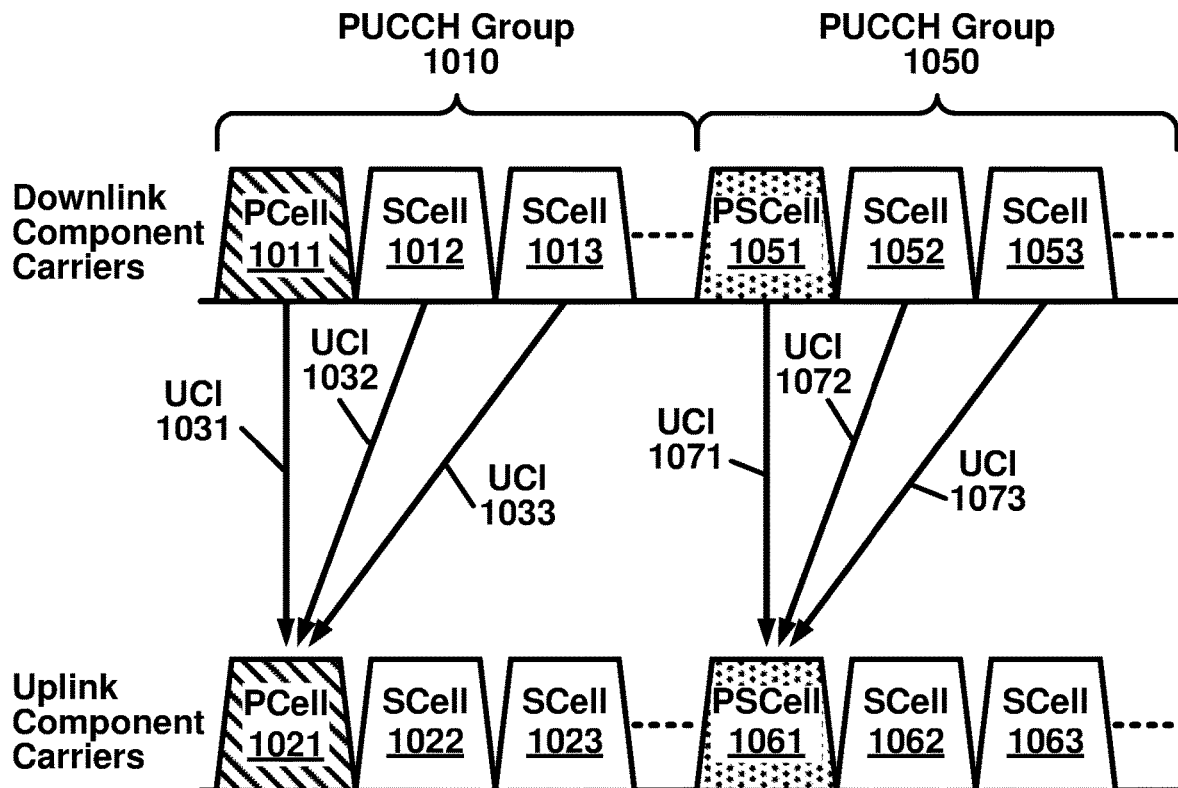
FIG. 10B illustrates an example of how aggregated cells may be configured into one or more PUCCH groups as per an aspect of an example embodiment of the present disclosure.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
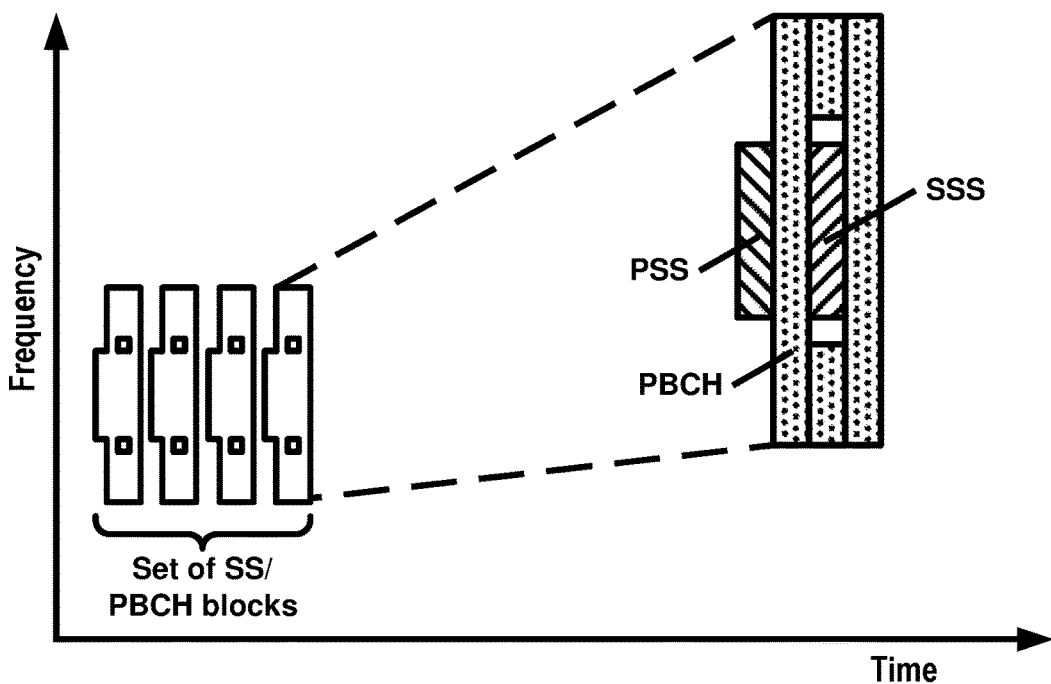
FIG. 11A illustrates an example of an SS/PBCH block structure and location as per an aspect of an example embodiment of the present disclosure.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
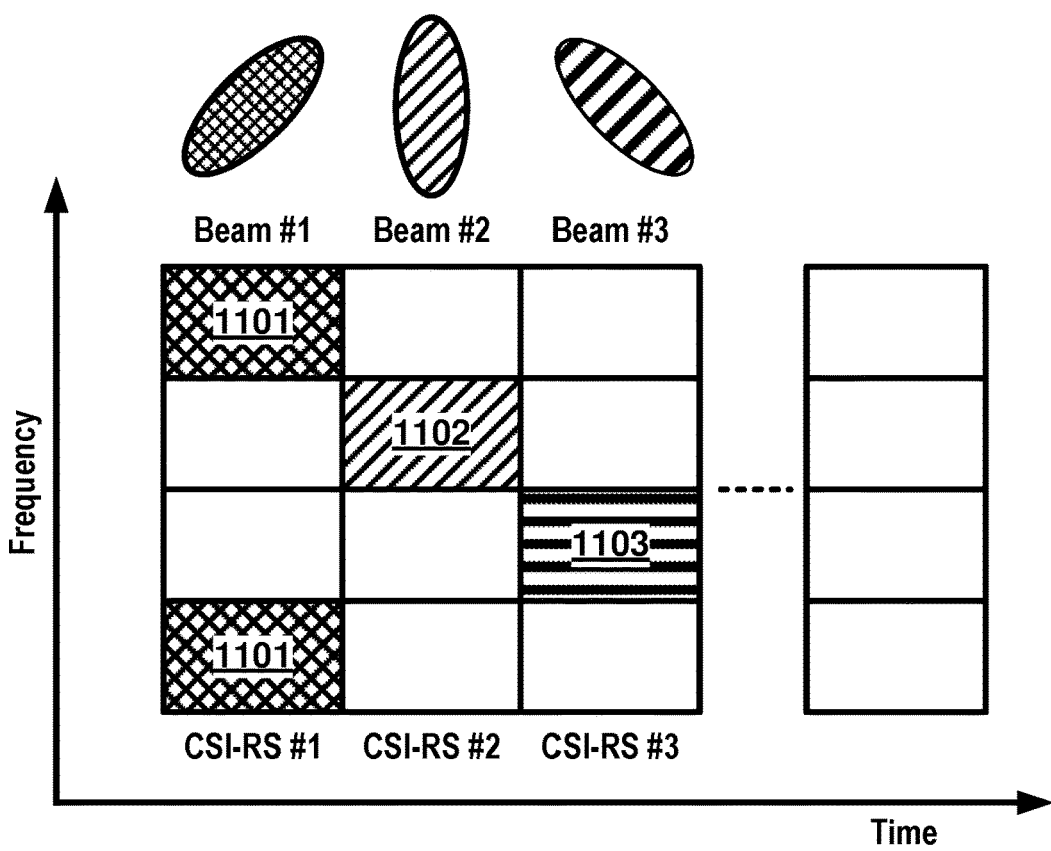
FIG. 11B illustrates an example of CSI-RSs that are mapped in the time and frequency domains as per an aspect of an example embodiment of the present disclosure.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
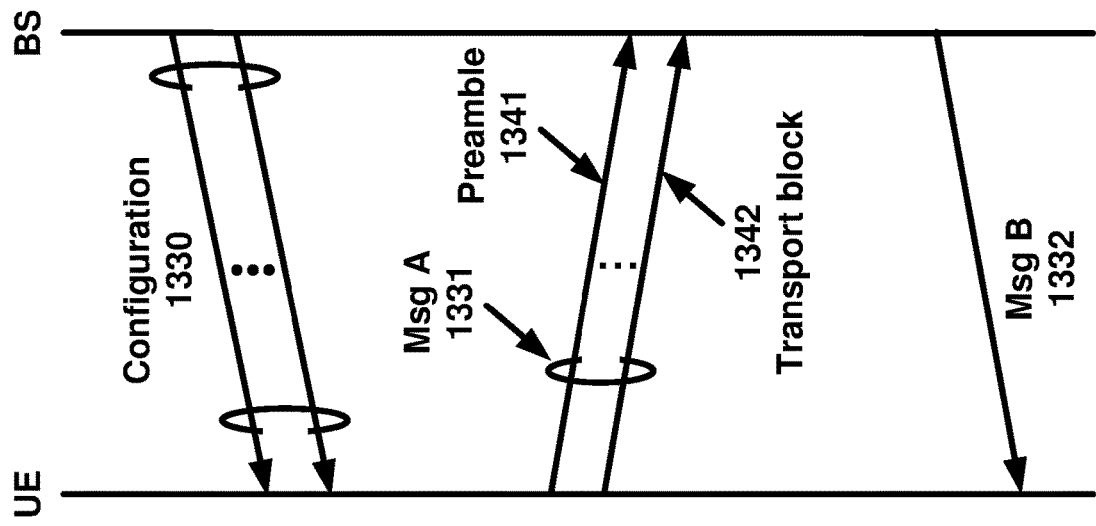
FIG. 13C illustrates another two-step random access procedure as per an aspect of an example embodiment of the present disclosure.
Figure 13B:
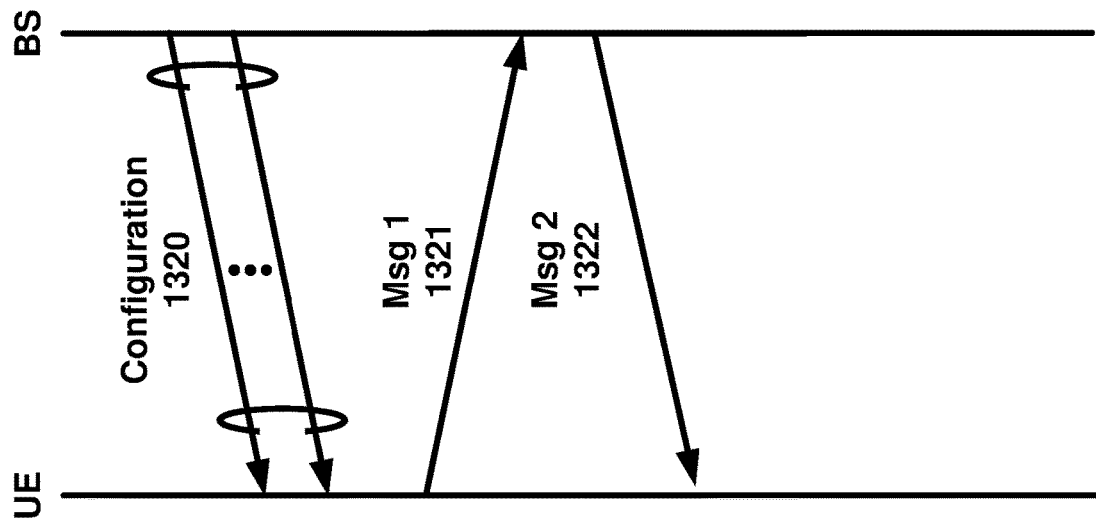
FIG. 13B illustrates a two-step contention-free random access procedure as per an aspect of an example embodiment of the present disclosure.
Figure 13A:
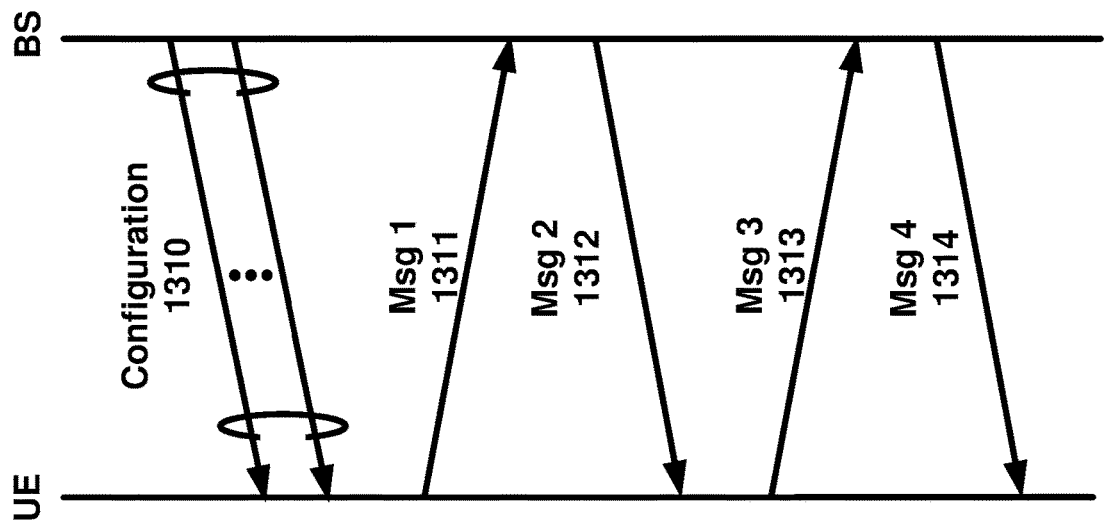
FIG. 13A illustrates a four-step contention-based random access procedure as per an aspect of an example embodiment of the present disclosure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
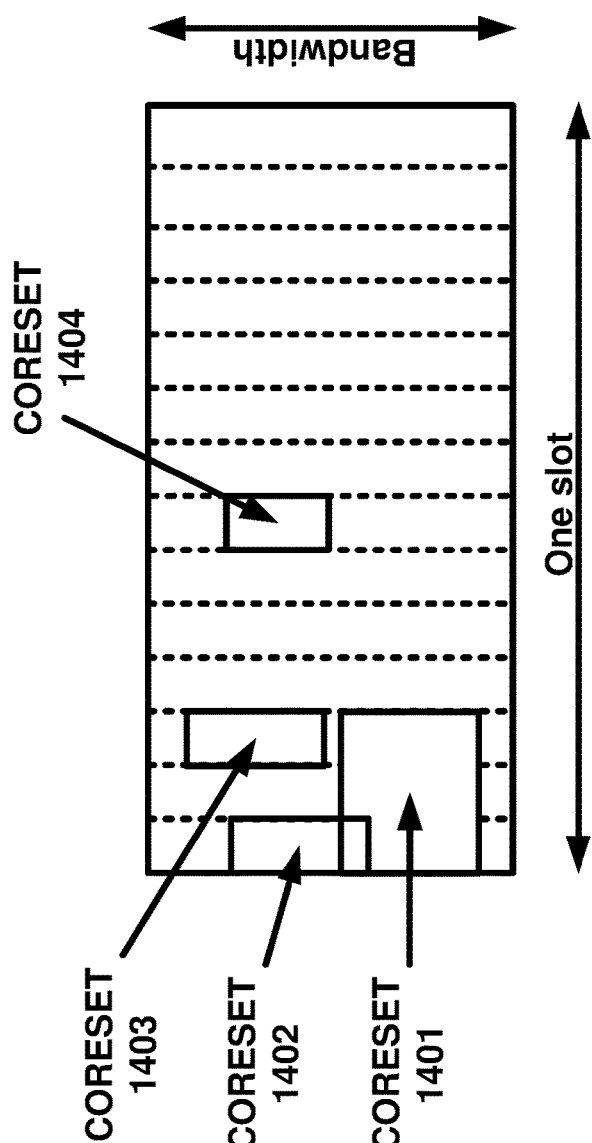
FIG. 14A illustrates an example of CORESET configurations for a bandwidth part as per an aspect of an example embodiment of the present disclosure.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
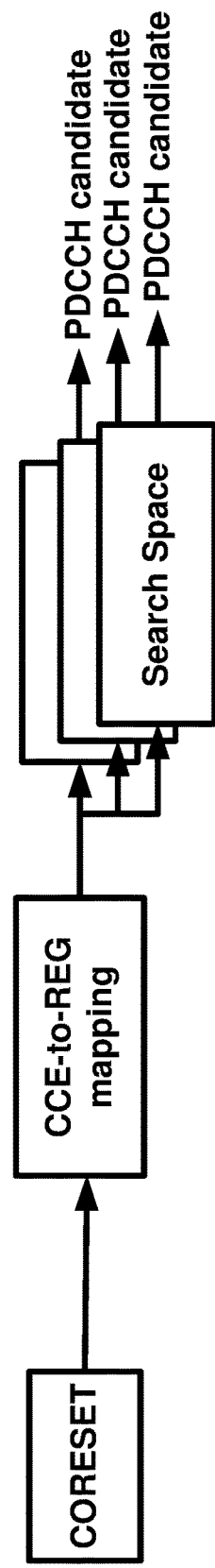
FIG. 14B illustrates an example of a CCE-to-REG mapping for DCI transmission on a CORESET and PDCCH processing as per an aspect of an example embodiment of the present disclosure.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
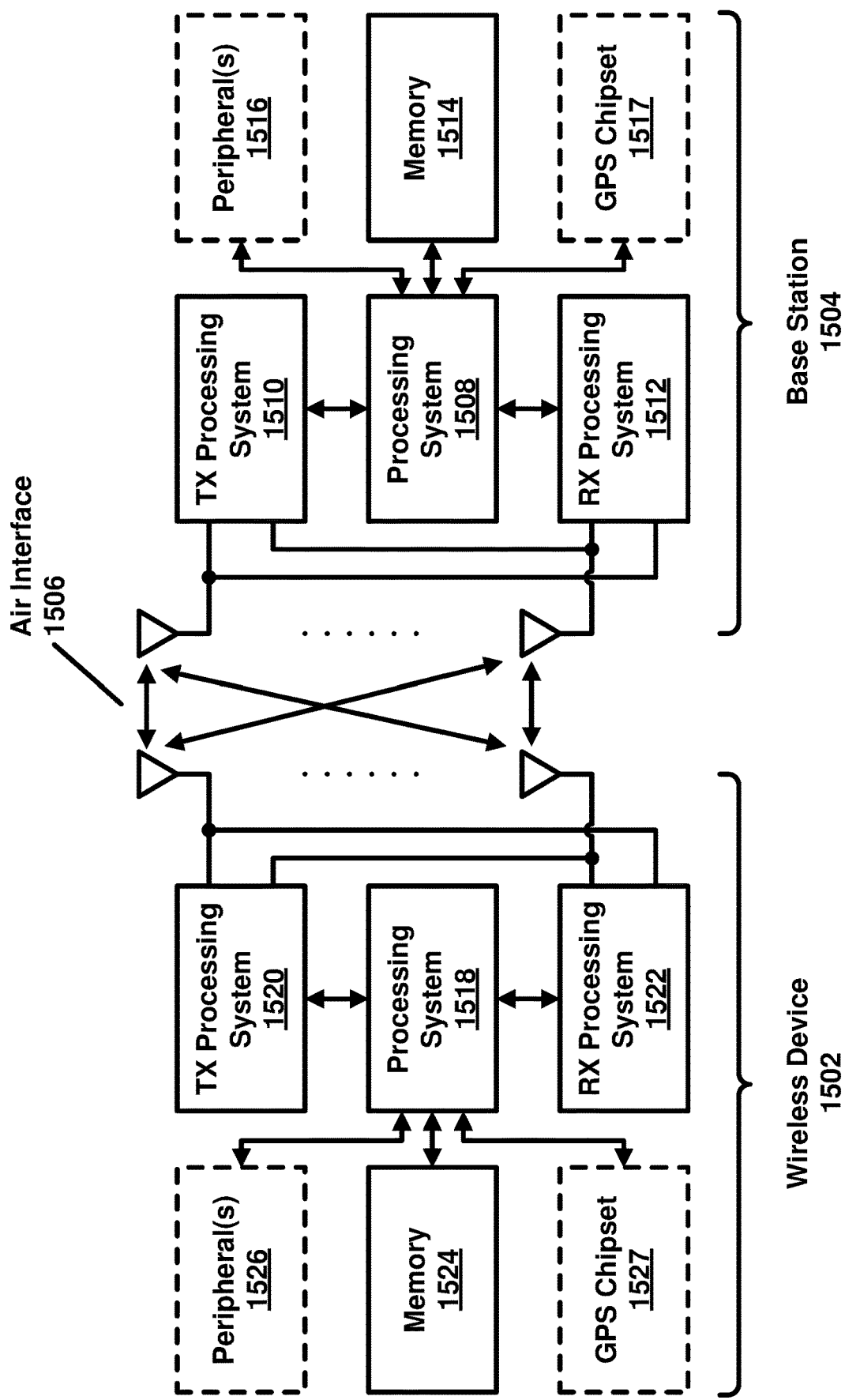
FIG. 15 illustrates an example of a wireless device in communication with a base station as per an aspect of an example embodiment of the present disclosure.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

For a two-step RA procedure, a wireless device may receive, from a base station, one or more RRC messages comprising two-step RACH configuration parameters 1330. The one or more RRC messages may broadcast (e.g., via system information broadcast messages), multicast (e.g., via system information broadcast messages), and/or unicast (e.g., via dedicated RRC messages and/or lower layer control signal(s) such as PDCCH) to a wireless device. The one or more RRC messages may be wireless device-specific messages, e.g., a dedicated RRC message transmitted to a wireless device with RRC INACTIVE 604 or RRC CONNECTED 602. The one or more RRC messages may comprise parameters required for transmitting Msg A 1331. For example, the parameter may indicate at least one of following: PRACH resource allocation, preamble format, SSB information (e.g., total number of SSBs, downlink resource allocation of SSB transmission, transmission power of SSB transmission, uplink radio resources (time-frequency radio resource, DMRS, MCS, etc.) for one or more transport block transmissions, and/or association between PRACH resource allocation and the uplink radio resources (or associations between the uplink radio resources and downlink reference signals).

In the UL transmission (e.g., Msg A 1331) of a two-step RA procedure, a wireless device may transmit, via a cell and to a base station, at least one Random Access Preamble (RAP) (e.g., Preamble 1341) and/or one or more transport blocks (e.g., Transport block 1342). For example, the one or more transport blocks may comprise one of data, security information, device information such as IMSI/TMSI, and/or other information. For example, the one or more transport blocks may comprise a wireless device identifier (ID) that may be used for a contention resolution. In the DL transmission of the two-step RA procedure, a base station may transmit Msg B 1332 (e.g., a random access response corresponding to MsgA 1331) that may comprise at least one of following: a timing advance command indicating the TA value, a power control command, an UL grant (e.g., radio resource assignment, and/or MCS), the identifier for contention resolution, an RNTI (e.g., C-RNTI or TC-RNTI), and/or other information. The Msg B 1332 may comprise a preamble identifier corresponding to the Preamble 1341, a positive or negative acknowledgement of a reception of the one or more transport blocks 1342, an implicit and/or explicit indication of a successful decoding of the one or more transport blocks 1342, an indication of fallback to a non-two step RA procedure (e.g., contention-based RA procedure in FIG. 13A or contention-free RA procedure in FIG. 13B), and/or combination thereof.

A wireless device initiating two step RA procedure may transmit Msg A comprising at least one preamble and at least one transport block. The at least one transport block may comprise an identifier that the wireless device uses for a contention resolution. For example, the identifier is a C-RNTI (e.g., for a wireless device with RRC Connected). The wireless device may indicate the C-RNTI to the base station based on a particular message format that may be predefined. For example, the at least one transport block comprises an C-RNTI MAC CE (e.g., 16 bits fields indicate the C-RNTI) with an LCID in a subheader corresponding to the C-RNTI MAC CE. For example, the LCID may be used for a base station to identify (detect, parse, and/or decode) the C-RNTI MAC CE from a received signal or message (e.g., MAC PDU) transmitted from the wireless device. The identifier may be sequence(s) and/or number(s) that the wireless device generates (e.g., for a case that C-RNTI has not been assigned, by the base station, to the wireless device yet). The wireless device may generate the identifier randomly and/or generate based on a subscriber, device information of the wireless device (e.g., IMSI/TMSI) and/or a resume identifier assigned by the base station to the wireless device. For example, the identifier may be an extended and/or truncated subscriber and/or device information of the wireless device (e.g., IMSI/TMSI). The wireless device may start to monitor a downlink control channel for Msg B corresponding to the Msg A, e.g., after or in response to transmitting the Msg A. A control resource set and/or a search space for monitoring the downlink control channel may be indicated and/or configured by message(s), e.g., broadcast RRC message and/or wireless device specific RRC message, transmitted by a base station. The Msg B may be scrambled by a particular RNTI. The wireless device may use an RNTI (e.g., C-RNTI) already assigned by the base station as the particular RNTI may be. The wireless device may determine the particular RNTI based on at least one of following: a time resource index (e.g., an index of a first OFDM symbol of and/or an index of a first slot) of PRACH occasion that the at least one preamble is transmitted, a frequency resource index of PRACH occasion that the at least one preamble is transmitted, a time resource index (e.g., an index of a first OFDM symbol of and/or an index of a first slot) PUSCH occasion that the at least one transport block is transmitted, a frequency resource index of PUSCH occasion that the at least one transport block is transmitted, an indicator (e.g., 0 or 1) of an uplink carrier where the Msg A is transmitted. The wireless device may consider (or determine) that the two step RA procedure is successfully completed based on one or more conditions. At least one of the one or more conditions may be that the Msg B comprises a preamble index (or identifier) matched to the at least one preamble that the wireless device transmits to the base station. At least one of the one or more conditions may be that the Msg B comprises and/or indicates a contention resolution identifier matched to the identifier that the wireless device transmits to the base station for the contention resolution. In an example, the wireless device may receive the Msg B indicating a retransmission of the at least one transport block. For example, the Msg B indicating a retransmission of the at least one transport block comprises an UL grant indicating uplink resource(s) used for the retransmission of the at least one transport block.

In the UL transmission of a two-step RA procedure, a wireless device may transmit, via a cell and to a base station, at least one RAP and one or more TBs. The wireless device may receive message(s) one or more configuration parameters for the UL transmission of the two-step RA procedure, e.g., at step 1330 in FIG. 13. For example, the one or more configuration parameters may indicate at least one of: PRACH occasion(s), preamble format, a number of transmitting SSBs, downlink resources of transmissions of SSB(s), transmission power of SSB transmission(s), association between each of PRACH occasion(s) and each of SSB(s), PUSCH resource(s) (in terms of time, frequency, code/sequence/signature) for one or more TB transmissions, association between each of PRACH occasion(s) and each of PUSCH resource(s), and/or power control parameters of one or more TB transmissions. The power control parameters of one or more TB transmissions may comprise at least one of following: power parameter value(s) for cell and/or UE specific power adjustments used for determining a received target power, a scaling factor (e.g., inter-cell interference control parameter) of a pathloss measurement, reference signal power used for determining a pathloss measurement, a power offset with respect to a power of preamble transmission, and/or one or more power offsets. For example, the wireless device measures received signal power(s) (e.g., RSRP) and/or quality (e.g., RSRQ) of one or more SSBs that a base station transmits. The wireless device may select at least one SSB based on the measurement and determine at least one PRACH occasion associated with the at least one SSB and/or at least one PUSCH resource associated with the at least one PRACH occasion and/or associated with the at least one SSB (this association may be configured explicitly by the message(s) and/or implicitly through a first association between the at least one SSB and the at least one PRACH occasion and a second association between the at least one PRACH occasion and the at least one PUSCH resource). The wireless device may transmit at least one RAP via the at least one PRACH occasion and/or transmit at least one TB via the at least one PUSCH resource. The wireless device may determine transmit powers of the at least one RAP and/or the at least one TB based on the configuration parameters indicated by the message(s). For example, the configuration parameters indicate uplink transmit power control parameters comprising at least one of following: a received target power for a base station, one or more power offsets, power ramping step, power ramping counter, retransmission counter, pathloss reference signal index (or indices), pathloss reference signal reference power. At least one of the uplink transmit power control parameters may be shared between an uplink transmit power for the at least one RAP and an uplink transmit power for the at least one TB. For example, sharing the at least one of the uplink transmit power control parameter may reduce a size of the message(s) (e.g., comparing with a case that the at least one uplink transmit power control parameter repeats for the at least one RAP and for the at least one TB in the messages(s)). None of the uplink transmit power control parameters may be shared between an uplink transmit power for the at least one RAP and an uplink transmit power for the at least one TB. A message structure of the message(s) may be flexible such that a base station indicates to the wireless device whether at least one of (or which one or more of) the uplink transmit power control parameters may be shared between an uplink transmit power for the at least one RAP and an uplink transmit power for the at least one TB. For example, the wireless device determines, based on the message structure of the message(s), whether at least one of (or which one or more of) the uplink transmit power control parameters may be shared between an uplink transmit power for the at least one RAP and an uplink transmit power for the at least one TB.

There may be one or more ways for a wireless device to generate one or more candidate preambles that may be used for a two-step RA procedure. For example, a two-step RACH configuration comprises RAP generating parameter(s) (e.g., a root sequence), based on which the wireless device generates the one or more candidate preambles. The wireless device may (e.g., randomly) select one of the one or more candidate preambles as an RAP to be used for transmission of Preamble 1341. The RAP generating parameters may be DL reference signal (e.g., SSB or CSI-RS)-specific, cell-specific, and/or wireless device-specific. For example, the RAP generating parameters for a first DL reference signal are different from the RAP generating parameters for a second DL reference signal. For example, the RAP generating parameters are common for one or more DL reference signals of a cell where a wireless device initiates a two-step RA procedure. For example, a wireless device receives, from a base station, a control message (e.g., SIB message, RRC message dedicated to a wireless device, and/or a PDCCH order for a secondary cell addition) that indicates one or more preamble indices of one or more RAPs to be used for a two-step RA procedure of the wireless device. The one or more candidate preambles may be grouped into one or more groups. For example, each group is associated with a specific amount of data for transmission. For example, the amount of data indicates a size of one or more transport blocks that a wireless device to transmit and/or indicates a size of uplink data that remains in the buffer. Each of the one or more groups may be associated with a range of data size. For example, a first group of the one or more groups comprises RAPs indicating small data transmission(s) of transport block(s) during the two-step RA procedure, and a second group may comprise RAPs indicating larger data transmission(s) of transport block(s) during the two-step RA procedure, and so on. A base station may transmit an RRC message comprising one or more thresholds based on which a wireless device may determine which group of RAPs the wireless device selects an RAP. For example, the one or more thresholds indicate one or more data sizes that determine the one or more groups. Based on a size of uplink data that a wireless device potentially transmits, the wireless device may compare the size of uplink data with the one or more data sizes and determine a particular group from the one or more groups. By transmitting an RAP selected from the specific group, the wireless device may indicate, to a base station, a (e.g., estimated) size of uplink data that the wireless device transmits, to the base station. The indication of the size of uplink data may be used for a base station to determine a proper size of uplink radio resources for (re)transmission of the uplink data.

In a two-step RA procedure, a wireless device may transmit an RAP via a PRACH occasion indicated by a two-step RACH configuration. The wireless device may transmit one or more TBs via an UL radio resource (e.g., PUSCH) indicated by a two-step RACH configuration. A first transmission of the RAP and a second transmission of the one or more TBs may be scheduled in a TDM (time-division multiplexing) manner, a FDM (frequency-division multiplexing) manner, a CDM (code-division multiplexing) manner, and/or any combination thereof. The first transmission of the RAP may be overlapped in time (partially or entirely) with the second transmission of the one or more TBs. The two-step RACH configuration may indicate a portion (e.g., in frequency domain and/or in time domain) of overlapping of radio resources between the RAP and one or more TB transmissions. The first transmission of the RAP may be TDMed without overlapping with the second transmission of the one or more TBs in different frequencies (e.g., PRBs) or in the same frequency (e.g., PRB). The two-step RACH configuration may indicate one or more UL radio resources associated with one or more RAPs (or RAP groups) and/or the PRACH occasion. For example, each of one or more downlink reference signals (SSBs or CSI-RSs) is associated with one or more PRACH occasions and/or one or more RAPs. A wireless device may determine at least one PRACH occasion among the one or more PRACH occasions and/or at least one RAP among the one or more RAPs. For example, a wireless device measures RSRP and/or RSRQ of the one or more downlink reference signals and selects a first downlink reference signal from the one or more downlink reference signals. For example, an RSRP of the first downlink reference signal is larger than a threshold (e.g., indicated by a base station via a control message or signal). The wireless device may select at least one RAP and/or at least one PRACH occasion, that are associated with the first downlink reference signal, as a radio resource for Preamble 1341. Based on a selection of the at least one RAP and/or the at least one PRACH occasion, the wireless device may determine at least one UL radio resource (e.g., PUSCH occasions) where the wireless device transmits one or more TBs as a part of a two-step RACH procedure. The wireless device may determine the at least one UL radio resource (e.g., PUSCH occasions) based on the first downlink reference signal, e.g., if a control message and/or a control signal that the wireless device received from the base station indicate associations between one or more UL radio resources (e.g., PUSCH occasions) and the one or more downlink reference signals.

The one or more UL radio resources may be indicated based on a frame structure in FIG. 7, and/or OFDM radio structure in FIG. 8. For example, time domain resource(s) of the one or more UL radio resources is indicated with respect to a particular SFN (SFN=0), slot number, an OFDM symbol number, and/or a combination thereof. For example, time domain resource(s) of the one or more UL radio resources is indicated with respect to a subcarrier number, a number of resource elements, a number of resource blocks, RBG number, frequency index for a frequency domain radio resource, and/or a combination thereof. For example, the one or more UL radio resources may be indicated based on a time offset and/or a frequency offset with respect to one or more PRACH occasions of a selected RAP. The UL transmissions may occur, e.g., in the same slot (or subframe) and/or in a different slot, e.g., in consecutive slots (or subframes). For example, the one or more UL radio resources (e.g., PUSCH occasions) may be configured periodically, e.g., a periodic resources of configured grant Type 1 or Type 2.

A PUSCH occasion for two-step RA procedure may be an uplink radio resource for a transport block 1342 (e.g., payload) transmission associated with a PRACH preamble in MsgA 1331 of two-step RA procedure. One or more examples of a resource allocation of a PUSCH occasion may be (but not limited to) that PUSCH occasions are separately configured from PRACH occasions. For example, for a PUSCH occasion may be determined based on a periodic resource indicated by a configured grant (e.g., configured grant Type 1/Type 2 and/or SPS). A wireless device may determine the PUSCH occasion further based on an association between the PRACH and PUSCH for MsgA transmission. For example, a wireless device may receive, from a base station, configuration parameters indication at least one of following: a modulation and coding scheme, a transport block size, a number of FDMed PUSCH occasions (the FDMed PUSCH occasions may comprise guard band and/or guard period, e.g., if exist, and the FDMed PUSCH occasions under the same Msg A PUSCH configurations may be consecutive in frequency domain), a number of PRBs per PUSCH occasion, a number of DMRS symbols/ports/sequences per PUSCH occasion, a number of repetitions for Msg A PUSCH (Transport block 1342) transmission, a bandwidth of PRB level guard band, duration of guard time, a PUSCH mapping type of Transport block 1342, a periodicity (e.g., MsgA PUSCH configuration period), offset(s) (e.g., in terms of any combination of at least one of symbol, slot, subframe, and/or SFN), a time domain resource allocation (e.g., in a slot for MsgA PUSCH: starting symbol, a number of symbols per PUSCH occasion, a number of time-domain PUSCH occasions), a frequency starting point.

One or more examples of a resource allocation of a PUSCH occasion may be (but not limited to) that a base station configure a relative location (e.g., in time and/or frequency) of the PUSCH occasion with respect to a PRACH occasion. For example, time and/or frequency relation between PRACH preambles in a PRACH occasion and PUSCH occasions may be a single specification fixed value. For example, a time and/or frequency relation between each PRACH preamble in a PRACH occasion to the PUSCH occasion is a single specification fixed value. For example, different preambles in different PRACH occasions have different values. For example, a time and/or frequency relation between PRACH preambles in a PRACH occasion and PUSCH occasions are single semi-statically configured value. For example, a time and/or frequency relation between each PRACH preamble in a PRACH occasion to the PUSCH occasion is semi-statically configured value. For example, different preambles in different PRACH occasions have different values. For example, any combination of above example may be implemented/configured, and the time and frequency relation need not be the same alternative. For example, a wireless device may receive, from a base station, configuration parameters indication at least one of following: a modulation and coding scheme, a transport block size, a number of FDMed PUSCH occasions (the FDMed PUSCH occasions may comprise guard band and/or guard period, e.g., if exist, and the FDMed PUSCH occasions under the same Msg A PUSCH configurations may be consecutive in frequency domain), a number of PRBs per PUSCH occasion, a number of DMRS symbols/ports/sequences per PUSCH occasion, a number of repetitions for Msg A PUSCH (Transport block 1342) transmission, a bandwidth of PRB level guard band, duration of guard time, a PUSCH mapping type of Transport block 1342, a time offset (e.g., a combination of slot-level and symbol-level indication) with respect to a reference point (e.g., a particular SFN, associated PRACH occasion, and/or start or end of associated PRACH slot), a number of symbols per PUSCH occasion, a number of TDMed PUSCH occasions.

For a two-step RA procedure, a resource allocation for a payload transmission in a PUSCH occasion may be predefined and/or configured. For example, a size of a resource in a PUSCH occasion may be predefined and/or configured. The resource may be continuous or non-continuous (e.g., a base station may flexibly configure the resource). The resource may be partitioned into a plurality of resource groups. For example, a size of each of resource groups within a PUSCH occasion may be the same or different (e.g., depending on the configuration of the two-step RA procedure). Each resource group index may be mapped to one or more preamble index.

For example, a base station may configure a wireless device with one or more parameters indicating a starting point of time and/re frequency for a PUSCH occasion, a number of resource groups, and a size of each of the resource groups. An index of each of the resource groups may be mapped to a preamble index (e.g., a particular preamble) and/or a particular PPRACH occasion. The wireless device may determine a location of each of resource groups at least based on a preamble index (e.g., in case RO and PUSCH occasion are 1-to-1 mapping) and/or based on an RO index and a preamble index (e.g., in the case of multiple ROs are associated with one PUSCH occasion).

A wireless device may receive, from a base station, configuration parameters indicating the starting point of time/frequency for the PUSCH occasion and/or a set of continuous basic unit of PUSCH resources. The size of resource unit may be identical, and the total available number of basic unit may be pre-configured. A wireless device may use one or multiple resource unit for the MsgA 1331 transmission, depending on the payload size. The starting resource unit index may be mapped to preamble index, and the length of occupied PUSCH resource (as the number of resource unit) may be either mapped to preamble index or explicitly indicated (e.g. in UCI).

A number of resource groups and/or the detailed mapping among preamble(s), resource group(s), and DMRS port(s) may be pre-defined and/or semi-statically configured (and/or indicated by DCI dynamically), e.g., to avoid a blind detection from a base station when multiple preambles are mapped to the same resource group.

For a payload transmission via a PUSCHC occasion in a two-step RA procedure, a wireless device may receive, from a base station, configuration parameters indicating one or more MCSs and one or more resource sizes for a transmission of payload. The MCS and resource size may be related to a size of the payload. For example, the configuration parameters received by the wireless device may indicate one or more combinations (and/or associations) of a size of the payload, MCS, and resource size. For example, one or more particular modulation types (e.g., pi/2-BPSK, BPSK, QPSK) may be associated with a small size of payload. For example, a one or more particular modulation types (e.g., QPSK) may be used for a wireless device with a particular RRC state (e.g., RRC IDLE and/or RRC INACTIVE). For example, the configuration parameters received by the wireless device may indicate a number of PRBs used for payload transmission over an entire UL BWP and/or over a part of UL BWP (e.g., this may be predefined and/or semi-statically configured by RRC). The configuration parameters received by the wireless device may indicate one or more repetitions of Transport block 1342 (e.g., payload). For example, a number of repetitions is predefined, semi-statically configured, and/or triggered based on one or more conditions (e.g., RSRP of downlink reference signals, and/or a particular RRC state, and/or a type of a wireless device, e.g., stationary, IoT, etc.) for the coverage enhancement of a transmission of payload.

A wireless device may receive, from a base station, one or more two-step RA configurations for Transport block 1342 (e.g., payload) transmission. The one or more two-step RA configuration may indicate one or more combinations of payload size, MCS, and/or resource size. The number of the one or more two-step RA configurations and one or more parameter values (e.g., payload size, MCS, and/or resource size) for each of the one or more two-step RA configurations may depend on the content of MsgA and/or an RRC state of a wireless device.

Based on configured two-step RA configuration parameters, a wireless device may transmit MsgA, e.g., comprising at least one preamble via a PRACH occasion and/or a Transport block 1342 (e.g., payload) via a PUSCH occasion, to a base station. MsgA may comprise an identifier for contention resolution. For example, a wireless device may construct a MAC header as the MsgA payload with a plurality of bits (e.g., 56 and/or 72 bits). For example, MsgA may comprise BSR, PHR, RRC messages, connection request, etc. For example, MsgA may comprise UCI. The UCI in MsgA may comprise at least one of following, e.g., if MsgA comprises the UCI: an MCS indication, HARQ-ACK/NACT and/or CSI report. HARQ for MsgA may combine between an initial transmission of MsgA and one or more retransmissions of MsgA PUSCH. For example, Msg A may indicate a transmission time of MsgA in the PUSCH of MsgA. A size of MsgA may depend on use case.

There may be a case that a wireless device receives, from a base station, configuration parameters indicating different (or independent) PRACH occasions between two-step RA and four-step RA. The different (or independent) PRACH occasions may reduce receiver uncertainty and/or reduce the access delay. The base station may configure the wireless device with different (or independent) PRACH resources such that the base station identifies whether a received preamble is transmitted by a wireless device for two-step RA or four-step RA based on PRACH occasion that the base station receives the received preamble. A base station may flexibility determine whether to configure shared PRACH occasions or separate PRACH occasions between two-step RA and four-step RA procedures. A wireless device may receive, from the base station, RRC message(s) and/or DCI indicating an explicit or implicit indication of whether to configure shared PRACH occasions or separate PRACH occasions between two-step RA and four-step RA procedures. There may be a case that a base station configures one or more PRACH occasions shared between two-step RA and four-step RA and preambles partitioned for the two-step RA and the four-step RA.

FIG. 17A, FIG. 17B, and FIG. 17C are examples of radio resource allocations of a PRACH resource and one or more associated UL radio resources based on a time offset, a frequency offset, and a combination of a time offset and a frequency offset, respectively as per an aspect of an example embodiment of the present disclosure. For example, a PRACH occasion and one or more associated UL radio resources (e.g., PUSCH occasions) for MsgA 1331 may be allocated with a time offset and/or frequency offset, e.g., provided by RRC messages (as a part of RACH config.) and/or predefined (e.g., as a mapping table). FIG. 17A is an example of a PRACH occasion TDMed with a UL radio resources (e.g., PUSCH occasion). FIG. 17B is an example of a PRACH occasion FDMed with a UL radio resources (e.g., PUSCH occasion). FIG. 17C is an example of a PRACH occasion TDMed and FDMed with a UL radio resources (e.g., PUSCH occasion).

A wireless device may receive, from a base station, one or more downlink reference signals (e.g., SSBs or CSI-RSs), and each of the one or more downlink reference signals may be associated with one or more RACH resources (e.g., PRACH occasions) and/or one or more UL radio resources (e.g., PUSCH occasions) provided by a two-step RACH configuration. A wireless device may measure one or more downlink reference signals and, based on measured received signal strength and/or quality (or based on other selection rule), may select at least one downlink reference signals among the one or more downlink reference signals. The wireless device may respectively transmit an RAP (e.g., Preamble 1341) and one or more TBs (e.g., Transport block 1342) via a PRACH occasion associated with the at least one downlink reference signal, and via UL radio resources (e.g., a PUSCH occasions) associated with the PRACH occasion and/or associated with the at least one downlink reference signal.

In an example, a base station may employ an RAP receive from a wireless device to adjust UL transmission timing of one or more TBs for the wireless device in a cell and/or to aid in UL channel estimation for one or more TBs. A portion of the UL transmission for one or more TBs in a two-step RACH procedure may comprise, e.g., a wireless device ID, a C-RNTI, a service request such as buffer state reporting (e.g., a buffer status report) (BSR), one or more user data packets, and/or other information. A wireless device, e.g., in an RRC CONNECTED 602 state, may use a C-RNTI as an identifier of the wireless device (e.g., a wireless device ID). A wireless device, e.g., in an RRC INACTIVE 604 state, may use a C-RNTI (if available), a resume ID, or a short MAC-ID as an identifier of the wireless device. A wireless device, e.g., in an RRC IDLE 606 state, may use a C-RNTI (if available), a resume ID, a short MAC-ID, an IMSI (International Mobile Subscriber Identifier), a T-IMSI (Temporary-IMSI), and/or a random number (e.g., generated by the wireless device) as an identifier of the wireless device.

In a two-step RA procedure, a wireless device may receive two separate responses corresponding to Msg A; a first response for RAP (e.g., Preamble 1342) transmission; and a second response for a transmission of one or more TBs (e.g., Transport block 1342). A wireless device may monitor a PDCCH (e.g., common search space and/or a wireless device specific search space) to detect the first response with a random access RNTI generated based on time and/or frequency indices of PRACH resource where the wireless device transmits an RAP. A wireless device may monitor a common search space and/or a wireless device specific search space to detect the second response. The wireless device may employ a second RNTI to detect the second response. For example, the second RNTI is a C-RNTI if configured, a random access RNTI generated based on time and/or frequency indices of PRACH occasion where the wireless device transmits an RAP, or an RNTI generated based on time and/or frequency indices (and/or DM-RS ID) of PUSCH resource(s) where the wireless device transmits the or more TBs. The wireless device specific search space may be predefined and/or configured by an RRC message received from a base station.

One or more events may trigger a two-step random access procedure. For example, one or more events may be at least one of: initial access from RRC_IDLE, RRC connection re-establishment procedure, handover, DL or UL data arrival during RRC_CONNECTED 602 when UL synchronization status is non-synchronized, transition from RRC INACTIVE 604, beam failure recovery procedure, and/or request for other system information. For example, a PDCCH order, an MAC entity of the wireless device, and/or a beam failure indication may initiate a random access procedure.

A wireless device may initiate a two-step RA procedure in a particular condition, e.g., depending on a service of data to be transmitted (e.g., delay sensitive data such URLLC) and/or radio conditions. For example, a base station may configure one or more wireless devices with a two-step RA procedure, for example, if a cell is small (e.g., there is no need of a TA) and/or for a case of stationary wireless device (e.g., there is no need of TA update). A wireless device may acquire the configuration, via one or more RRC messages (e.g., MIB, system information blocks, multicast and/or unicast RRC signaling), and/or via L1 control signaling (e.g., PDCCH order) used to initiate a two-step RA procedure.

For example, in a macro coverage area, a wireless device may have a stored and/or persisted TA value, e.g., a stationary or near stationary wireless device such as a sensor-type wireless device. In this case a two-step RA procedure may be initiated. A base station having macro coverage may use broadcasting and/or dedicated signaling to configure a two-step RA procedure with one or more wireless devices having stored and/or persisted TA value(s) under the coverage.

A wireless device in an RRC CONNECTED 602 state may perform a two-step RA procedure. For example, the two-step RA procedure may be initiated when a wireless device performs a handover (e.g., network-initiated handover), and/or when the wireless device requires or requests a UL grant for a transmission of delay-sensitive data and there are no physical-layer uplink control channel resources available to transmit a scheduling request. A wireless device in an RRC INACTIVE 604 state may perform a two-step RA procedure, e.g., for a small data transmission while remaining in the RRC INACTIVE 604 state or for resuming a connection. A wireless device may initiate a two-step RA procedure, for example, for initial access such as establishing a radio link, re-establishment of a radio link, handover, establishment of UL synchronization, and/or a scheduling request when there is no UL grant.

The following description presents one or more examples of an RA procedure. The procedures and/or parameters described in the following may not be limited to a specific type of an RA procedure. The procedures and/or parameters described in the following may be applied for a four-step RA procedure and/or a two-step RA procedure. For example, an RA procedure may refer to a four-step RA procedure and/or a two-step RA procedure in the following description.

A wireless device may perform a cell search. For example, the wireless device may acquire time and frequency synchronization with the cell and detect a first physical layer cell ID of the cell during the cell search procedure. The wireless device may perform the cell search, for example, when the wireless device has received one or more synchronization signals (SS), for example, the primary synchronization signal (PSS) and the secondary synchronization signal (SSS). The wireless device may assume that reception occasions of one or more physical broadcast channels (PBCH), PSS, and SSS are in consecutive symbols, and, for example, form a SS/PBCH block (SSB). For example, the wireless device may assume that SSS, PBCH demodulation reference signal (DM-RS), and PBCH data have the same energy per resource element (EPRE). For example, the wireless device may assume that the ratio of PSS EPRE to SSS EPRE in a SS/PBCH block is a particular value (e.g., either 0 dB or 3 dB). For example, the wireless device may determine that the ratio of PDCCH DM-RS EPRE to SSS EPRE is within a particular range (e.g., from −8 dB to 8 dB), for example, when the wireless device has not been provided dedicated higher layer parameters e.g., semi-statically configured by RRC message(s).

A wireless device may determine a first symbol index for one or more candidate SS/PBCH block. For example, for a half frame with SS/PBCH blocks, the first symbol index for one or more candidate SS/PBCH blocks may be determined according to a subcarrier spacing of the SS/PBCH blocks. For example, index 0 corresponds to the first symbol of the first slot in a half-frame. As an example, the first symbol of the one or more candidate SS/PBCH blocks may have indexes $\{2, 8\}+14 \cdot n$ for 15 kHz subcarrier spacing, where, for example, n=0, 1 for carrier frequencies smaller than or equal to 3 GHz, and for example, n=0, 1, 2, 3 for carrier frequencies larger than 3 GHz and smaller than or equal to 6 GHz. The one or more candidate SS/PBCH blocks in a half frame may be indexed in an ascending order in time, for example, from 0 to L−1. The wireless device may determine some bits (for example, the 2 least significant bits (LSB) for L=4, or the 3 LSB bits for L>4) of a SS/PBCH block index per half frame from, for example, a one-to-one mapping with one or more index of a DM-RS sequence transmitted in the PBCH.

Prior to initiation of a random access procedure, a base station may transmit one or more RRC messages to configure a wireless device with one or more parameters of RACH configuration, e.g., for a four-step RA procedure, a two-step RA procedure, and/or both of four-step and two-step RA procedures. The one or more RRC messages may broadcast or multicast to one or more wireless devices. The one or more RRC messages may be wireless device-specific messages, e.g., a dedicated RRC messages transmitted to a wireless device with RRC INACTIVE 1520 or RRC CONNECTED 1530. The one or more RRC messages may comprise one or more parameters required for transmitting at least one preamble via one or more random access resources. For example, the one or more parameters may indicate at least one of the following: PRACH resource allocation (e.g., resource allocation of one or more PRACH occasions), preamble format, SSB information (e.g., total number of SSBs, downlink resource allocation of SSB transmission, transmission power of SSB transmission, SSB index corresponding to a beam transmitting the one or more RRC messages and/or other information), and/or uplink radio resources for one or more transport block transmissions.

The base station may further transmit one or more downlink reference signals. For example, the one or more downlink reference signals may comprise one or more discovery reference signals. The wireless device may select a first downlink reference signal among the one or more downlink reference signals. For example, the first downlink reference signal may comprise one or more synchronization signals and a physical broadcast channel (SS/PBCH). For example, the wireless device may adjust a downlink synchronization based on the one or more synchronization signals. For example, the one or more downlink reference signals may comprise one or more channel state information-reference signals (CSI-RS).

The one or more RRC messages may further comprise one or more parameters indicating one or more downlink control channels, for example, PDDCH. Each of the one or more downlink control channels may be associated with at least one of the one or more downlink reference signals. For example, the first downlink reference signal may comprise one or more system information (e.g., master information block (MIB) and/or system information block (SIB)). The base station may transmit message(s) comprising the one or more system information, for example, on the physical broadcast channel (PBCH), physical downlink control channel (PDCCH), and/or physical downlink shared channel (PDSCH).

The one or more system information may comprise at least one information element (e.g., PDCCH-Config, PDCCH-ConfigSIB1, PDCCH-ConfigCommon, and/or any combination thereof). The at least one information element may be transmitted from a base station, for example, to indicate, to a wireless device, one or more control parameters. The one or more control parameters may indicate one or more control resource sets (CORESET). For example, the one or more control parameters comprises the parameters indicating a first common CORESET #0 (e.g., controlResourceSetZero), and/or a second common CORESET (e.g., commonControlResourceSet). The one or more control parameters may further comprise one or more search space sets. For example, the one or more control parameters comprise the parameters of a first search space for the system information block (e.g., searchSpaceSIB1), and/or a first common search space #0 (e.g., searchSpaceZero), and/or a first random access search space (e.g., ra-SearchSpace), and/or a first paging search space (e.g., pagingSearchSpace). The wireless device may use the one or more control parameters to for acquiring, configuring, and/or monitoring the one or more downlink control channels.

A wireless device may monitor a set of one or more candidates for the one or more downlink control channels in the one or more control resource sets. The one or more control resource sets may be defined in a first active downlink frequency band, e.g., an active bandwidth part (BWP), on a first activated serving cell. For example, the first activated serving cell is configured, by a network, to a wireless device with the one or more search space sets. For example, the wireless device decodes each of the one or more downlink control channels in the set of candidates for the one or more downlink control channels according to a first format of a first downlink control information (DCI). The set of candidates for the one or more downlink control channels may be defined in terms of the one or more search space sets. For example, the one or more search space sets are one or more common search space sets (e.g., Type0-PDCCH, Type0A-PDCCH, Type1-PDCCH, Type2-PDCCH, and/or Type3-PDCCH), one or more wireless device-specific search space sets, and/or any combination thereof.

For example, the wireless device may monitor the set of candidates for the one or more downlink control channels in a Type0-PDCCH common search space set. For example, the Type0-PDCCH common search space set may be configured by the at least one information element, e.g., the PDCCH-ConfigSIB1 in the MIB. For example, the Type0-PDCCH common search space set may be configured by the one or more search space sets, e.g., a searchSpaceSIB1 in the PDCCH-ConfigCommon, or the searchSpaceZero in the PDCCH-ConfigCommon. For example, the Type0-PDCCH common search space set may be configured for a first format of a first downlink control information scrambled by a particular radio network temporary identifier, e.g., a system information-radio network temporary identifier (SI-RNTI).

For example, the wireless device may monitor the set of candidates for the one or more downlink control channels in a Type1-PDCCH common search space set. For example, the Type1-PDCCH common search space set may be configured by the one or more search space sets, e.g., the ra-searchSpace in the PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), a temporary cell-radio network temporary identifier (TC-RNTI), C-RNTI, and/or an RNTI that generated by a wireless device based on a two-step RA procedure, e.g., MsgB-RNTI.

The wireless device may determine, for example during a cell search, that a first control resource set for a first common search space (e.g., Type0-PDCCH) is present. The first control resource set may comprise one or more resource blocks and one or more symbols. The one or more RRC messages may comprise one or more parameters indicating one or more monitoring occasions of the one or more downlink control channels. For example, the wireless device determines a number of consecutive resource blocks and a number of consecutive symbols for the first control resource set of the first common search space. For example, one or more bits (e.g., a four most significant bits) of the at least one information element (e.g., PDCCH-ConfigSIB1) indicates the number of consecutive resource blocks and the number of consecutive symbols. The wireless device may determine the one or more monitoring occasions of the one or more downlink control channels from one or more bits (e.g., a four least significant bits) of the at least one information element (e.g., PDCCH-ConfigSIB1). For example, the one or more monitoring occasions of the one or more downlink control channels associated with a first downlink reference signal (e.g., SSB or CSI-RS) are determined based on one or more system frame numbers and one or more slot indexes of the first control resource set. For example, the first downlink reference signal with a first index overlaps in time with the first frame number and the first slot index.

The wireless device may select (or determine) a particular downlink channel from the one or more downlink control channels, based on a first downlink reference signal (e.g., SSB or CSI-RS). For example, the wireless device receives message(s) indicating associations between the one or more downlink control channels and one or more downlink reference signals. The wireless device may select the first downlink reference signal (e.g., SSB or CSI-RS) from the one or more downlink reference signals, for example, based on an RSRP of the first downlink reference signal larger than a first value. Based on the associations, the wireless device may determine the particular downlink channel associated with the first downlink reference signal. The wireless device may determine that a demodulation reference signal antenna port associated with a reception of the first downlink channel is quasi co-located (QCL) with the first downlink reference signal. For example, the demodulation reference signal antenna port associated with the reception of the first downlink channel and the first downlink reference signal (e.g., the corresponding SS/PBCH block) may be quasi co-located with respect to at least one of the following: an average gain, QCL-TypeA, and/or QCL-TypeD.

A wireless device may receive, from a base station, one or more RRC messages comprising one or more random access parameters. For example, the one or more RRC messages comprise a common (or generic) random access configuration message (e.g., RACH-ConfigCommon and/or RACH-ConfigGeneric) indicating at least one of: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number of random access preamble transmission that may be performed (e.g., preambleTransMax), a window length for a random access response (i.e., RAR, e.g., Msg2) (e.g., ra-ResponseWindow), a number of SSBs per random access channel (RACH) occasion and a number of contention-based preambles per SSB (e.g., ssb-perRACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise one or more RACH occasions for contention-free random access (e.g., occasions), and one or more PRACH mask index for random access resource selection (e.g., ra-ssb-OccasionMaskIndex).

The one or more random access parameters (e.g., ssb-perRACH-OccasionAndCB-PreamblesPerSSB) may indicate a first number (e.g., N) of the one or more downlink reference signals (e.g., SS/PBCH blocks) that may be associated with a first PRACH occasion. The one or more random access parameters (e.g., ssb-perRACH-OccasionAndCB-PreamblesPerSSB) may indicate a second number (e.g., R) of the one or more random access preambles for the first downlink reference signal and for the first PRACH occasion. The one or more random access preambles may be contention based preambles. The first downlink reference signal may be a first SS/PBCH block. For example, the first number (e.g., if N<1) indicates that the first SS/PBCH block may be mapped to at least one (e.g., 1/N) consecutive valid PRACH occasions. For example, the second number (e.g., R) indicates that at least one preamble with consecutive indexes associated with the first SS/PBCH block may start from the first preamble index for the first valid PRACH occasion.

For example, the one or more PRACH configuration indexes (e.g., prach-ConfigurationIndex), may indicate a preamble format, a periodicity for the one or more PRACH time resources, one or more PRACH subframe numbers, a number of PRACH slots within the one or more PRACH subframes, a PRACH starting symbol number, and/or a number of time domain PRACH occasions within a PRACH slot.

The one or more random access parameters may further comprise an association period for mapping the one or more SS/PBCH blocks to the one or more PRACH occasions. For example, the one or more SS/PBCH block indexes are mapped to the one or more PRACH occasions based on an order. An example of the order may be as follows: in increasing order of the indexes of the at least one preamble in the first PRACH occasion; in increasing order of the indexes of the one or more frequency resources (e.g., for frequency multiplexed PRACH occasions); in increasing order of the indexes of the one or more time resources (e.g., for time multiplexed PRACH occasions) in the first PRACH slot; and/or in increasing order of the indexes for the PRACH slots.

A control order initiating an RA procedure (e.g., for SCell addition and/or TA update) may comprising at least one PRACH mask index. The at least PRACH mask index may indicate one or more PRACH occasions associated with one or more downlink reference signals (e.g., SSBs and/or CSI-RS). FIG. 18 is an example of PRACH mask index values that may be indicated by the control order as per an aspect of an example embodiment of the present disclosure. A wireless device may identify one or more PRACH occasion(s) of a particular downlink reference signal (e.g., SSB and/or CSI-RS) based on a PRACH mask index value indicated by the control order (e.g., PDCCH order). The control order (e.g., PDCCH) may comprise a field indicating a particular SSB (or CSI-RS). For example, the allowed PRACH occasions in FIG. 18 may be mapped (e.g., consecutively) for an index of the particular SSB. The wireless device may select the first PRACH occasion indicated by a first PRACH mask index value for the particular SSB in the first association period. The first association period may be a first mapping cycle. The wireless device may reset the one or more indexes of the one or more PRACH occasions for the first mapping cycle.

A wireless device may receive, from a base station, one or more messages indicating random access parameters of a random access procedure in FIG. 13A and/or FIG. 13B) and/or a two-step random access procedure in FIG. 13C. For example, the one or more messages are broadcast RRC message(s), wireless device specific RRC message(s), and/or combination thereof. For example, the one or more messages comprise at least one of random access common configuration (e.g., RACH-ConfigCommon), random access generic configuration (e.g., RACH-ConfigGeneric), and/or random access configuration dedicated to a wireless device (e.g., RACH-ConfigDedicated). For example, for a contention based (four-step and/or a two-step) random access procedure, a wireless device receives, from a base station, at least RACH-ConfigCommon and RACH-ConfigGeneric. For example, for a contention free (four-step and/or a two-step) random access procedure, a wireless device receives, from a base station, at least RACH-ConfigDedicated together with RACH-ConfigCommon and/or RACH-ConfigGeneric. A random access procedure on an SCell may be initiated by a PDCCH order with ra-PreambleIndex different from a first index (that may be predefined or configured e.g., 0b000000).

A wireless device may initiate a random access procedure at least based on parameter(s) configured in at least one of RACH-ConfigCommon, RACH-ConfigGeneric, and RACH-ConfigDedicated. For example, a wireless device initiates a random access procedure, for example, after or in response to receiving a PDCCH order from a base station, by the MAC entity of the wireless device and/or by RRC of the wireless device. A wireless device may be in one or more conditions based on which one or more random access procedure need to be initiated. For example, there exists one random access procedure ongoing at any point in time in a MAC entity. A wireless device may continue with the ongoing procedure or start with the new procedure (e.g. for SI request), for example, if an MAC entity of a wireless device receives a request for a random access procedure while another is already ongoing in the MAC entity.

An example random access common configuration (e.g., RACH-ConfigCommon) may be below:

```
RACH-ConfigCommon ::= SEQUENCE {
    rach-ConfigGeneric          RACH-ConfigGeneric,
    totalNumberOfRA-Preambles                INTEGER (1..63)    OPTIONAL,
    ssb-perRACH-OccasionAndCB-PreamblesPerSSB              CHOICE {
        oneEighth           ENUMERATED
    {n4,n8,n12,n16,n20,n24,n28,n32,n36,n40,n44,n48,n52,n56,n60,n64},
        oneFourth           ENUMERATED
    {n4,n8,n12,n16,n20,n24,n28,n32,n36,n40,n44,n48,n52,n56,n60,n64},
        oneHalf             ENUMERATED
    {n4,n8,n12,n16,n20,n24,n28,n32,n36,n40,n44,n48,n52,n56,n60,n64},
        one                 ENUMERATED
    {n4,n8,n12,n16,n20,n24,n28,n32,n36,n40,n44,n48,n52,n56,n60,n64},
        two                 ENUMERATED {n4,n8,n12,n16,n20,n24,n28,n32},
        four                INTEGER (1..16),
        eight               INTEGER (1..8),
        sixteen             INTEGER (1..4)
    } OPTIONAL,-- Need M
    groupBconfigured        SEQUENCE {
        ra-Msg3SizeGroupA       ENUMERATED { b56, b144, b208, b256, b282,
    b480, b640, b800, b1000, spare7, spare6, spare5, spare4, spare3, spare2, spare1},
        messagePowerOffsetGroupB            ENUMERATED { minusinfinity, dB0, dB5,
    dB8, dB10, dB12, dB15, dB18},
        numberOfRA-PreamblesGroupA          INTEGER (1..64)
    } OPTIONAL,-- Need R
    ra-ContentionResolutionTimer            ENUMERATED { sf8, sf16, sf24, sf32,
    sf40, sf48, sf56, sf64},
    rsrp-ThresholdSSB       RSRP-Range   OPTIONAL,    -- Need R
    rsrp-ThresholdSSB-SUL   RSRP-Range   OPTIONAL,    -- Cond SUL
    prach-RootSequenceIndex  CHOICE {
        l839    INTEGER (0..837),
        l139    INTEGER (0..137)
    },
    msg1-SubcarrierSpacing      SubcarrierSpacing           OPTIONAL,   --Need S
    restrictedSetConfig         ENUMERATED {unrestrictedSet, restrictedSetTypeA,
    restrictedSetTypeB},
    msg3-transformPrecoding     ENUMERATED {enabled}        OPTIONAL,   --
    Need R, ...
}
```

For example, messagePowerOffsetGroupB indicates a threshold for preamble selection. The value of messagePowerOffsetGroupB may be in dB. For example, minusinfinity in RACH-ConfigCommon corresponds to infinity. The value dB0 may correspond to 0 dB, dB5 may correspond to 5 dB and so on. msg1-SubcarrierSpacing in RACH-ConfigCommon may indicate a subcarrier spacing of PRACH. One or more values, e.g., 15 or 30 kHz (<6 GHz), 60 or 120 kHz (>6 GHz) may be applicable. There may be a layer 1 parameter (e.g., 'prach-Msg1SubcarrierSpacing) corresponding to msg1-SubcarrierSpacing. A wireless device may apply the SCS as derived from the prach-ConfigurationIndex in RACH-ConfigGeneric, for example, if this parameter is absent. A base station may employ msg3-transformPrecoding to indicate to a wireless device whether transform precoding is enabled for data transmission (e.g., Msg3 in a four-step RA procedure and/or one or more TB transmission in a two-step RA procedure). Absence of msg3-transfromPrecoding may indicate that it is disabled. numberOfRA-PreamblesGroupA may indicate a number of contention based (CB) preambles per SSB in group A. This may determine implicitly the number of CB preambles per SSB available in group B. The setting may be consistent with the setting of ssb-perRACH-OccasionAndCB-PreamblesPerSSB. prach-RootSequenceIndex may indicate PRACH root sequence index. There may be a layer 1 parameter (e.g., 'PRACHRootSequenceIndex') corresponding to ssb-perRACH-OccasionAndCB-PreamblePerSSB. The value range may depend on a size of preamble, e.g., whether a preamble length (L) is L=839 or L=139. ra-ContentionResolutionTimer may indicate an initial value for the contention resolution timer. For example, a value ms8 in RACH-ConfigCommon may indicate 8 ms, value ms16 may indicate 16 ms, and so on. ra-Msg3SizeGroupA may indicate a transport blocks size threshold in bit. For example, a wireless device may employ a contention based RA preamble of group A, for example, when the transport block size is below ra-Msg3SizeGroupA. rach-ConfigGeneric may indicate one or more generic RACH parameters in RACH-ConfigGeneric. restrictedSetConfig may indicate a configuration of an unrestricted set or one of two types of restricted sets. rsrp-ThresholdSSB may indicate a threshold for SS block selection. For example, a wireless device may select the SS block and corresponding PRACH resource for path-loss estimation and (re)transmission based on SS blocks that satisfy the threshold. rsrp-ThresholdSSB-SUL may indicate a threshold for uplink carrier selection. For example, a wireless device may select a supplementary uplink (SUL) carrier to perform random access based on this threshold. ssb-perRACH-OccasionAndCB-PreamblesPerSSB may indicate a number of SSBs per RACH occasion and a number of contention based preambles per SSB. There may be layer 1 one or more parameters (e.g., 'SSB-per-rach-occasion' and/or 'CB-preambles-per-SSB') corresponding to ssb-perRACH-OccasionAndCB-PreamblesPerSSB. For example, a total number of CB preambles in a RACH occasion may be given by CB-preambles-per-SSB*max(1, SSB-per-rach-occasion). totalNumberOfRA-Preambles may indicate a total number of preambles employed for contention based and contention free random access. For example, totalNumberOfRA-Preambles may not comprise one or more preambles employed for other purposes (e.g. for SI request). A wireless device may use one or more of 64 preambles for RA, for example, if the field is absent.

An example random access common configuration of RACH-ConfigGeneric may be below:

```
RACH-ConfigGeneric ::= SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax    ENUMERATED {n3, n4, n5, n6, n7,n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},...
}
```

For example, msg1-FDM may indicate a number of PRACH transmission occasions FDMed in one time instance. There may be a layer 1 parameter (e.g., 'prach-FDM') corresponding to msg1-FDM. msg1-FrequencyStart may indicate an offset of PRACH transmission occasion (e.g., lowest PRACH transmission occasion) in frequency domain with respective to a particular PRB (e.g., PRB 0). A base station may configure a value of msg1-FrequencyStart such that the corresponding RACH resource is within the bandwidth of the UL BWP. There may be a layer 1 parameter (e.g., 'prach-frequency-start') corresponding to msg1-FreqencyStart. powerRampingStep may indicate power ramping steps for PRACH. prach-ConfigurationIndex may indicate a PRACH configuration index. For example, a radio access technology (e.g., LTE, and/or NR) may predefine one or more PRACH configurations, and prach-ConfigurationIndex may indicate one of the one or more PRACH configurations. There may be a layer 1 parameter (e.g., 'PRACHConfigurationIndex') corresponding to prach-ConfigurationIndex. preambleReceivedTargetPower may indicate a target power level at the network receiver side. For example, multiples of a particular value (e.g., in dBm) may be chosen. RACH-ConfigGeneric above shows an example when multiples of 2 dBm are chosen (e.g. -202, -200, -198, . . . ). preambleTransMax may indicate a number of RA preamble transmissions performed before declaring a failure. For example, preambleTransMax may indicate a maximum number of RA preamble transmissions performed before declaring a failure. ra-ResponseWindow may indicate an RAR window length in number of slots (or subframes, mini-slots, and/or symbols). a base station may configure a value lower than or equal to a particular value (e.g., 10 ms). The value may be larger than a particular value (e.g., 10 ms). zeroCorrelationZoneConfig may indicate an index of preamble sequence generation configuration (e.g., N-CS configuration). A radio access technology (e.g., LTE and/or NR) may predefine one or more preamble sequence generation configurations, and zeroCorrelationZoneConfig may indicate one of the one or more preamble sequence generation configurations. For example, a wireless device may determine a cyclic shift of preamble sequence based on zeroCorrelationZoneConfig. zeroCorrelationZoneConfig may determine a property of random access preambles (e.g., a zero correlation zone)

An example random access dedicated configuration (e.g., RACH-ConfigDedicated) may be below:

```
RACH-ConfigDedicated ::= SEQUENCE {
    cfra                    CFRA                OPTIONAL,  -- Need N
    ra-Prioritization       RA-Prioritization   OPTIONAL,  -- Need N
    ...
}
CFRA ::= SEQUENCE {
    occasions               SEQUENCE {
        rach-ConfigGeneric                      RACH-ConfigGeneric,
        ssb-perRACH-Occasion                    ENUMERATED {oneEighth, oneFourth,
oneHalf, one, two, four, eight, sixteen}        OPTIONAL    -- Cond SSB-CFRA
    } OPTIONAL,-- Need S
    resources               CHOICE {
        ssb                 SEQUENCE {
            ssb-ResourceList SEQUENCE (SIZE(1..maxRA-SSB-Resources)) OF
CFRA-SSB-Resource,
            ra-ssb-OccasionMaskIndex            INTEGER (0..15)
        },
        csirs               SEQUENCE {
            csirs-ResourceList SEQUENCE (SIZE(1..maxRA-CSIRS-Resources))
OF CFRA-CSIRS-Resource,
            rsrp-ThresholdCSI-RS                RSRP-Range
        }
    },
    ...
}
CFRA-SSB-Resource ::= SEQUENCE {
    ssb                     SSB-Index,
    ra-PreambleIndex        INTEGER (0..63),
    ...
}
CFRA-CSIRS-Resource ::=     SEQUENCE {
    csi-RS                  CSI-RS-Index,
    ra-OccasionList         SEQUENCE (SIZE(1..maxRA-OccasionsPerCSIRS)) OF
INTEGER (0..maxRA-Occasions-1),
    ra-PreambleIndex        INTEGER (0..63),
    ...
}
```

For example, a CSI-RS is indicated, to a wireless device, by an identifier (e.g., ID) of a CSI-RS resource defined in the measurement object associated with this serving cell. ra-OccasionList may indicate one or more RA occasions. A wireless device may employ the one or more RA occasions, for example, when the wireless device performs a contention-free random access (CFRA) procedure upon selecting the candidate beam identified by the CSI-RS. ra-PreambleIndex may indicate an RA preamble index to use in the RA occasions associated with this CSI-RS. ra-ssb-Occasion-MaskIndex may indicate a PRACH Mask Index for RA Resource selection. The mask may be valid for one or more SSB resources signaled in ssb-ResourceList. rach-Config-Generic may indicate a configuration of contention free random access occasions for the CFRA procedure. ssb-perRACH-Occasion may indicate a number of SSBs per RACH occasion. ra-PreambleIndex may indicate a preamble index that a wireless device may employ when performing CFRA upon selecting the candidate beams identified by this SSB. ssb in RACH-ConfigDedicated may indicate an identifier (e.g., ID) of an SSB transmitted by this serving cell. cfra in RACH-ConfigDedicated may indicate one or more parameters for contention free random access to a given target cell. A wireless device may perform contention based random access, for example, if the field (e.g., cfra) is absent. ra-prioritization may indicate one or more parameters which apply for prioritized random access procedure to a given target cell. A field, SSB-CFRA, in RACH-ConfigDedicated may be present, for example, if the field resources in CFRA is set to ssb; otherwise it may be not present.

A wireless device may receive, from a base station, one or more RRC message indicating at least one of:

an available set of PRACH occasions for the transmission of the Random Access Preamble (e.g., prach-ConfigIndex), an initial Random Access Preamble power (e.g., preambleReceivedTargetPower), an RSRP threshold for the selection of the SSB and corresponding Random Access Preamble and/or PRACH occasion (e.g., rsrp-ThresholdSSB, rsrp-ThresholdSSB may be configured in a beam failure recovery configuration, e.g., BeamFailureRecoveryConfig IE, for example, if the Random Access procedure is initiated for beam failure recovery), an RSRP threshold for the selection of CSI-RS and corresponding Random Access Preamble and/or PRACH occasion (e.g., rsrp-ThresholdCSI-RS, rsrp-ThresholdCSI-RS may be set to a value calculated based on rsrp-ThresholdSSB and an offset value, e.g., by multiplying rsrp-ThresholdSSB by powerControlOffset), an RSRP threshold for the selection between the NUL carrier and the SUL carrier (e.g., rsrp-ThresholdSSB-SUL), a power offset between rsrp-ThresholdSSB and rsrp-ThresholdCSI-RS to be employed when the Random Access procedure is initiated for beam failure recovery (e.g., powerControlOffset), a power-ramping factor (e.g., powerRampingStep), a power-ramping factor in case of differentiated Random Access procedure (e.g., powerRampingStepHighPriority), an index of Random Access Preamble (e.g., ra-PreambleIndex), an index (e.g., ra-ssb-OccasionMaskIndex) indicating PRACH occasion(s) associated with an SSB in which the MAC entity may transmit a Random Access Preamble (e.g., FIG. 18 shows an example of ra-ssb-OccasionMaskIndex values), PRACH occasion(s) associated with a CSI-RS in which the MAC entity may transmit a Random Access Preamble (e.g., ra-OccasionList), a maximum number of Random Access Preamble transmission (e.g., preambleTransMax), a number of SSBs mapped to each PRACH occasion and a number of Random Access Preambles mapped to each SSB (e.g., ssb-perRACH-OccasionAndCB-PreamblesPerSSB, the time window (duration, and/or interval) to monitor RA response(s) (e.g., ra-ResponseWindow) and/or a Contention Resolution Timer (e.g., ra-ContentionResolutionTimer).

In an example, a wireless device initiates an RA procedure for beam failure detection and recovery. For example, a wireless device receives, from a base station, RRC message(s) for a beam failure recovery procedure. The wireless device may indicate, to the serving base station based on the beam failure recovery procedure, SSB(s) or CSI-RS(s) on which the wireless device detects a beam failure among one or more serving SSB(s)/CSI-RS(s). Beam failure may be detected by counting one or more beam failure instance indication from the lower layers to the MAC entity of the wireless device. For example, a wireless device receives, from a base station, an RRC message (e.g., comprising a beam failure recovery configuration, e.g., BeamFailureRecoveryConfig) indicating at least one of following: beamFailureInstanceMaxCount for the beam failure detection. beamFailureDetectionTimer for the beam failure detection, beamFailureRecovery Timer for the beam failure recovery procedure, rsrp-ThresholdSSB for an RSRP threshold for the beam failure recovery, powerRampingStep for the beam failure recovery, preambleReceivedTargetPower, preambleReceivedTargetPower for the beam failure recovery, preambleTransMax for the beam failure recovery, the time window (e.g., ra-ResponseWindow) to monitor response(s) for the beam failure recovery using contention-free Random Access Preamble, prach-ConfigIndex for the beam failure recovery, ra-ssb-OccasionMaskIndex for the beam failure recovery, ra-OccasionList for the beam failure recovery.

A wireless device may employ (or use or maintain) one or more parameters (or variables) for a random access procedure. For example, the one or more parameters (or variables) comprise at least one of:
PREAMBLE_INDEX;
PREAMBLE_TRANSMISSION_COUNTER;
PREAMBLE_POWER_RAMPING_COUNTER;
PREAMBLE_POWER_RAMPING_STEP; PREAMBLE_RECEIVED_TARGET_POWER;
PREAMBLE_BACKOFF; PCMAX; SCALING_FACTOR_BI; and TEMPORARY_C-RNTI.

A wireless device may perform a random access resource selection for selecting one or more preambles and one or more PRACH occasion (or resources comprising time, frequency, and/or code). For example, there may be one or more cases that a random access procedure may be initiated for beam failure recovery; and/or the beamFailureRecoveryTimer is either running or not configured; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select one or more SSBs with corresponding one or more SS-RSRP values above rsrp-ThresholdSSB amongst the SSBs in candidateBeamRSList or one or more CSI-RSs with corresponding one or more CSI-RSRP values above rsrp-ThresholdCSI-RS amongst the CSI-RSs in candidateBeamRSList. For example, a wireless device may select at least one CSI-RS and set the PREAMBLE_INDEX to a ra-PreambleIndex corresponding to the SSB in candidateBeamRSList which is quasi-collocated with the at least one CSI-RS selected by the wireless device, for example, if there is no ra-PreambleIndex associated with the at least one CSI-RS, otherwise the wireless device may set the PREAMBLE_INDEX to a ra-PreambleIndex corresponding to the selected SSB or CSI-RS from the set of Random Access Preambles for beam failure recovery request.

A wireless device may receive, via PDCCH or RRC, a ra-PreambleIndex which is not a particular preamble index (that may be predefined or configured e.g., 0b000000). In this case, the wireless device may set the PREAMBLE_INDEX to the signalled ra-PreambleIndex.

There may be one or more cases that the contention-free Random Access Resources associated with SSBs have been explicitly provided, to a wireless device via RRC, and at least one SSB with SS-RSRP above rsrp-ThresholdSSB amongst the associated SSBs is available. In this case, the wireless device may select an SSB with SS-RSRP above rsrp-ThresholdSSB amongst the associated SSBs. For example, the wireless device sets the PREAMBLE_INDEX to a ra-PreambleIndex corresponding to the selected SSB.

There may be one or more cases that the contention-free random access resources associated with CSI-RSs have been explicitly provided, to a wireless device via RRC, and at least one CSI-RS with CSI-RS RSRP above rsrp-ThresholdCSI-RS amongst the associated CSI-RSs is available. In this case, a wireless device may select a CSI-RS with CSI-RSRP above rsrp-ThresholdCSI-RS amongst the associated CSI-RSs. For example, the wireless device sets the PREAMBLE_INDEX to a ra-PreambleIndex corresponding to the selected CSI-RS.

There may be one or more cases that at least one of the SSBs with SS-RSRP above rsrp-ThresholdSSB is available. In this case, for example, a wireless device may select an SSB with SS-RSRP above rsrp-ThresholdSSB. The wireless device may select any SSB, e.g., if none of the SSBs with SS-RSRP above rsrp-ThresholdSSB is available. For example, a random access resource selection is performed, e.g., when a retransmission of Msg1 1311, Msg3 1313, MsgA 1331, and/or Transport block 1342. The wireless device may select the same group of Random Access Preambles as was employed for the Random Access Preamble transmission attempt corresponding to the first transmission of the Msg1 1311, the Msg3 1313, the MsgA 1331, and/or the Transport block 1342. For example, a wireless device selects a ra-PreambleIndex randomly with equal probability from the Random Access Preambles associated with the selected SSB and the selected Random Access Preambles group, e.g., if the association between random access preambles and SSBs is configured. For example, a wireless device selects a ra-PreambleIndex randomly with equal probability from the Random Access Preambles within the selected Random Access Preambles group, e.g., if the association between random access preambles and SSBs is not configured. The wireless device may set the PREAMBLE_INDEX to the selected ra-PreambleIndex.

In an example, if an SSB is selected above and an association between PRACH occasions and SSBs is configured, a wireless device determines the next available PRACH occasion from the PRACH occasions corresponding to the selected SSB permitted by the restrictions given by the ra-ssb-OccasionMaskIndex if configured (e.g., the MAC entity of the wireless device may select a PRACH occasion (e.g., randomly with equal probability) amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured. a wireless device determines the next available PRACH occasion from the PRACH occasions in ra-OccasionList corresponding to the selected CSI-RS (e.g. the MAC entity of the wireless device may select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

If a CSI-RS is selected above and there is no contention-free Random Access Resource associated with the selected CSI-RS, a wireless device may determine the next available PRACH occasion from the PRACH occasions, for example, indicated by the ra-ssb-OccasionMaskIndex if configured (e.g., ra-ssb-OccasionMaskIndex may indicate the restrictions permitting which PRACH occasions available), corresponding to the SSB in candidateBeamRSList which is quasi-collocated with the selected CSI-RS (e.g., the MAC entity of the wireless device may take into account the possible occurrence of measurement gaps when determining the next available PRACH occasion corresponding to the SSB which is quasi-collocated with the selected CSI-RS).

A wireless device may determine the next available PRACH occasion. For example, an MAC entity of the wireless device selects a PRACH occasion (e.g., randomly with equal probability) amongst the PRACH occasions occurring simultaneously but on different subcarriers. The MAC entity may determine the next available PRACH occasion based on (e.g., by taking into account) the possible occurrence of measurement gaps.

A wireless device may perform the random access preamble transmission based on a selected PREABLE INDEX and PRACH occasion. For example, if the notification of suspending power ramping counter has not been received from lower layers (e.g., physical layer); and/or if an SSB and/or a CSI-RS selected is not changed (e.g., same as the previous Random Access Preamble transmission), a wireless device may increment PREAMBLE_POWER_RAMPING_COUNTER, e.g., by one or to the next value (e.g., counter step size may be predefined and/or semi-statically configured). For example, the wireless device selects a value of DELTA_PREAMBLE that may be predefined and/or semi-statically configured by a base station and set PREAMBLE_RECEIVED_TARGET_POWER to preambleReceivedTargetPower+DELTA_PREAMBLE+ (PREAMBLE_POWER_RAMPING_COUNTER−1)× PREAMBLE_POWER_RAMPING_STEP.

An MAC entity of the wireless device may instruct the physical layer to transmit the Random Access Preamble using the selected PRACH, corresponding RA-RNTI (e.g., if available), PREAMBLE_INDEX and PREAMBLE_RECEIVED_TARGET_POWER. For example, the wireless device determines an RA-RNTI associated with the PRACH occasion in which the Random Access Preamble is transmitted. In an example, the RA-RNTI may be determined in terms of index of the first OFDM symbol of the specified PRACH, an index of the first slot of the specified PRACH in a system frame, an index of the specified PRACH in the frequency domain, and/or uplink carrier indicator. For example, the specified PRACH is a PRACH in which the wireless device transmits the Random Access Preamble. An example RA-RNTI is determined as:

$$RA\text{-}RNTI = 1 + s\_id + 14 \times t\_id + 14 \times 80 \times f\_id + 14 \times 80 \times 8 \times ul\_carrier\_id$$

where s_id may be the index of the first OFDM symbol of the specified PRACH (0≤s_id<14), t_id may be the index of the first slot of the specified PRACH in a system frame (0≤t_id<80), f_id may be the index of the specified PRACH in the frequency domain (0≤f_id<8), and ul_carrier_id (0 for NUL carrier, and 1 for SUL carrier or vice versa) may be the UL carrier used for Msg1 1311 transmission or Preamble 1341. In an unlicensed band, RA-RNTI may be determined further based on a SFN and/or RAR window size. For example, the RA-RNTI may be determined further based on a remainder after division of the SFN by the RAR window size (e.g., the SFN modulo the RAR window size). An example RA-RNTI determination in an unlicensed band may be $$RA\text{-}RNTI = 1 + s\_id + 14 \times t\_id + 14 \times 80 \times f\_id + 14 \times 80 \times 8 \times ul\_carrier\_id \times 14 \times 80 \times 8 \times 2 \times (SFN \text{ modulo } RAR \text{ window size}),$$

where the SFN is a system frame number of the first slot and RAR window size is configured by a higher layer parameter, e.g., ra-ResponseWindow in RACH-ConfigGeneric. For example, depending on implementation, (SFN modulo RAR window size) may be located before any of components, s_id, 14×t_id, 14×80×f_id, and/or 14×80×8×ul_carrier_id in the RA-RNTI calculation formula.

A wireless device, that transmitted a random access preamble, may start to monitor a downlink control channel for a random access response corresponding to the random access preamble. For a two-step RA procedure, the wireless device may start to monitor the downlink control channel, e.g., after or in response to transmitting an RAP via PRACH or after or in response to transmitting one or more TBs via PUSCH. The possible occurrence of a measurement gap may not determine when a wireless device starts to monitor a downlink control channel.

A wireless device may start a random access window (e.g., ra-ResponseWindow) configured in a beam management configuration parameters (e.g., BeamFailureRecoveryConfig) at a first downlink control channel (e.g., PDCCH) occasion from the end of the Random Access Preamble transmission (e.g., Msg1 1311 or Msg1 1321 for a case of four-step RA procedure) or from the end of transmission of one or more TBs (e.g., Transport block 1342 for a case of two-step RA procedure), e.g., if the wireless device performs a contention-free random access procedure for a beam failure recovery request. The wireless device may monitor the first downlink control channel of the SpCell for a response to beam failure recovery request identified by a particular RNTI (e.g., RA-RNTI or C-RNTI) while the random access window is running.

A wireless device may start a random access window (e.g., ra-ResponseWindow) configured in a random access configuration parameter (e.g., RACH-ConfigCommon) at a first downlink control channel occasion from an end of a random access preamble transmission (e.g., Msg1 1311 or Msg1 1321 for a case of four-step RA procedure) or from an end of one or more TBs transmission (e.g., Transport block 1342 for a case of two-step RA procedure), e.g., if a wireless device does not perform a contention-free random access procedure for beam a failure recovery request. The wireless device may monitor the first downlink control channel occasion of the SpCell for random access response(s) identified by a particular RNTI (e.g., RA-RNTI or C-RNTI) while a random access response window (e.g., ra-ResponseWindow) is running.

A wireless device may receive a PDCCH based on the RA-RNTI. The PDCCH may indicate a downlink assignment based on which the wireless device may receive one or more TBs comprising an MAC PDU. For example, the MAC PDU comprises at least one MAC subPDU with a corresponding subheader comprising a Random Access Preamble identifier (e.g., RAPID) matched to a preamble that a wireless device transmits to a base station. In this case, the wireless device may determine that a random access response reception is successful. For example, the at least one MAC subPDU comprises a Random Access Preamble identifier (e.g., RAPID) only, e.g., for a random access procedure that a wireless device initiates for a system information request.

In an RA procedure, a wireless device may receive from a base station at least one RAR (e.g., Msg2 1312, Msg2 1322, or MsgB 1332) as a response of Msg1 1313, Msg1 1321, or MsgA 1331. The wireless device may monitor a search space set (e.g., the Type1-PDCCH common search space) for a first downlink control information (e.g., DCI format 1_0). The first downlink control information may be scrambled by a particular radio network temporary identifier (e.g., RA-RNTI, C-RNTI, or MsgB-RNTI). The first downlink control information may comprise a downlink assignment indicating scheduling of PDSCH comprising the at least one RAR. The wireless device may use the downlink assignment to identify parameters required for decoding/detecting the PDSCH. For example, the downlink assignment indicates at least one of following: time and frequency resource allocation of the PDSCH, a size of the PDSCH, MCS, etc. The wireless device may receive the PDSCH comprising the at least one RAR based on the parameters.

A wireless device may monitor for the first downlink control information (e.g., DCI format 1_0) during a time window. The time window may be indicated by the one or more RRC messages. For example, the time window starts at a particular symbol (e.g., a first or a last symbol) of a first control resource set. The wireless device may receive, from a network or base station, one or more RRC messages comprising one or more parameters required for receiving the first downlink control information on the first control resource set. The wireless device may determine a length of the time window based on the one or more parameters (e.g., ra-ResponseWindow). The length of the time window may be defined in terms of a number of slots, OFDM symbols, and/or any combination thereof. In this case, the length may depend on a duration of slot and/or OFDM symbol that may be determined based on a numerology. The length of the time window may be defined based on an absolute time duration, e.g., in terms of millisecond(s).

The wireless device may stop the time window, e.g., after or in response to a reception of the one or more random access responses being determined as successful. A reception of the one or more random access responses may be determined as successful, for example, when the one or more random access responses comprise a preamble index (e.g., a random access preamble identity: RAPID) corresponding to a preamble that the wireless device transmits to a base station. For example, the RAPID may be associated with the PRACH transmission. The one or more random access responses may comprise an uplink grant indicating one or more uplink resources granted for the wireless device.

The wireless device may transmit one or more transport blocks (e.g., Msg 3 1313) via the one or more uplink resources.

Figure 19A:
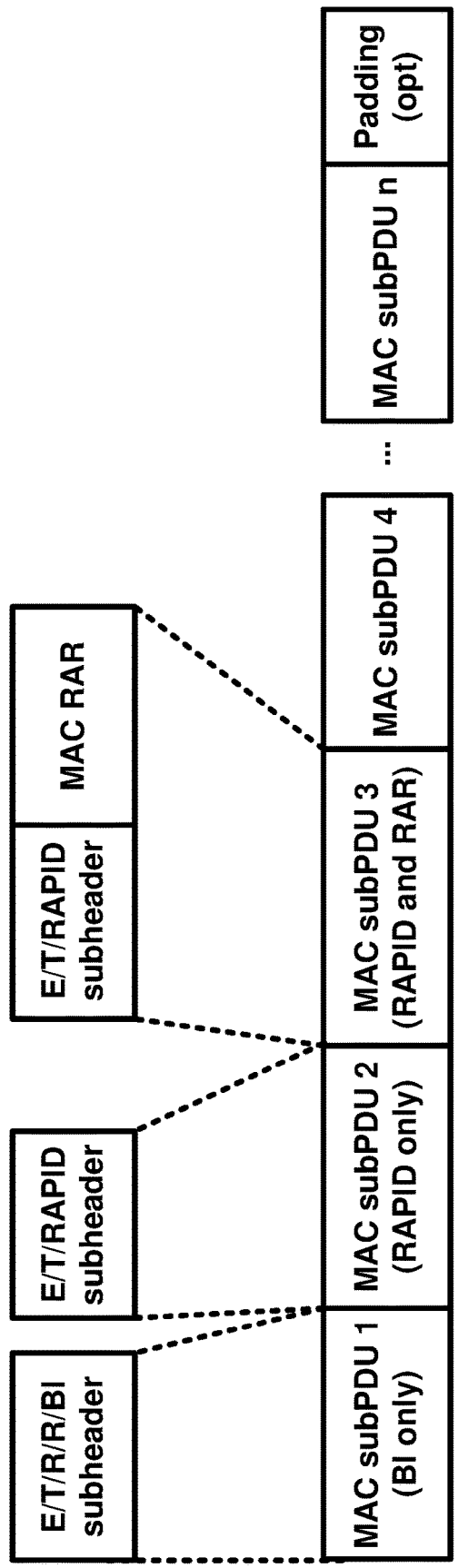
FIG. 19A is an example of an RAR as per an aspect of an example embodiment of the present disclosure.
Figure 19B:
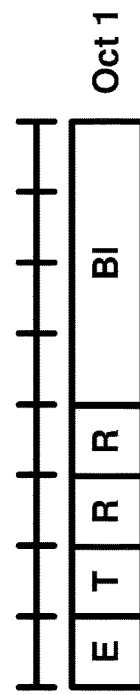
FIG. 19B is an example of a MAC subheader as per an aspect of an example embodiment of the present disclosure.

An RAR may be in a form of MAC PDU comprising one or more MAC subPDUs and/or optionally padding. FIG. 19A is an example of an RAR as per an aspect of an example embodiment of the present disclosure. A MAC subheader may be octet aligned. Each MAC subPDU may comprise at least one of following: a MAC subheader with Backoff Indicator only; a MAC subheader with RAPID only (i.e. acknowledgment for SI request); a MAC subheader with RAPID and MAC RAR. FIG. 19B is an example of a MAC subheader with backoff indicator. For example, a MAC subheader with backoff indicator comprise one or more header fields, e.g., E/T/R/R/BI as described in FIG. 19B. A MAC subPDU with backoff indicator may be placed at the beginning of the MAC PDU, for example, if the MAC subPDU comprises the backoff indicator. MAC subPDU(s) with RAPID only and MAC subPDU(s) with RAPID and MAC RAR may be placed anywhere after MAC subPDU with Backoff Indicator and, if exist before padding as described in FIG. 19A. A MAC subheader with RAPID may comprise one or more header fields, e.g., E/T/RAPID as described in FIG. 19C. Padding may be placed at the end of the MAC PDU if present. Presence and length of padding may be implicit based on TB size, size of MAC subPDU(s).

In an example, one or more header fields in a MAC subheader may indicate as follow: an E field may indicate an extension field that may be a flag indicating if the MAC subPDU including this MAC subheader is the last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU; a T filed may be a flag indicating whether the MAC subheader contains a Random Access Preamble ID or a Backoff Indicator (one or more backoff values may predefined and BI may indicate one of backoff value). The T field may be set to "0" to indicate the presence of a Backoff Indicator field in the subheader (BI). The T field may be set to "1" to indicate the presence of a Random Access Preamble ID field in the subheader (RAPID); an R filed may indicate a reserved bit that may be set to "0"; a BI field may be a backoff indicator field that identifies the overload condition in the cell. The size of the BI field may be 4 bits; an RAPID field may be a Random Access Preamble IDentifier field that may identify the transmitted Random Access Preamble. The MAC subPDU may not comprise a MAC RAR, for example, if the RAPID in the MAC subheader of a MAC subPDU corresponds to one of the Random Access Preambles configured for SI request.

Figure 20:
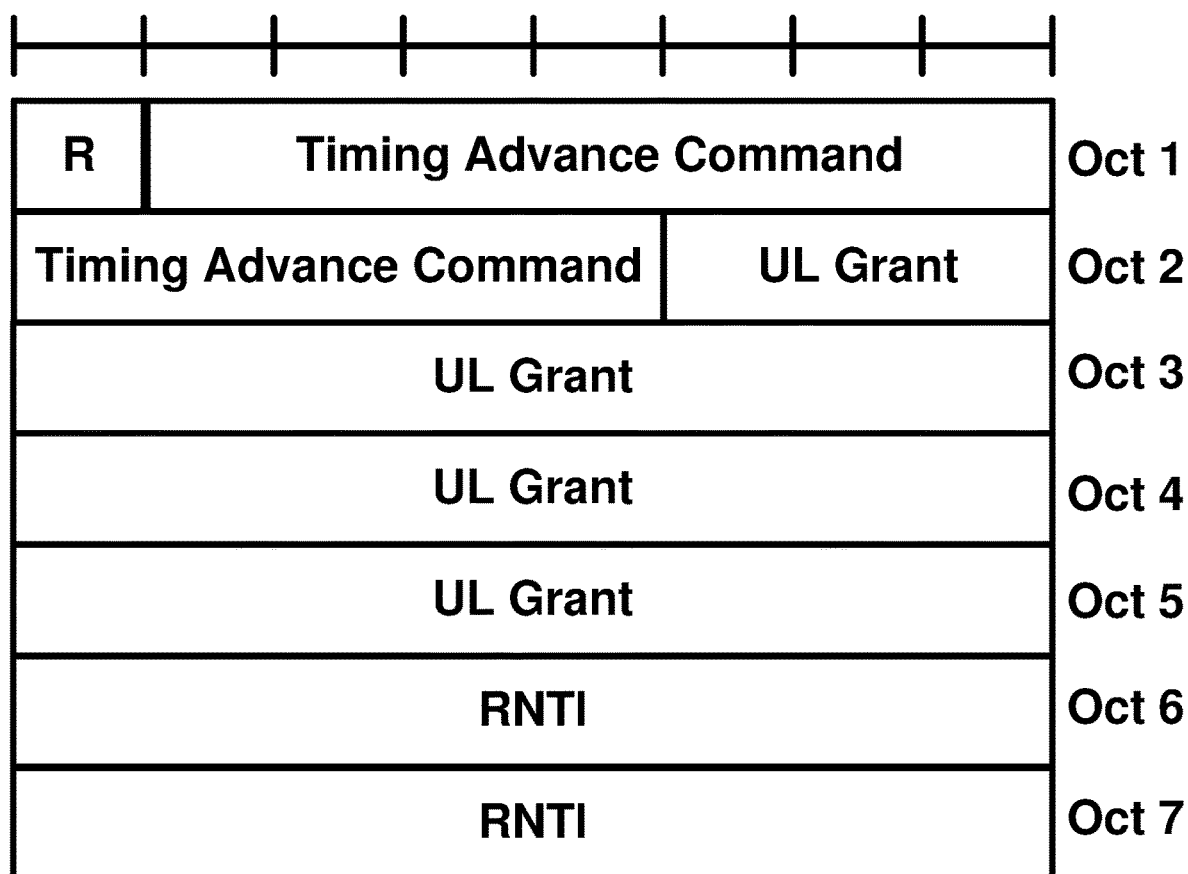
FIG. 20 is an example of MAC RAR format as per an aspect of an example embodiment of the present disclosure.

There may be one or more MAC RAR format. At least one of following MAC RAR format may be employed in a four-step or a two-step RA procedure. For example, FIG. 20 is an example of one of MAC RAR formats as per an aspect of an example embodiment of the present disclosure. The MAC RAR may be fixed size as depicted in FIG. 20 and may comprise at least one of the following fields: an R field that may indicate a Reserved bit, set to "0" or "1"; a Timing Advance Command field that may indicate the index value TA employed to control the amount of timing adjustment; a UL Grant field that indicate the resources to be employed on the uplink; and an RNTI field (e.g., Temporary C-RNTI and/or C-RNTI) that may indicate an identity that is employed during Random Access. For example, for a two-step RA procedure, an RAR may comprise at least one of following: a UE contention resolution identity, an RV ID for retransmission of one or more TBs, decoding success or failure indicator of one or more TB transmission, and one or more fields shown in FIG. 20.

Figure 21:
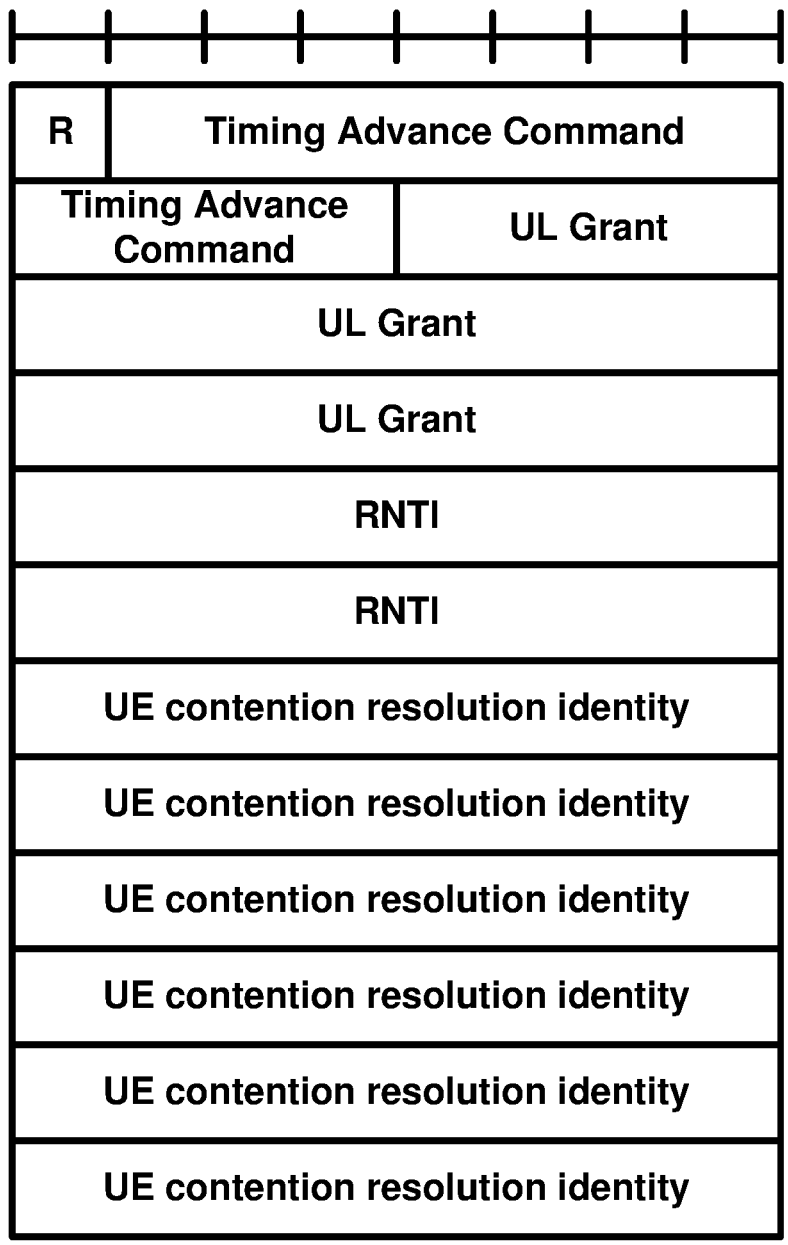
FIG. 21 is an example RAR format as per an aspect of an example embodiment of the present disclosure.

There may be a case that a base station may multiplex, in a MAC PDU, RARs for two-step and four-step RA procedures. A wireless device may not require an RAR length indicator field and/or the wireless device may determine the boundary of each RAR in the MAC PDU based on predetermined RAR size information, e.g., if RARs for two-step and four-step RA procedure have the same size. FIG. 21 is an example RAR format as per an aspect of an example embodiment of the present disclosure. For example the example RAR format may be employed in a MAC PDU multiplexing an RAR for two-step and an RAR four-step RA procedures. The RAR shown in FIG. 21 may be a fixed size using the same format for two-step and four-step RA procedures. A wireless device may use (parse, interpret, or determine) a bit string (e.g., 6 octets) of the field for UE contention resolution identity in FIG. 21 differently depending on a type of RA procedure. For example, a wireless device initiating a two-step RA procedure identifies whether a contention resolution is successful (e.g., is resolved or made) or not based on the bit string, e.g., by comparing a contention resolution identifier with the bit string (e.g., 6 octets) of the field for UE contention resolution identity. For example, a wireless device initiating a four-step RA procedure uses (parses, interprets, or determines) a bit string (e.g., 6 octets) differently, e.g., other than a contention resolution purpose. For example, in this case, the bit string may indicate another UL grant for additional one or more Msg3 1313 transmission opportunities, padding bits, etc.

In an example, an RAR for a two-step RA procedure may have formats, sizes, and/or fields different from an RAR for a four-step RA procedure. For example, FIG. 22A, and FIG. 22B are example RAR formats that may be employed for a two-step RA procedure as per an aspect of an example embodiment of the present disclosure. An RAR may comprise a field (e.g., a reserved "R" field as shown in FIG. 21, FIG. 22A, and FIG. 22B) indicating a type of RAR or a length of RAR, e.g., if one or more RAR are (e.g., RARs for two-step and four-step RA procedures) are multiplexed into a MAC PDU, and the RARs have different formats between multiplexed RARs (e.g., between two-step RA procedure and/or between two-step and four-step RA procedure). A field for indicating an RAR type (or length) may be in a subheader (such as a MAC subheader), in an MAC RAR, or in a separate MAC subPDU in the RAR (e.g., like MAC subPDU 1 and/or MAC subPDU 2 in FIG. 19A, there may be another MAC subPDU indicating the RAR type (or length)). An RAR may comprise different types of fields that may correspond with an implicit and/or explicit indicator in a subheader or in an RAR. A wireless device may determine the boundary of one or more RARs in a MAC PDU based on one or more indicators.

There may be a random access response window where a wireless device may monitor a downlink control channel for a random access response transmitted from a base station as a response to a preamble received from the wireless device. For example, a base station may transmit a message comprising a value of an RAR window. For example, a cell-common or wireless device specific random access configuration parameters (e.g., RACH-ConfigGeneric, RACH-ConfigCommon, RACH-ConfigDedicated, or ServingCellConfig) in the message indicates a value of an RAR window (e.g., ra-ResponseWindow). For example, the value of an RAR window is fixed, for example, to 10 ms or other time value. For example, the value of an RAR window is defined in terms of a number of slots as shown in RACH-ConfigGeneric. A wireless device may identify (or determine) a size (e.g., absolute time duration, and/or length) of an RAR window based on a numerology configured for a random access procedure. For example, a numerology defines one or more system parameters such as subcarrier spacing, slot duration, cyclic prefix size, number of OFDM symbol per slot, number of slots per frame, number of slots per subframe, minimum number of physical resource blocks, and/or maximum number of physical resource blocks. For example, the one or more system parameters associated with a numerology may be predefined with different subcarrier spacing, slot duration, and/or cyclic prefix size. For example, a wireless device may identify a subcarrier spacing 15 kHz, normal cyclic prefix, 14 symbols per slot, 10 slots per frame, and/or 1 slot per subframe for the numerologies=0. For example, a wireless device may identify a subcarrier spacing 30 kHz, normal cyclic prefix, 14 symbols per slot, 20 slots per frame, and/or 2 slot per subframe for the numerologies=1. For example, a wireless device may identify a subcarrier spacing 60 kHz, 14 symbols per slot, 40 slots per frame, and/or 4 slot per subframe for the numerologies=2 with normal cyclic prefix. For example, a wireless device may identify a subcarrier spacing 60 kHz, 12 symbols per slot, 40 slots per frame, and/or 4 slot per subframe for the numerologies=2 with extended cyclic prefix. For example, a wireless device may identify a subcarrier spacing 120 kHz, normal cyclic prefix, 14 symbols per slot, 80 slots per frame, and/or 8 slot per subframe for the numerologies=3. For example, a wireless device may identify a subcarrier spacing 240 kHz, normal cyclic prefix, 14 symbols per slot, 160 slots per frame, and/or 16 slot per subframe for the numerologies=4.

A wireless device may determine (or identify) a size (e.g., duration or length) of the RAR window based on a configured RAR window value and a numerology. For example, the RAR window has a duration of 20 ms, e.g., if the configured RAR window value is sl20 (e.g., 20 slots) and the numerology is $\mu=0$ (e.g., slot duration for $\mu=0$ is 1 ms). In an example, a particular RAR window value (e.g., ra-ResponseWindow) configured by an RRC message (e.g., broadcast and/or wireless specific unicast) may be associated with a particular numerology. For example, in RACH-ConfigGeneric, sl10, sl20, sl40, and sl80 may be values of ra-ResponseWindow for numerologies $\mu=0$, $\mu=1$, $\mu=2$, and $\mu=3$, respectively. In an example, a base station configures a wireless device a particular RAR window value independent of a numerology. In an licensed band, a size (e.g., duration or length) of an RAR window may not be longer than 10 ms (and/or a periodicity of PRACH occasion). In an unlicensed band, a duration (e.g., size or length) of an RAR window may be longer than 10 ms (and/or a periodicity of PRACH occasion).

A wireless device may perform one or more retransmission of one or more preambles during a random access procedure (e.g., two-step RA procedure and/or four-step RA procedure). There may be one or more conditions at least based on which the wireless device determines the one or more retransmission of one or more preambles. The wireless device may determine the one or more retransmission of one or more preambles, e.g., when the wireless device determines that a random access response reception is not successful. The wireless device may determine that a random access response reception is not successful, e.g., if at least one random access response comprising one or more random access preamble identifiers that matches the transmitted PREAMBLE_INDEX has not been received until an RAR window (e.g., ra-ResponseWindow configured by RRC such as RACH-ConfigCommon IE) expires. The wireless device may determine that a random access response reception is not successful, for example, if a PDCCH addressed to the C-RNTI has not been received on the Serving Cell where the preamble was transmitted until a RAR window for a beam failure recovery procedure (e.g., ra-ResponseWindow configured in BeamFailureRecoveryConfig) expires.

A wireless device may determine the one or more retransmission of one or more preambles, e.g., when the wireless device determines that a contention resolution is not successful. For example, the wireless device may determine, based on Msg 3 1313 for four-step RA procedure and/or MsgB 1332 for two-step RA procedure, whether the contention resolution is successful or not.

For example, a MAC entity of the wireless device may start a contention resolution timer (e.g., ra-ContentionResolutionTimer) and may restart the contention resolution timer (e.g., ra-ContentionResolutionTimer) at each HARQ retransmission in the first symbol after the end of a Msg3 transmission, for example, once a wireless device transmits, to a base station, Msg3 1313. A wireless device may determine that a contention resolution is not successful, for example, if the wireless device does not receive an indication of a contention resolution while a contention resolution timer (e.g., ra-ContentionResolutionTimer) is running. For example, the wireless device may determine that a contention resolution is not successful, for example, if the indication of the contention resolution has not been received until the contention resolution timer (e.g., ra-ContentionResolutionTimer) expires. The wireless device may discard a TEMPRARY_C-RNTI indicated by an Msg2 1312 (or Msg B 1332) after or in response to an expiry of the contention resolution timer (and/or in response to a determination of the contention resolution being unsuccessful).

For a two-step RA procedure, a wireless device may start a timer (e.g., RAR window, MsgB window, or contention resolution timer), e.g., after or in response to transmitting Transport block 1342 comprising a contention resolution identifier of the wireless device. The wireless device may determine that the one or more retransmission of MsgA 1331 (e.g., Preambles 1341 and/or Transport block 1342), e.g., if at least one Msg B comprising the contention resolution identifier that the wireless device transmit has not been received until the timer expires. For example, for two-step RA procedure, a wireless device may fallback to four-step RA procedure based on an explicit and/or implicit indication of MsgB. For example, if MsgB received by the wireless device comprises such explicit indication and/or an RNTI used for detecting a PDCCH scheduling the MsgB is a particular RNTI (e.g., RA-RNTI or MsgB RNTI), the wireless device may determine to fallback to the four-step RA procedure. The wireless device may transmit Msg3, e.g., after or in response to determining the fallback to the four-step RA procedure via resource(s) indicated by UL grant in Msg B. In this case the wireless device may follow the four-step RA procedure, e.g., starting the contention resolution timer, and/or determining whether the contention resolution is successful or not. The wireless device may monitor a PDCCH while the contention resolution timer (e.g., ra-ContentionResolutionTimer) is running. The wireless device may restart the contention resolution timer (e.g., ra-ContentionResolutionTimer) at each HARQ retransmission in the first symbol after the end of a Msg3 transmission. For example, the wireless device may determine that a contention resolution is not successful, for example, if the indication of the contention resolution has not been received until the contention resolution timer (e.g., ra-ContentionResolutionTimer) expires. The wireless device may discard a TEMPRARY_C-RNTI indicated by an Msg2 1312 (or Msg B 1332) after or in response to an expiry of the contention resolution timer (and/or in response to a determination of the contention resolution being unsuccessful). The wireless device that determines the retransmission during a four-step RA procedure falling back from a two-step RA procedure may perform a retransmission of MsgA 1331. The wireless device that determines the retransmission during a four-step RA procedure falling back from a two-step RA procedure may perform a retransmission of Msg1 1311. A wireless device may stop the contention resolution timer and determine that a contention resolution is successful, for example, if a notification of a reception of a PDCCH transmission of a cell (e.g., SpCell) is received from lower layers, and the wireless device identifies that the PDCCH transmission is an indication of a contention resolution corresponding to a Msg3 transmission (or MsgB transmission) that the wireless device performed.

A wireless device may maintain (e.g., increment) a counter counting a number of preamble transmissions (e.g., PREAMBLE_TRANSMISSION_COUNTER) by a value of counter step (e.g., by 1), for example, after or in response to a random access response reception being unsuccessful and/or after or in response to a contention resolution being unsuccessful. The wireless device may determine that a random access procedure is unsuccessfully completed and/or a MAC entity of the wireless device may indicate a random access problem to upper layer(s), for example, if the number of preamble transmissions may reach a predefined or semi-statically configured value, (e.g., if PREAMBLE_TRANSMISSION_COUNTER=preamble TransMax+1 where preambleTransMax is the predefined or semi-statically configured value). The wireless device may determine that a random access procedure is not completed and/or one or more retransmission of one or more Msg1 1311, Msg1 1321, or MsgA 1331 may be performed, for example, if the number of preamble transmissions does not reach the predefined or semi-statically configured value, (e.g., if PREAMBLE_TRANSMISSION_COUNTER<preamble TransMax+1).

A wireless device may delay a particular period of time (e.g., a backoff time) for performing a retransmission of one or more Msg1 1311, Msg1 1321, or MsgA 1331. For example, the wireless device may set the backoff time to 0 ms, for example, when a random access procedure is initiated. The wireless device may set (or update) the backoff time based on the PREAMBLE_BACKOFF determined by a value in a BI field of the MAC subPDU (e.g., BI field in FIG. 19B). A value (or a bit string) in a BI field may indicate a particular backoff time in a predefined or semi-statically configured table. For example, the wireless device may set the PREAMBLE_BACKOFF to a value indicated by the BI field of the MAC subPDU using the predefined or semi-statically configured table. For example, if the wireless device receives BI indicating index 3 (or 0010 in a bit string), the wireless device may set the PREAMBLE_BACKOFF to a value of row index 3 in the predefined or semi-statically configured table. For example, in FIG. 19B, the example format shows that four bits are allocated for the BI fields. In this case, there may be 16 values (e.g., each of 16 values is identified by a particular row index) in the predefined or semi-statically configured table. The wireless device may set the PREAMBLE_BACKOFF to a value indicated by the BI field of the MAC subPDU multiplied with a scaling factor, (e.g., SCALING_FACTOR_BI), for example, if the wireless device receives, from a base station, one or more RRC messages indicating the scaling factor. The wireless device may set (or update) the PREMABLE_BACKOFF based on a BI field, for example, if a downlink assignment has been received on the PDCCH for the RA-RNTI and the received TB is successfully decoded, and/or if the Random Access Response comprises a MAC subPDU with Backoff Indicator (BI in FIG. 19B). The wireless device may set the PREAMBLE_BACKOFF to 0 ms, for example, if a downlink assignment has not been received on the PDCCH for the RA-RNTI and/or the received TB is not successfully decoded, and/or if the Random Access Response does not comprise a MAC subPDU with Backoff Indicator (BI in FIG. 20B).

A wireless device may determine the backoff time, for example, if the wireless device determines that a random access response is not successful and/or a contention resolution is not successful. The wireless device may employ a particular selection mechanism to determine the backoff time. For example, the wireless device may determine the backoff time based on a uniform distribution between 0 and the PREAMBLE_BACKOFF. The wireless device may employ any type of distribution to select the backoff time based on the PREAMBLE_BACKOFF. The wireless device may ignore the PREAMBLE_BACKOFF (e.g., a value in BI field in FIG. 20B) and/or may not have a backoff time. For example, the wireless device may determine whether to apply the backoff time to a retransmission of at least one preamble based on an event type initiating the random access procedure (e.g., Beam Failure Recovery request, handover, etc.) and/or a type of the random access procedure (e.g., four-step or two-step RA and/or CBRA or CFRA). For example, the wireless device may apply the backoff time to the retransmission, for example, if the random access procedure is CBRA (e.g., where a preamble is selected by a MAC entity of the wireless device) and/or if the wireless device determines that a random access procedure is not completed based on a random access response reception being unsuccessful. For example, the wireless device may apply the backoff time to the retransmission, for example, if the wireless device determines that a random access procedure is not completed based on a contention resolution being unsuccessful.

A wireless device may perform a random access resource selection procedure (e.g., select at least one SSB or CSI-RS and/or select PRACH corresponding to at least one SSB or CSI-RS selected by the wireless device), for example, if the random access procedure is not completed. The wireless device may delay the subsequent random access preamble transmission (e.g., or delay to perform a random access resource selection procedure) by the backoff time.

A radio access technology may allow a wireless device to change (switch) a channel (a uplink carrier, BWP, and/or a sub-band) to transmit at least one preamble for a retransmission. This may increase a number of preamble transmission opportunities in an unlicensed band. For example, a base station may transmit, to a wireless device, one or more messages (broadcast messages, and/or RRC messages) indicating a configuration of the one or more channels (e.g., uplink carrier, BWPs and/or sub-bands) that one or more PRACH are configured. A wireless device may select one of the one or more channels (e.g., BWPs, and/or sub-bands) as a channel (e.g., a uplink carrier, BWP, and/or a subband) to transmit at least one first preamble. The wireless device may select the channel (e.g., uplink carrier, BWP, and/or sub-band) based on an LBT result. For example, the wireless device performs one or more LBTs on one or more channels, and select the channel among the channel(s) being sensed as idle. The wireless device may select the one of channels being sensed as idle based on, for example, a random selection. There may be a case that switching a channel for a retransmission is not allowed (e.g., this indication may be predefined or semi-statically informed).

A wireless device may determine the transmit power of the retransmission of at least one preamble (or MsgA) based PREAMBLE_POWER_RAMPING_COUNTER. For example, the wireless device may set PREAMBLE_POWER_RAMPING_COUNTER to an initial value (e.g., 1) as an random access procedure initialization. The MAC entity of the wireless device may, e.g., for each Random Access Preamble and/or for each transmission of at least one preamble transmitted, for example, after or in response to determining a random access reception being unsuccessful and/or a contention resolution being unsuccessful, increment PREAMBLE_POWER_RAMPING_COUNTER by a value of a counter step predefined or semi-statically configured by a base station. For example, The MAC entity of the wireless device may increment PREAMBLE_POWER_RAMPING_COUNTER by 1, e.g., if PREAMBLE_TRANSMISSION_COUNTER is greater than one; if the notification of suspending power ramping counter has not been received from lower layers (e.g., the notification is received in response to a preamble transmissions being dropped due to LBT failure and/or in response to a spatial filter is changed); and/or if SSB or CSI-RS selected is not changed from the selection in the last Random Access Preamble transmission. The wireless device may determine a value of DELTA_PREAMBLE based on a preamble format and/or numerology selected for the random access procedure (e.g., one or more values of DELTA_PREAMBLE are predefined associated with one or more preamble format and/or numerology. For a given preamble format and a numerology, the wireless device may select a particular value of DELTA_PREAMBLE from the one or more values.). The wireless device may determine PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP. The MAC layer of the wireless device may instruct the physical layer to transmit the Random Access Preamble based on a selected PRACH occasion, corresponding RA-RNTI (e.g., if available), PREAMBLE_INDEX and/or PREAMBLE_RECEIVED_TARGET_POWER.

For a two-step RA procedure, MsgA (or Transport Block) may comprise a common control channel (CCCH) SDU. For example, a transmission of the Transport Block is made for the CCCH logical channel. For example, the wireless device may transmit, to a base station via the CCCH, an RRC (re)establishment request, an RRC setup request, and/or an RRC resume request. The wireless device may start monitor a downlink control channel (e.g., a PDCCH) with the first RNTI (e.g., MsgB RNTI). The received PDCCH via the downlink control channel indicates a downlink assignment of a PDSCH (e.g., MAC PDU) comprising MsgB. In this case, the MsgB (or the PDSCH (e.g., MAC PDU) comprising the MsgB) that the wireless device receives based on the downlink assignment may comprise signalling radio bearer(s) (SRB(s)) RRC message(s). The SRB RRC message may comprise RRC (re)establishment, an RRC setup, and/or an RRC resume as responses of the RRC (re)establishment request, an RRC setup request, and/or an RRC resume request, respectively, that the wireless device transmits via MsgA (or Transport Block).

For the case that MsgA (or Transport Block) comprises a common control channel (CCCH) SDU, an MAC PDU (or a PDSCH) may multiplex one or more MsgBs for one or more wireless devices. The MAC PDU may multiplex one or more MsgBs indicating a success of MsgA only. The MAC PDU may multiplex one or more MsgBs indicating a failure (e.g., fallback response) of MsgA only. The MAC PDU may multiplex a plurality of MsgBs comprising one or more responses indicating a success of MsgA and/or one or more responses indicating a failure of MsgA (e.g., fallback RAR). The MAC PDU may comprise at least one Backoff Indication. For a MsgB indicating a success of MsgA, the MsgB may comprise at least one of following: a contention resolution identifier (that is matched to an identifier that the wireless device transmits via MsgA), a C-RNTI, and/or a TA command. For a MsgB indicating a failure of MsgA (e.g., fallback RAR), the MsgB may comprise at least one of following: an RAPID, a UL grant (e.g., to retransmit the MsgA payload), a TC-RNTI, and/or TA command. For example, upon receiving the MsgB indicating a failure of MsgA (e.g., fallback RAR), the wireless device may proceed to Msg3 transmission of four-step RACH procedure (e.g., in FIG. 13A). For example, the Msg3 that the wireless device transmit as a part of fallback procedure, comprises the CCCH SDU transmitted via MsgA. The MAC PDU comprising a MsgB indicating a success of MsgA may not be multiplexed with a four-step RACH RAR (e.g., Msg 2).

Figure 19C:
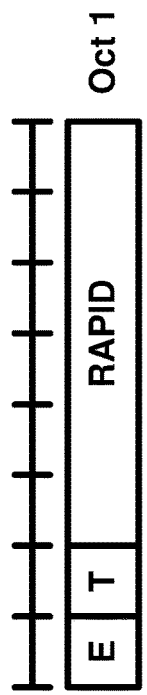
FIG. 19C is an example of an RAR as per an aspect of an example embodiment of the present disclosure.

For a two-step RA procedure, a wireless device may determine, at least based on a C-RNTI, whether a contention resolution is successful or not and/or whether Msg B is received successfully or not. The wireless device may transmit, to a base station, MsgA comprising a C-RNTI (e.g., C-RNTI MAC CE), e.g., if exists. For example, the wireless device receives, from the base station, a message comprising the C-RNTI prior to or before transmission of the MsgA. The MsgA (or Transport block of Msg A) may comprise a C-RNTI MAC CE indicating the C-RNTI to the base station. The wireless device may start to monitor a downlink control channel for Msg B with one or more RNTIs, e.g., after or in response to transmitting the MsgA (Transport block of Msg A). For example, the wireless device may monitor a downlink control channel (e.g., PDCCH) with one or more RNTIs, after or in response to transmitting the MsgA indicating the C-RNTI (e.g., C-RNTI MAC CE). The one or more RNTIs comprises the C-RNTI. The one or more RNTIs comprises a first RNTI (e.g., MsgB-RNTI) that may be determined (or calculated) based on uplink radio resources used for Msg A transmission. For example, the first RNTI is an RA-RNTI. For example, the first RNTI is the one determined based on uplink radio resources used for Preamble and/or Transport block. For example, the uplink radio resources comprise time (e.g., in terms of any combination of OFDM symbol, slot number, subframe number, and/or SFN) and/or frequency indexes of PRACH occasion (for Preamble transmission), a preamble identifier of Preamble, time (e.g., in terms of any combination of OFDM symbol, slot number, subframe number, SFN, and/or time offset with respect to associated PRACH occasion) and/or frequency indexes PUSCH occasion (for Transport block transmission), and/or DMRS index(es) (e.g., DMRS port identifier(s)) of the PUSCH occasion (for Transport block transmission). For example, the wireless device may monitor PDCCH(s) addressed to C-RNTI for a success response of MsgA and monitor PDCCH(s) addressed to the first RNTI (e.g., MsgB-RNTI) for a failure (or fallback) response of MsgA. The wireless device may start a timer (e.g., contention resolution timer) and/or monitor a downlink control channel during the timer is running. For example, the timer may be determine how long (e.g., a particular time interval or a period of time) the wireless device monitors the downlink control channel for receiving a response (e.g., a success response and/or a fallback response) from a base station, after or in response to transmitting MsgA. The wireless device may stop monitoring the downlink channel, e.g., if the wireless device receives at least one response, e.g., PDCCH addressed to C-RNTI and/or PDCCH addressed to the first RNTI). The wireless device may determine that a contention resolution is successful based on one or more conditions. For example, the wireless device determine that a contention resolution is successful, e.g., if a PDCCH addressed to the C-RNTI (i.e. C-RNTI included in MsgA) detected, and a PDSCH indicated by the PDCCH (e.g., downlink assignment of DCI) comprises a TA command (e.g., MAC CE comprising one or more bits that indicates Timing Advanced Command). For example, the wireless device determine that a contention resolution is successful, e.g., if a PDCCH addressed to the C-RNTI (i.e. C-RNTI included in MsgA) detected, and a PDSCH indicated by the PDCCH (e.g., downlink assignment of DCI) comprises a UL grant (e.g., if the UE is synchronized already). The wireless device may stop monitoring the PDCCH (e.g., for Msg B, for a success response, and/or for a fallback response). The PDCCH addressed to the C-RNTI may be an indication of a success response (e.g., MsgB). For example, the wireless device stops the monitoring of PDCCH addressed to the C-RNTI, e.g., if the wireless device receives a fallback response (e.g., RAR). In this case, the contention resolution is not successful, and the wireless device may fallback to Msg3 transmission based on fallback operation. The wireless device may identify the fallback response based on a PDCCH addressed to the first RNTI (e.g., MsgB RNTI). For example, while the wireless device monitors the PDCCH, the wireless device detects the PDCCH addressed to the first RNTI (e.g., MsgB RNTI). The PDCCH (e.g., DCI with a downlink assignment) may comprise a downlink assignment based on which the wireless device receives a PDSCH comprising the fallback response. The PDSCH may comprise one or more responses. The wireless device identifies a response from the one or more responses based on one or more identifiers. For example, the wireless device identifies a response from the one or more responses, e.g., if an identifier of the response is matched to a preamble index of Preamble that the wireless device transmits. The response may comprise an UL grant indicating uplink radio resource(s) where the wireless device transmit Msg3 based on the fallback operation. FIG. 19A (e.g. with FIG. 19B and FIG. 19C) is an example format of PDU of the PDSCH received based on the first RNTI. For example, RAPID in FIG. 19C is an example identifier based on which the wireless device identifies its corresponding response (e.g., MAC RAR in FIG. 19A) for a fallback response. The wireless device may determine MsgB reception (or contention resolution or MsgA transmission attempt) is failed, e.g., if neither fallback response nor PDCCH addressed C-RNTI is detected within the timer (e.g., contention resolution timer). The wireless device, in this case, may do back off operation based on the backoff indicator (e.g., FIG. 19B), e.g., if received in MsgB.

Figure 23:
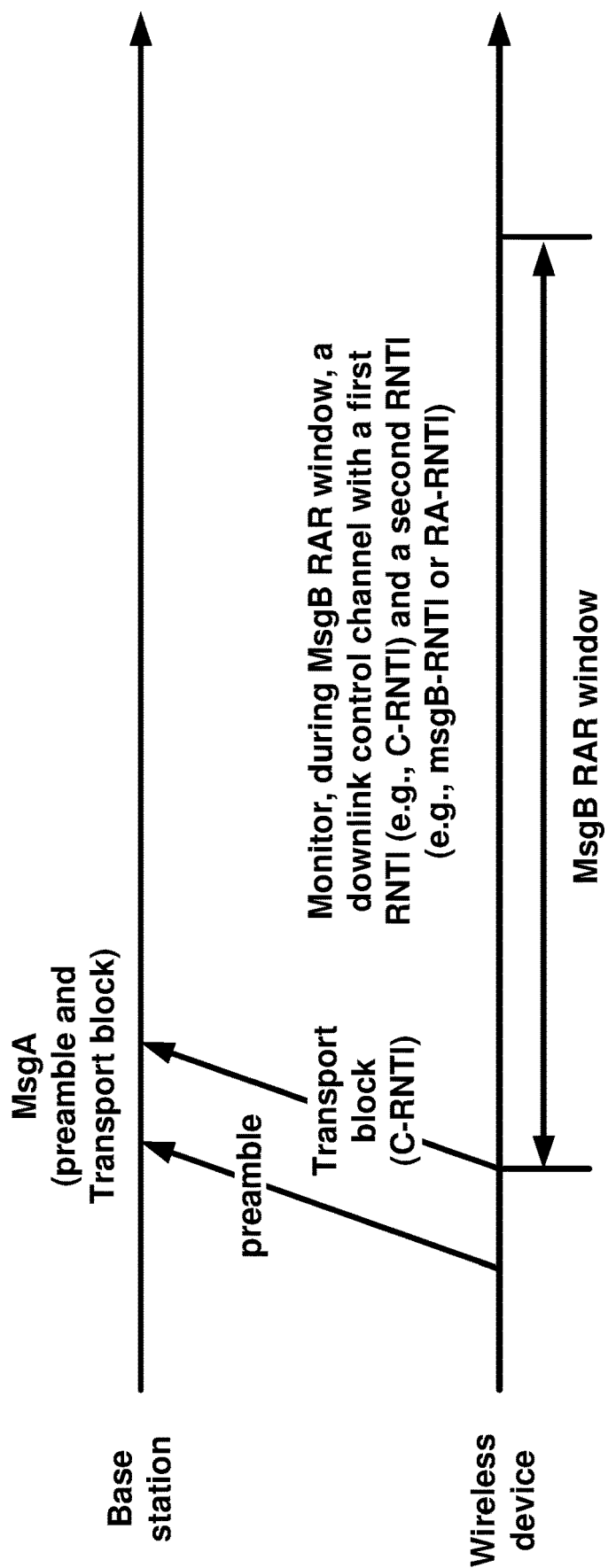
FIG. 23 is an example diagram illustrating a two-step RA procedure as per an aspect of an example embodiment of the present disclosure.

FIG. 23 is an example diagram illustrating a two-step RA procedure as per an aspect of an example embodiment of the present disclosure. The wireless device may receive, from a base station, a message comprising C-RNTI. The wireless device that has the C-RNTI may transmit, to the base station, the C-RNTI (e.g., C-RNTI MAC CE indicating the C-RNTI)

via MsgA during the two-step RA procedure. For example, during the two-step RA procedure, the wireless device may transmit MsgA comprising a first transmission of a preamble and a second transmission of a transport block. The transport block may comprise the C-RNTI (e.g., C-RNTI MAC CE indicating the C-RNTI). The wireless device that transmits the C-RNTI (e.g., C-RNTI MAC CE indicating the C-RNTI) via the MsgA may start to monitor a downlink control channel with a plurality of RNTIs. The plurality of RNTIs may comprise the C-RNTI. The plurality of RNTIs may comprise MsgB-RNTI. The plurality of RNTIs may comprise RA-RNTI. The wireless device may determine MsgB-RNTI and/or RA-RNTI based on radio resources (e.g., in terms of time (e.g. OFDM symbol, slot, subframe, and/or SFN numbers) and/or frequency indices) used for the first transmission and/or the second transmission. The preamble index and/or DMRS port index used for the second transmission may be also used for the wireless device to determine the MsgB-RNTI and/or RA-RNTI. The wireless device may start a MsgB RAR window (or a timer) after or in response to transmitting the MsgA (or Transport block). The wireless device may monitor the control channel during the MsgB RAR window or while the timer is running. The wireless device may stop monitoring, e.g., if the wireless device may receive, via the downlink control channel during the MsgB RAR window or while the timer is running, at least one PDCCH addressed to the C-RNTI and/or MsgB-RNTI (or RA-RNTI).

FIG. 24A and FIG. 24B are example diagrams of a two-step RA procedure as per an aspect of an example embodiment of the present disclosure. The wireless device that has the C-RNTI may transmit, to the base station, the C-RNTI (e.g., C-RNTI MAC CE indicating the C-RNTI) via MsgA during the two-step RA procedure. The wireless device may start a MsgB RAR window (or a timer) after or in response to transmitting the MsgA (or Transport block). The wireless device may monitor the control channel during the MsgB RAR window or while the timer is running. The wireless device that transmits the C-RNTI (e.g., C-RNTI MAC CE indicating the C-RNTI) via the MsgA may monitor a downlink control channel with C-RNTI and/or MsgB-RNTI (or RA-RNTI). The wireless device may stop monitoring, e.g., if the wireless device may receive, via the downlink control channel during the MsgB RAR window or while the timer is running, at least one PDCCH addressed to the C-RNTI and/or MsgB-RNTI (or RA-RNTI).

FIG. 24A is an example diagram showing that the wireless device receives, via the downlink control channel, a PDCCH addressed to C-RNTI. The wireless device that transmits the C-RNTI (e.g., C-RNTI MAC CE indicating the C-RNTI) via the MsgA may monitor a downlink control channel with C-RNTI and/or MsgB-RNTI (or RA-RNTI). The wireless device may stop monitoring the downlink control channel with the C-RNTI and/or MsgB-RNTI (or RA-RNTI), e.g., after or in response to receiving the PDCCH addressed to C-RNTI. The detected PDCCH may comprise a DCI comprising a downlink assignment based on which the wireless device may receive a PDSCH (e.g., MAC PDU). The received PDSCH (or MAC PDU) may comprise a TA command (e.g., TA command MAC CE). The wireless device may stop monitoring the downlink control channel with the C-RNTI and/or MsgB-RNTI (or RA-RNTI), e.g., after or in response to receiving the PDCCH addressed to C-RNTI and/or the corresponding PDSCH (or MAC CE) comprising the TA command. In this case the wireless device may determine that the two-step RA procedure completes successfully, a reception of MsgB is successful, and/or a contention resolution completes successfully.

FIG. 24B is an example diagram showing that the wireless device receives, via the downlink control channel, a PDCCH addressed to MsgB-RNTI (or RA-RNTI). The wireless device that transmits the C-RNTI (e.g., C-RNTI MAC CE indicating the C-RNTI) via the MsgA may monitor a downlink control channel with C-RNTI and/or MsgB-RNTI (or RA-RNTI). The wireless device may stop monitoring the downlink control channel with the C-RNTI and/or MsgB-RNTI (or RA-RNTI), e.g., after or in response to receiving the PDCCH addressed to MsgB-RNTI (or RA-RNTI). The detected PDCCH may comprise a DCI indicating a downlink assignment based on which the wireless device may receive a PDSCH (e.g., MAC PDU). The received PDSCH (or MAC PDU) may comprise one or more RARs (e.g., one or more MsgBs). The wireless device may stop monitoring the downlink control channel with the C-RNTI and/or MsgB-RNTI (or RA-RNTI), e.g., after or in response to receiving the PDCCH addressed to C-RNTI and/or the corresponding PDSCH (or MAC PDU) comprising the one or more RARs (e.g., one or more MsgBs). The wireless device may identify an RAR (e.g., MsgB) corresponding to the MsgA based on a preamble identifier matched to the preamble. For example, the RAR (e.g., MsgB) may comprise at least one preamble identifier. The wireless device may determine that an RAR (e.g., MsgB) in the PDSCH (or MAC PDU) corresponds to the MsgA, e.g., if a preamble identifier of the RAR (e.g., MsgB) matches to the preamble that the wireless device transmits to the base station via the MsgA. The wireless device may stop monitoring the downlink control channel with the C-RNTI and/or MsgB-RNTI (or RA-RNTI), e.g., after or in response to identifying the RAR (e.g., MsgB) from the PDSCH (or MAC PDU) based on the preamble identifier. The RAR may indicate a fallback to Msg3 transmission of a four-step RA procedure. For example, the RAR may comprise a UL grant and a TA command. The wireless device may transmit Msg3 via radio resource(s) indicated by the UL grant with a UL transmission timing adjusted based on the TA command. The Msg3 may comprise at least a portion of transport block. For example, the Msg3 the transport block may be the same. For example, the Msg3 may comprise the C-RNTI.

Figure 25:
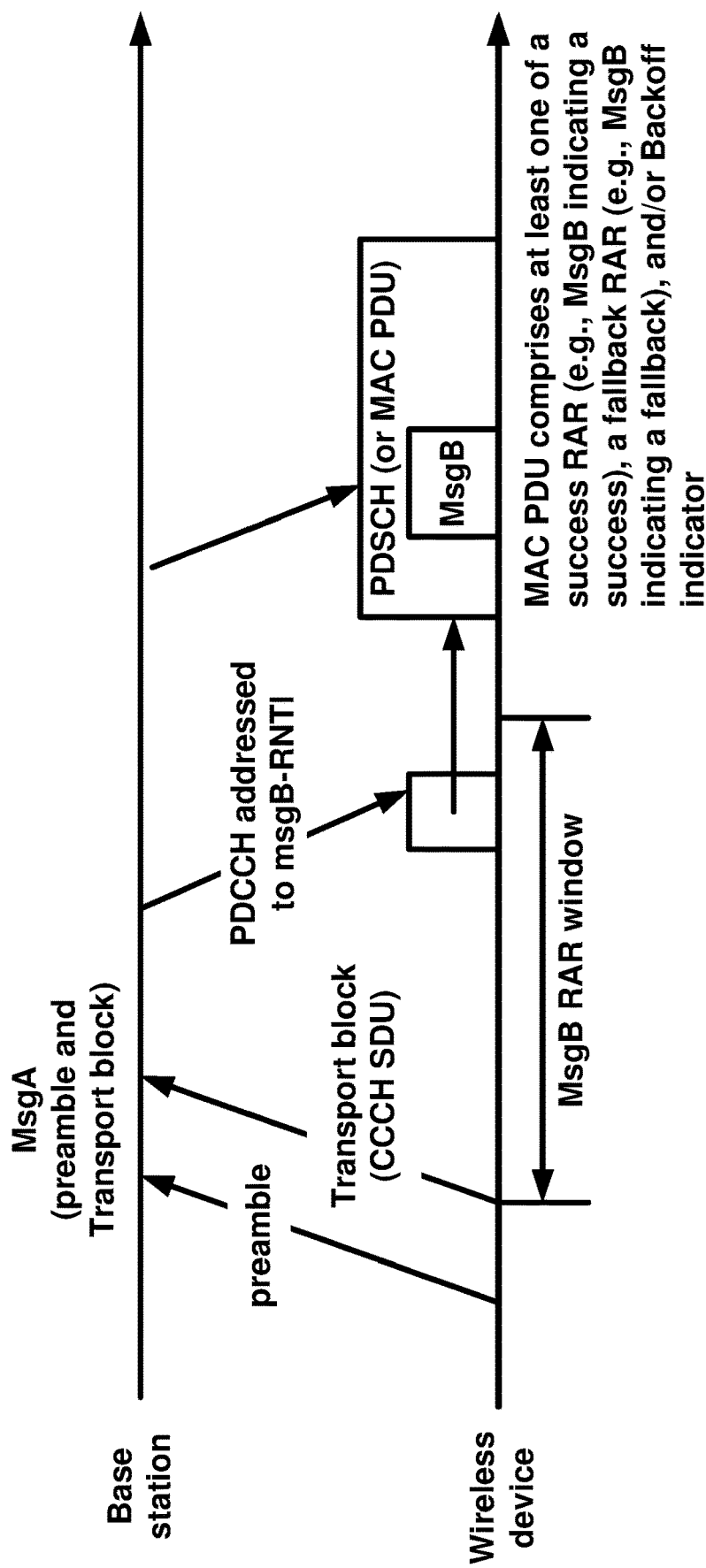
FIG. 25 is an example diagram showing an two-step RA procedure as per an aspect of an example embodiment of the present disclosure.

FIG. 25 is an example diagram showing an two-step RA procedure as per an aspect of an example embodiment of the present disclosure. The wireless device may transmit a MsgA comprising a first transmission of a preamble and a second transmission of a transport block. The transport block may comprise CCCH SDU. The CCCH SDU may comprise an RRC (re)establishment request, an RRC setup request, and/or an RRC resume request. The wireless device that transmits the CCCH SDU via MsgA may not receive a C-RNTI from a base station prior to transmitting the MsgA. The wireless device may start to monitor a downlink control channel with a particular RNTI. The wireless device may start a MsgB RAR window or a timer, e.g., after or in response to transmitting the MsgA (or Transport block). The wireless device may monitor the control channel during a period of time (predefined or semi-statically configured), during the MsgB RAR window. The particular RNTI may be referred to as MsgB-RNTI or RA-RNTI. The wireless device may determine the particular RNTI based on radio resources (e.g., in terms of time (e.g., OFDM symbol, slot, subframe, and/or SFN numbers) and/or frequency indices) of the first transmission (e.g., for the preamble) and/or the second transmission (e.g., for the transport block). The preamble index and/or DMRS port index may be also used for the wireless device to determine the particular RNTI. The wireless device may detect and/or receive, during the MsgB RAR window (or while the timer is running), a PDCCH addressed to the particular RNTI. A DCI received via the PDCCH may comprise a downlink assignment that indicates a PDSCH reception. The DCI may be a particular DCI whose format is predefined. For example, the DCI is a DCI format 1_0 or DCI format 1_1. The wireless device may receive and/or decode the PDSCH based on the downlink assignment. A MAC entity of the wireless device may receive an MAC PDU from a physical layer of the wireless device. The physical layer may decode the PDSCH and sends the decoded data (e.g., the MAC PDU) to the MAC entity. The wireless device may identify a response (e.g., MsgB) of the MsgA from the MAC PDU. For example, the response may comprise a preamble identifier matched the preamble that the wireless device transmits to the base station via the MsgA. The response may be a success RAR. The response may be a fallback RAR. There may be an explicit or implicit indicator based on which the wireless device identifies whether the received/identified response is a success RAR or a fallback RAR. For example, there is a field (e.g., the explicit indicator) indicating a type (success or fallback) of RAR. For example, the wireless device may identify the type of RAR based on a format of received RAR. For example, the success RAR and the fallback RAR may comprise different type of and/or different size of one or more fields based on which the wireless device identifies the type of RAR.

In an example, a wireless device may transmit Preamble and Transport block of MsgA for a two-step RA procedure. The Transport block may comprise an RRC request (e.g., CCCH SDU). The RRC request (e.g., CCCH SDU) may comprise an RRC (re)establishment request, an RRC setup request, and/or an RRC resume request. The wireless device that transmits the RRC request (e.g., the CCCH SDU) via MsgA may not receive a C-RNTI from a base station prior to transmitting the MsgA. The Transport block (and/or the RRC request) may comprise a wireless device identifier that may be used for a contention resolution. The wireless device may receive MsgB (a PDSCH) as a response of the MsgA. The MsgB may comprise a response of the RRC request (e.g., CCCH SDU). For example, the MsgB (or the PDSCH (e.g., MAC PDU) comprising the MsgB) comprises an RRC message (e.g., SRB RRC message). The RRC message (e.g., SRB RRC message) may comprise RRC (re)establishment, an RRC setup, and/or an RRC resume as responses of the RRC (re)establishment request, an RRC setup request, and/ or an RRC resume request, respectively, that the wireless device transmits via MsgA (or Transport Block).

In an example, the RRC message (e.g., SRB RRC message) requires a large size of message bits to be transmitted. A base station may not multiplex (or may multiplex a limited number of) one or more MsgBs for different wireless devices, e.g., if a MsgB comprises the RRC message (e.g., SRB RRC message). For example, MsgB received by a wireless device from a base station as a response (e.g., success response) of MsgA may be split into a plurality of MsgBs. At least one of the plurality of MsgBs may be multiplexed with one or more MsgBs (e.g., MsgBs of other wireless device(s)). At least one of the plurality of MsgBs may be a wireless device specific message (e.g., not multiplexed with a split MsgB of other wireless device(s)).

A response (e.g., MsgB) of MsgA comprising CCCH SDU may be split into two responses, MsgB1 and MsgB2. The wireless device, that transmits MsgA comprising an RRC request (e.g., CCCH SDU) may receive the MsgB1 and the MsgB2 via different PDSCHs. The MsgB1 may comprise at least one of: a random access preamble Identifier (RAPID), a contention resolution identifier, C-RNTI, and/or a TA command. The MsgB2 may comprise one or more information that the MsgB1 may not indicate (or comprise). For example, the MsgB2 may comprise at least one of: comprise an RAPID, a contention resolution identifier, C-RNTI, a TA command, and/or the RRC message (e.g., SRB RRC message). For example, the wireless device may receive a first PDSCH comprising an MAC PDU multiplexing one or more MsgB1s (e.g., MACsubPDUs). Each of MsgB1s may comprise an RAPID, a TA command, C-RNTI. The wireless device may identify a response (e.g., MsgB1 or MACsubPDU) corresponding to the MsgA from the one or more MsgB1s (e.g., MACsubPDUs), e.g., if an RAPID of a particular MsgB1 (e.g., MACsubPDU) is matched to a preamble that the wireless device transmits via the MsgA. The wireless device may receive from the base station a second PDSCH comprising the MsgB2. The MsgB2 may be the wireless device specific message, e.g., not multiplexed with other wireless device responses. The MsgB2 may comprise the RRC message (e.g., RRC (re)establishment, RRC setup, or RRC resume) that may be a response of the RRC request (e.g., RRC (re)establishment request, RRC setup request, or RRC resume request, respectively). The MsgB2 may further comprise a contention resolution identifier (e.g., MAC CE indicating the contention resolution identifier), e.g., if MsgB1 does not comprise the contention resolution identifier (e.g., MAC CE indicating the contention resolution identifier).

There may be one or more ways for a wireless device to receive MsgB1 and MsgB2. The wireless device may transmit MsgA comprising Preamble and Transport block (e.g., that may comprise a wireless device identifier) to a base station. The wireless device may receive a DCI (via a PDCCH) indicating a first downlink assignment of a first PDSCH. The wireless device may receive the first PDSCH based on time/frequency resource allocation indicated by the first downlink assignment. The received first PDSCH may comprise an MAC PDU comprising a plurality of MsgB1s. For example, the wireless device identifies MsgB1 corresponding to the MsgA from the plurality of MsgB1s based on an RAPID of the MsgB1 that matched to the Preamble, e.g., if the MAC PDU multiplexes a plurality of MsgB1s. The MsgB1 may further comprise a contention resolution identifier. In this case, the wireless device may identify MsgB1 corresponding to the MsgA from the plurality of MsgB1s based on an RAPID and/or the contention resolution identifier of the MsgB1 that matched to the Preamble and/or the wireless device identifier, respectively. The MsgB1 may comprise a second downlink assignment of a second PDSCH that may comprise the MsgB2. In this case, an MAC entity of the wireless device may notify a physical layer of the wireless device of the second downlink assignment so that the physical layer of the wireless device receives the second PDSCH. The wireless device may receive the second PDSCH based on the second downlink assignment. The second PDSCH may comprise the MsgB2 that comprises the RRC message (e.g., RRC (re)establishment, RRC setup, or RRC resume) that may be a response of the CCCH SDU (e.g., RRC (re)establishment request, RRC setup request, or RRC resume request, respectively).

Figure 26:
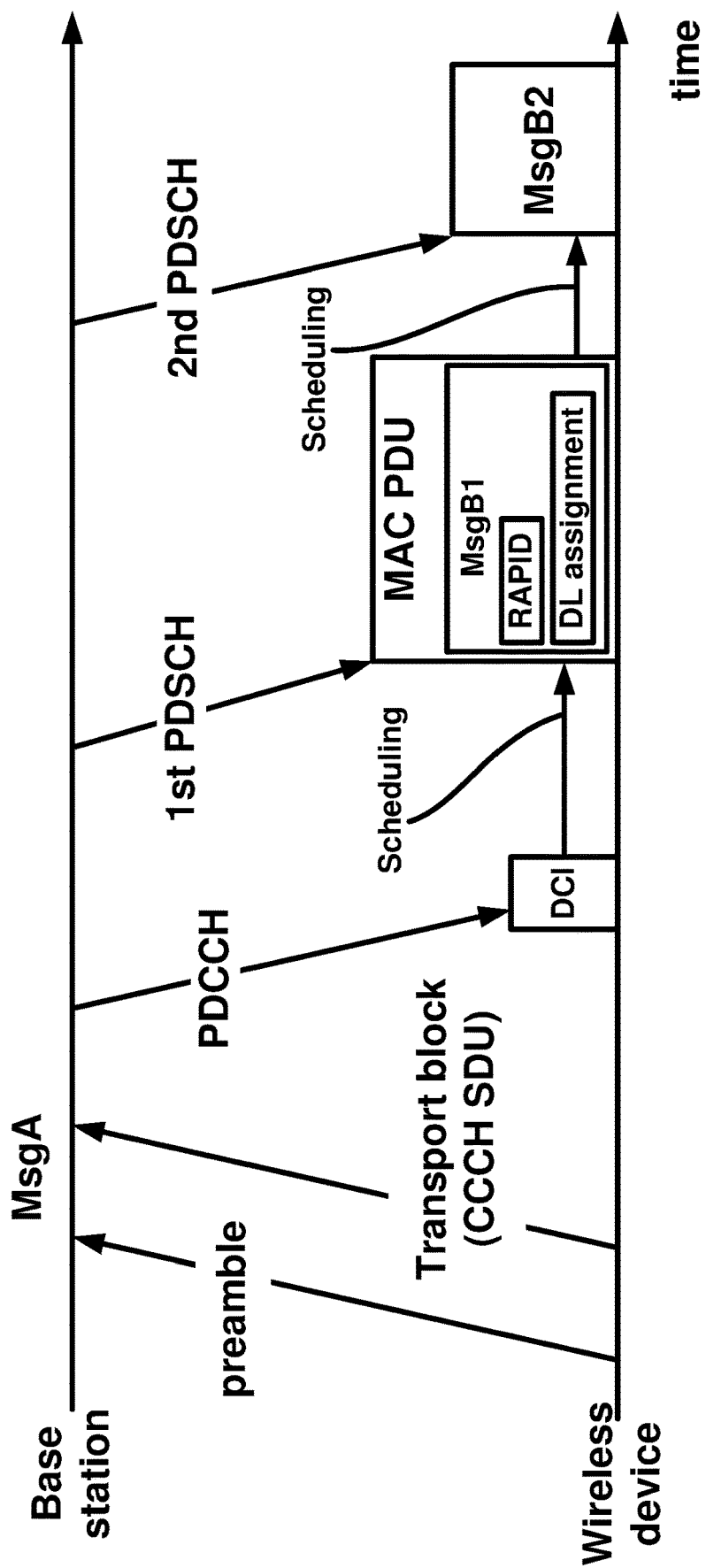
FIG. 26 is an example of two-step RA procedure as per an aspect of an example embodiment of the present disclosure.

FIG. 26 is an example of two-step RA procedure as per an aspect of an example embodiment of the present disclosure. The wireless device initiating the two-step RA procedure may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start a window (or a timer) e.g., after or in response to transmitting the MsgA. The wireless device may receive, during the window (or while the timer is running), a PDCCH comprising a DCI scheduling a first PDSCH. The PDCCH may be addressed to (e.g., scrambled with) a particular RNTI. For example, the wireless device may determine the particular RNTI based on time and/or frequency radio resource used for transmissions of Preamble and/or Transport Block. The wireless device may determine the particular RNTI further based on an RAPID of Preamble and/or DMRS information (e.g., port number, sequence number, etc.) of Transport Block. The first PDSCH may comprise an MAC PDU comprising MsgB1. There may be a plurality of MsgB1s in the MAC PDU. The wireless device may identify the MsgB1 from the plurality of MsgB1s based on the RAPID of Preamble. For example, the wireless device determines, among the plurality of MsgB1s, the MsgB1 as a response of MsgA, e.g., if the RAPID indicated by a field in the MsgB1 is matched with Preamble. The MsgB1 may further comprise a contention resolution identifier. In this case, the wireless device may identify the MsgB1 from the plurality of MsgB1s based on the RAPID of Preamble and/or the wireless device identifier. For example, the wireless device determines, among the plurality of MsgB1s, the MsgB1 as a response of MsgA, e.g., if the RAPID indicated by a first field in the MsgB1 is matched with Preamble and/or the contention resolution identifier indicated by a second field in the MsgB1 is matched with the wireless device identifier transmitted to the base station via the Transport block (or the RRC message). The MsgB1 may further comprise a DL assignment. The DL assignment may comprise a DL scheduling information based on which the wireless device may receive a second PDSCH. For example, the DL scheduling information indicates at least one of: time and/or frequency radio resources indication (e.g., in terms of time and/or frequency indexes) of DL transmission of the second PDSCH, a size (or length) of transport block (or packet, or message) transmitted via the second PDSCH, and/or a modulation and coding scheme of the second PDSCH. The second PDSCH that the wireless device receives from the base station may comprise the MsgB2. The MsgB2 may comprise a response of the RRC message transmitted via Transport block. For example, the MsgB2 comprises at least one of: an RRC (re)establishment, RRC setup, or RRC resume that may be a response of the CCCH SDU (e.g., RRC (re)establishment request, RRC setup request, or RRC resume request, respectively.

There may be one or more ways for a wireless device to receive MsgB1 and MsgB2. The wireless device may transmit MsgA comprising Preamble and Transport block (e.g., that may comprise a wireless device identifier) to a base station. The wireless device may receive a first DCI (via a first PDCCH) indicating a first downlink assignment of a first PDSCH. The wireless device may receive the first PDSCH based on time/frequency resource allocation indicated by the first downlink assignment. The received first PDSCH may comprise an MAC PDU comprising a plurality of MsgB1s. For example, the wireless device identifies MsgB1 corresponding to the MsgA from the plurality of MsgB1s based on an RAPID of the MsgB1 that matched to the Preamble, e.g., if the MAC PDU multiplexes a plurality of MsgB1s. The MsgB1 may further comprise a contention resolution identifier. In this case, the wireless device may identify MsgB1 corresponding to the MsgA from the plurality of MsgB1s based on an RAPID that matches to the Preamble and/or the contention resolution identifier of the MsgB1 that matches to the wireless device identifier. The MsgB1 may further comprise C-RNTI. The wireless device may monitor a downlink control channel with the C-RNTI. The wireless device may receive, via the downlink control channel, a second PDCCH comprising a second DCI. The second PDCCH may be addressed to (or be scrambled with) the C-RNTI. The DCI may comprise a second downlink assignment of a second PDSCH that may comprise the MsgB2. The wireless device may receive the second PDSCH based on the second downlink assignment. The second PDSCH may comprise the MsgB2 that comprises the RRC message (e.g., RRC (re)establishment, RRC setup, or RRC resume) that may be a response of the CCCH SDU (e.g., RRC (re)establishment request, RRC setup request, or RRC resume request, respectively).

Figure 27:
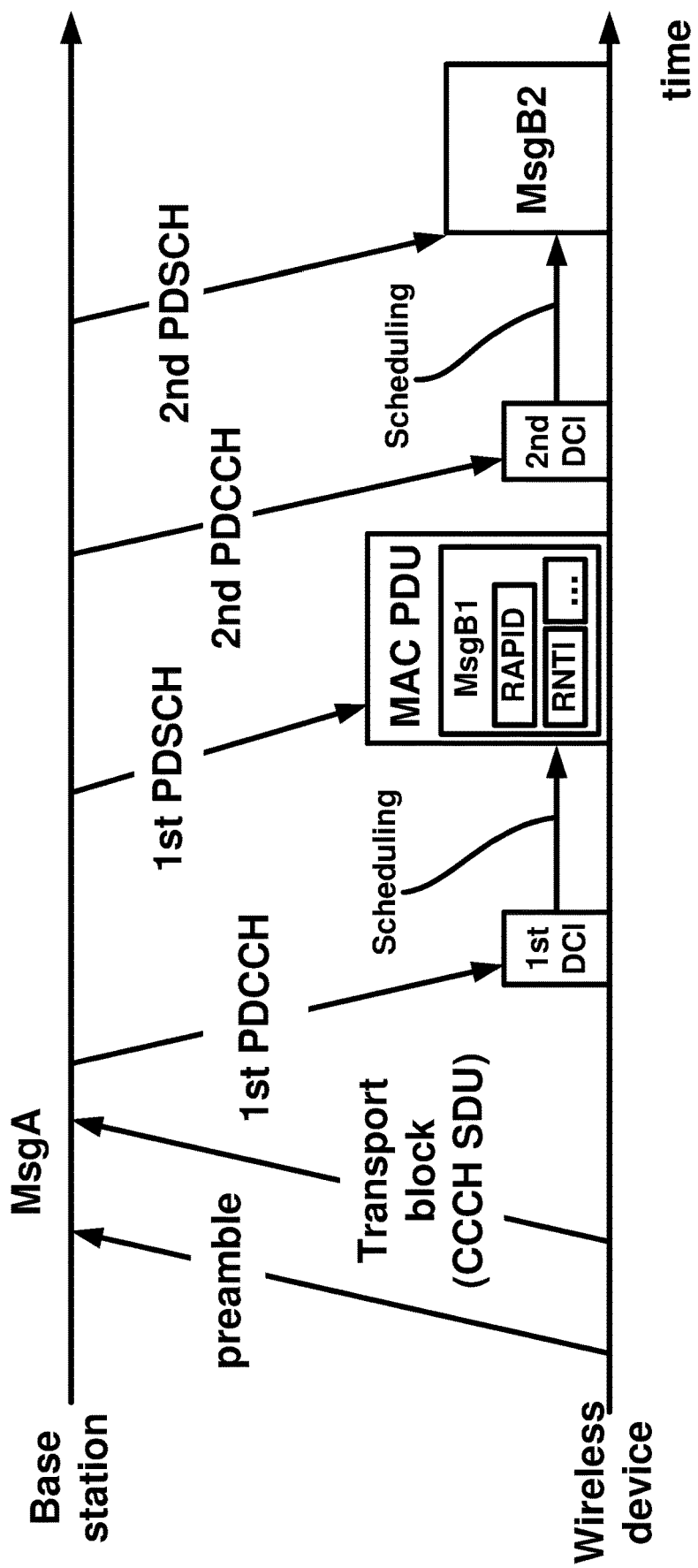
FIG. 27 is an example of two-step RA procedure as per an aspect of an example embodiment of the present disclosure.

FIG. 27 is an example of two-step RA procedure as per an aspect of an example embodiment of the present disclosure. The wireless device initiating the two-step RA procedure may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start a window (or a timer) e.g., after or in response to transmitting the MsgA. The wireless device may receive, during the window (or while the timer is running), a first PDCCH comprising a first DCI scheduling a first PDSCH. The first PDCCH may be addressed to (e.g., scrambled with) a particular RNTI. For example, the wireless device may determine the particular RNTI based on time and/or frequency radio resource used for transmissions of Preamble and/or Transport Block. The wireless device may determine the particular RNTI further based on an RAPID of Preamble and/or DMRS information (e.g., port number, sequence number, etc.) of Transport Block. The first DCI may comprise a first downlink assignment that schedules a downlink reception of the first PDSCH. The wireless device may receive the first PDSCH based on the first downlink assignment. The first PDSCH may comprise an MAC PDU comprising MsgB1. There may be a plurality of MsgB1s in the MAC PDU. The wireless device may identify the MsgB1 from the plurality of MsgB1s based on the RAPID of Preamble. For example, the wireless device determines, among the plurality of MsgB1s, the MsgB1 as a response of MsgA, e.g., if the RAPID indicated by a field in the MsgB1 is matched with Preamble. The MsgB1 may further comprise a contention resolution identifier. In this case, the wireless device may identify the MsgB1 from the plurality of MsgB1s based on the RAPID of Preamble and/or the wireless device identifier. For example, the wireless device determines, among the plurality of MsgB1s, the MsgB1 as a response of MsgA, e.g., if the RAPID indicated by a first field in the MsgB1 is matched with Preamble and/or the contention resolution identifier indicated by a second field in the MsgB1 is matched with the wireless device identifier transmitted to the base station via the Transport block (or the RRC message). The MsgB1 may further comprise a particular RNTI (e.g., RNTI in FIG. 27). For example, the particular RNTI is C-RNTI. The wireless device may monitor a downlink control channel for a second PDSCH. The wireless device may detect a second PDCCH addressed to (or scrambled with) the particular RNTI (e.g., C-RNTI). The second PDCCH may comprise a second DCI. The second DCI may comprise a second downlink assignment that schedules the second PDSCH. The second downlink assignment may comprise a DL scheduling information based on which the wireless device may receive the second PDSCH. For example, the DL scheduling information indicates at least one of: time and/or frequency radio resources indication (e.g., in terms of time and/or frequency indexes) of DL transmission of the second PDSCH, a size (or length) of transport block (or packet, or message) transmitted via the second PDSCH, and/or a modulation and coding scheme of the second PDSCH. The second PDSCH that the wireless device receives from the base station may comprise the MsgB2. The MsgB2 may comprise a response of the RRC message transmitted via Transport block. For example, the MsgB2 comprises at least one of: an RRC (re)establishment, RRC setup, or RRC resume that may be a response of the CCCH SDU (e.g., RRC (re)establishment request, RRC setup request, or RRC resume request, respectively.

In a two-step RA procedure, MsgB may be split into two responses, MsgB1 and MsgB2. The MsgB1 may comprise a contention resolution identifier. The wireless device may determine whether a contention resolution is successful or not based on the contention resolution identifier. For example, the wireless device may transmit MsgA comprising Preamble and Transport block. The Transport block may comprise a wireless device identifier of the wireless device. The wireless device may determine that a contention resolution is successful if the contention resolution identifier in the received MsgB1 is matched to the wireless device identifier. The wireless device may attempt to receive the MsgB1 after or in response to the contention resolution determined as successful. The wireless device may receive the MsgB2 after or in response receiving the MsgB1 (e.g., with a successful decoding of the MsgB1) and/or the contention resolution determined as successful. The MsgB2 may comprise a response of RRC request transmitted via the Transport block. For example, the wireless device may receive the MsgB2 but fail to decode the MsgB2. For example, the wireless device may not setup a radio bearer (e.g., SRB and/or data radio bearer, DRB) to a network (or to a base station) if the wireless device fails to decode the MsgB2. The wireless device may not setup a radio bearer (e.g., SRB and/or DRB) with a network (or with a base station) if the wireless device does not receive the response of the RRC request (e.g., RRC (re)establishment, RRC setup, or RRC resume). This may be a case that the wireless device may determine that the contention resolution is successful but the wireless device may not setup, (re)establish, or resume a radio bearer (e.g., SRB and/or DRB) with a network (or with a base station)

The wireless device may attempt to receive another one or more MsgB2s if the wireless device fails to decode MsgB2. A two-step RA procedure may support HARQ process for receiving MsgB2. For example, if the wireless device fails to decode MsgB2 (e.g., initial transmission of MsgB2), the wireless device may transmit an NACK indicator (e.g., using UCI) via a PUCCH. A DCI that schedules a reception of the MsgB2 (e.g. initial transmission of MsgB2) may indicate radio resource(s) of the PUCCH. The wireless device may attempt to receive a second MsgB2 after or in response to transmitting the NACK indicator. The wireless device may decode second MsgB2 successfully. If the wireless device fails to decode the second MsgB2, the wireless device may transmit a second NACK indicator (e.g., using UCI) via a second PUCCH. A second DCI that schedules a reception of the second MsgB2 (e.g. second transmission of MsgB2) may indicate radio resource(s) of the second PUCCH. The wireless device may attempt to receive a third MsgB2 after or in response to transmitting the second NACK indicator. The wireless device may repeat this process N times, e.g., until the wireless device successfully decodes the N-th MsgB2 successfully.

The problem arises when the wireless device keeps failing to decode the MsgB2. In this case, the wireless device may be in a situation that a contention resolution is determined as successful but cannot make and/or resume a connection to a base station (e.g., a network). For example, the wireless device cannot setup (or (re)establish) a radio bearer (e.g., SRB and/or DRB) with a network (and/or a base station) if the wireless device keeps failing to decode the MsgB2. It may be inefficient for the wireless device to stay in this situation (e.g., the contention resolution is determined as successful but cannot make and/or resume the connection) for a long time. A latency to complete the two-step RA procedure becomes longer. The wireless device may consume a battery power unnecessarily, e.g., to monitor a downlink control channel and/or transmitting an HARQ feedback (e.g., NACK(s)). There may be one or more reasons that causes this situation. For example, there may be a large pathloss (e.g., more than estimated due to fading) in a downlink reference signal that the wireless device selects (e.g., based on description in this specification) for the two-step RA procedure. In this case, the wireless device may need to (re)select (switch, or change) the downlink reference signal to another. For example, it may be better in this case that the wireless device stops to attempt to receive another MsgB2 and/or returns to an RA radio resource selection procedure (e.g., and/or (re)transmission of MsgA) of a random access procedure. The RA radio resource selection procedure (e.g., and/or (re)transmission of MsgA) may comprise a (re)selection of a downlink reference signal based on which the wireless device may (re)transmit MsgA based on the two-step RA procedure (e.g., described above in this specification).

In existing technologies, a wireless device may determine a retransmission of a preamble based on a time window starting in response to uplink transmission. For example, in a four-step RA procedure, the wireless device may determine the retransmission if the wireless device does not receive, during a time window, an RAR (e.g., Msg2 1312 in FIG. 13A) corresponding to a preamble (e.g. Msg1 1311 in FIG. 13A) that the wireless device transmits. The time window in this case starts in response to uplink transmission of the preamble. In this case, the wireless device may determine the retransmission without a contention resolution. For example, the wireless device may not determine whether a base station transmits the RAR for the preamble or not since the contention resolution is not made.

In existing technologies, in a four-step RA procedure, a wireless device may determine retransmission of a preamble if the wireless device does not receive, during a time window, a contention resolution identifier (e.g., Msg4 1314 in FIG. 13A) that matches to the one the wireless device transmits via Msg3 1313 in FIG. 13A. The time window in this case starts in response to uplink transmission of the Msg3 1313. In this case, the wireless device may determine the retransmission without a contention resolution. For example, the wireless device transmits the contention resolution identifier via the Msg3 1313 but does not receive its response comprising the contention resolution identifier during the time window. In this case, the time window may start in response to transmitting the Msg3.

In example embodiments, a wireless device may receive MsgB2 after receiving MsgB1. The wireless device may not perform uplink transmission (e.g., may not transmit a message and/or signal) after receiving the MsgB1 and before receiving the MsgB2. The wireless device may determine to receive the MsgB2 after or in response to a contention resolution being resolved based on the MsgB1. For example, the wireless device may receive, during a time window, the MsgB1 comprising a contention resolution identifier. The time window that the wireless device uses to receive the MsgB1 may start in response to transmitting the transport block (and/or MsgA comprising the transport block). The wireless device may start and/or use the time window to receive a message comprising and/or providing the contention resolution. If the contention resolution identifier matches to the one the wireless device transmits via a transport block of an MsgA, the wireless device may determine that the contention resolution is resolved (or made). The wireless device may determine to receive the MsgB2 after or in response to the contention resolution being resolved. If the contention resolution identifier does not match to the one the wireless device transmits via a transport block of an MsgA, the wireless device may determine that the contention resolution is resolved (or made).

The wireless device may determine to receive the MsgB2 after or in response to the contention resolution being resolved. The wireless device may stop a time window (that starts in response to transmitting a transport block of an MsgA) in response to receiving a response (e.g., MsgB1) to the MsgA if the response comprising a contention resolution identifier matching to the one that the wireless device transmits via the transport block. In this case, the wireless device may fail to receive the MsgB2. For example, the wireless device may receive one or more downlink packets based on which the wireless device performs soft combining to decode the MsgB2. The wireless device may keep failing to decode the MsgB2. There may be a need, for the wireless device and/or the base station, a mechanism (e.g., a decision making process) that determines when the wireless device stops to attempt to receive another MsgB2 and/or returns to an RA radio resource selection procedure (e.g., and/or (re)transmission of MsgA). Example embodiments may reduce a latency to complete the two-step RA procedure by preventing the wireless device from attempting to receive MsgB2 unnecessarily. The wireless device may reduce a battery power consumption by preventing the wireless device from monitoring a downlink control channel and/or from transmitting NACKs via PUCCHs unnecessarily.

Example embodiments may be based on a two-step RA procedure described above. For example, the wireless device may transmit an RRC request (e.g., CCCH SDU) to a base station via MsgA (or Transport block of the MsgA). The RRC request may be one of an RRC (re)establishment request, an RRC setup request, or an RRC resume request. For example, the wireless device may receive at least two split MsgB as a response of the MsgA. For example, the response may be split into MsgB1 and MsgB2. For example, the MsgB1 is multiplexed with other wireless device response(s) (e.g., other wireless device MsgB1). For example, the wireless device receives the MsgB2 after or in response to receiving the MsgB1. The MsgB2 may be a wireless device specific. For example, the wireless device fails to decode the MsgB2. The wireless device may attempt to receive (and/or decode) another one or more MsgB2s after or in response to failing to decode the MsgB2. Receiving MsgB2 may be based on an HARQ process. For example, a first (e.g., initial) MsgB2 is a first RV of a transport block of the MsgB2. For example, a second (e.g., right after the first MsgB2) MsgB2 is a second RV of the transport block of the MsgB2, and so on. Example embodiments may introduce a counter or a window (e.g., a timer) based on which the wireless device stops to attempt receive or decode one or more MsgB2 (e.g., initial MsgB2 and/or another one or more MsgB2). In the example embodiments, the wireless device may count a number of attempts for receiving and/or decoding the one or more MsgB2 (e.g., initial MsgB2 and/or another one or more MsgB2). In the example embodiment, the wireless device may attempt to receive and/or decode the one or more MsgB2 (e.g., initial MsgB2 and/or another one or more MsgB2) during the window (or until the timer expires).

In example embodiments, a wireless device may receive a split MsgB (e.g., MsgB1 and MsgB2 as shown in FIG. 26 and/or FIG. 27) if the wireless device transmits an RRC request (e.g., CCCH SDU). In this case, the wireless device may detect a first PDCCH scheduling an initial MsgB (e.g., MsgB1) of the split MsgB. The first PDCCH may be addressed to a particular RNTI. For example, the particular RNTI is an RA-RNTI. For example, the particular RNTI is an RNTI determined based on time and/or frequency radio resource used for transmissions of Preamble and/or Transport Block. For example, the particular RNTI is determined further based on an RAPID of Preamble of MsgA and/or DMRS information (e.g., port number, sequence number, etc.) of Transport Block of the MsgA. For example, the particular RNTI is not C-RNTI. In an example, the wireless device may receive an MsgB (e.g., FIG. 23, FIG. 24A and/or FIG. 24B) if the wireless device transmits C-RNTI (e.g., C-RNTI MAC CE) via MsgA (or Transport block of the MsgA). In this case, the wireless device may detect a PDCCH scheduling the MsgB (e.g., not split MsgB). The PDCCH may be addressed to the C-RNTI.

In example embodiments, a wireless device may initiate a two-step RA procedure. The wireless device may transmit MsgA comprising Preamble and Transport block. The Transport block may comprise a wireless device identifier of the wireless device. The Transport block may further comprise an RRC request (e.g., RRC (re)establishment request, RRC setup request, or RRC resume request). The wireless device may receive two separate MsgB1 and MsgB2 via two PDSCH as a response of the MsgA. The wireless device may determine a contention resolution is successful, e.g., if the wireless device identifies a contention resolution identifier, indicated by MsgB1, matched to a wireless device identifier of the wireless device. The wireless device may determine that the two-step RA procedure completes successfully, e.g., in response to the contention resolution determined as successful. In this case the wireless device may fail to receive the MsgB2 (e.g., decoding failure of the MsgB2). In this case, the wireless device may not use a retransmission of the MsgB2 performed by an RLC layer. In this case, the wireless device may not start (or perform) a radio link monitoring. For example, the wireless device may not determine a radio link failure based on the radio link monitoring.

In example embodiments, a wireless device may initiate a two-step RA procedure. The wireless device may transmit MsgA comprising Preamble and Transport block. The Transport block may comprise a wireless device identifier of the wireless device. The Transport block may further comprise an RRC request (e.g., RRC (re)establishment request, RRC setup request, or RRC resume request). The wireless device may receive two separate MsgB1 and MsgB2 via two PDSCH as a response of the MsgA. The wireless device may determine that the two-step RA procedure completes successfully, e.g., if the wireless device decodes MsgB1 and MsgB2 successfully. The wireless device may determine a contention resolution is successful, e.g., if the wireless device identifies a contention resolution identifier, indicated by MsgB1, matched to a wireless device identifier of the wireless device. In this case, the wireless device may not determine that the two-step RA procedure completes successfully, e.g., if the wireless device fails to decode MsgB2. In this case, the wireless device may not use a retransmission of the MsgB2 performed by an RLC layer. In this case, the wireless device may not start (or perform) a radio link monitoring. For example, the wireless device may not determine a radio link failure based on the radio link monitoring.

Figure 28:
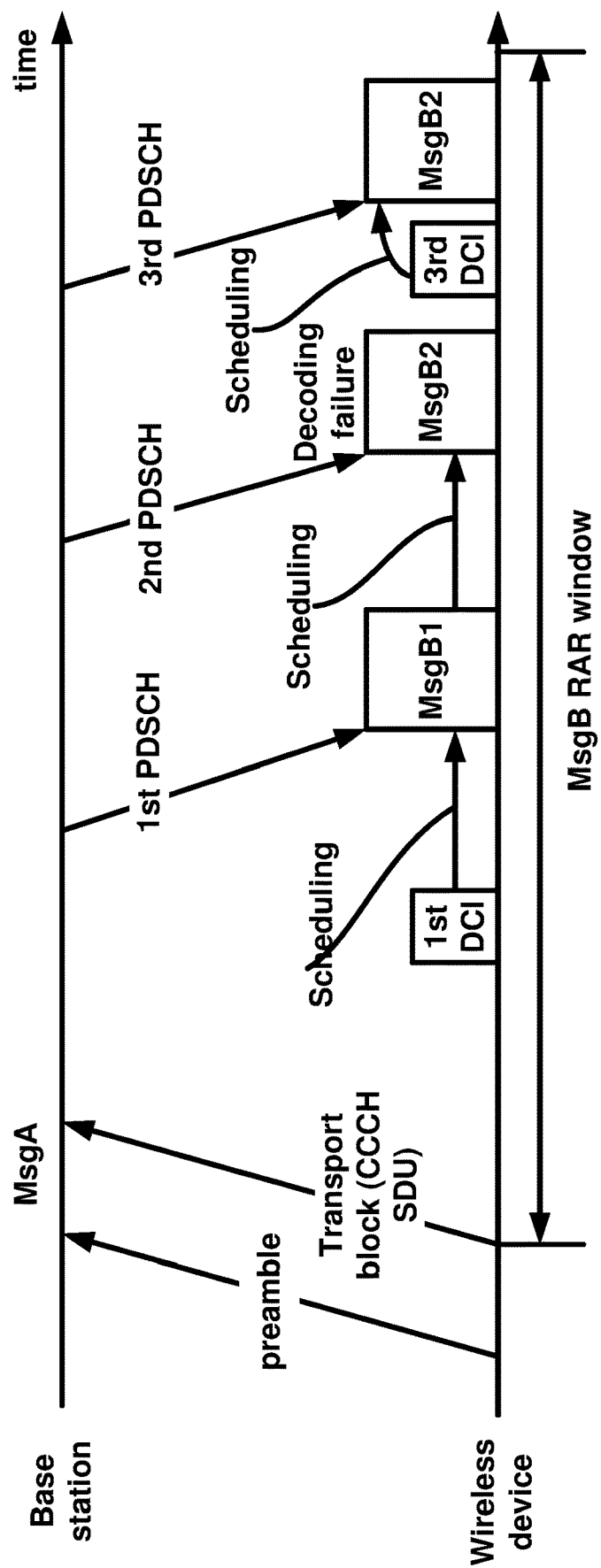
FIG. 28 is an example of two-step RA procedure as per an aspect of an example embodiment of the present disclosure.
Figure 29:
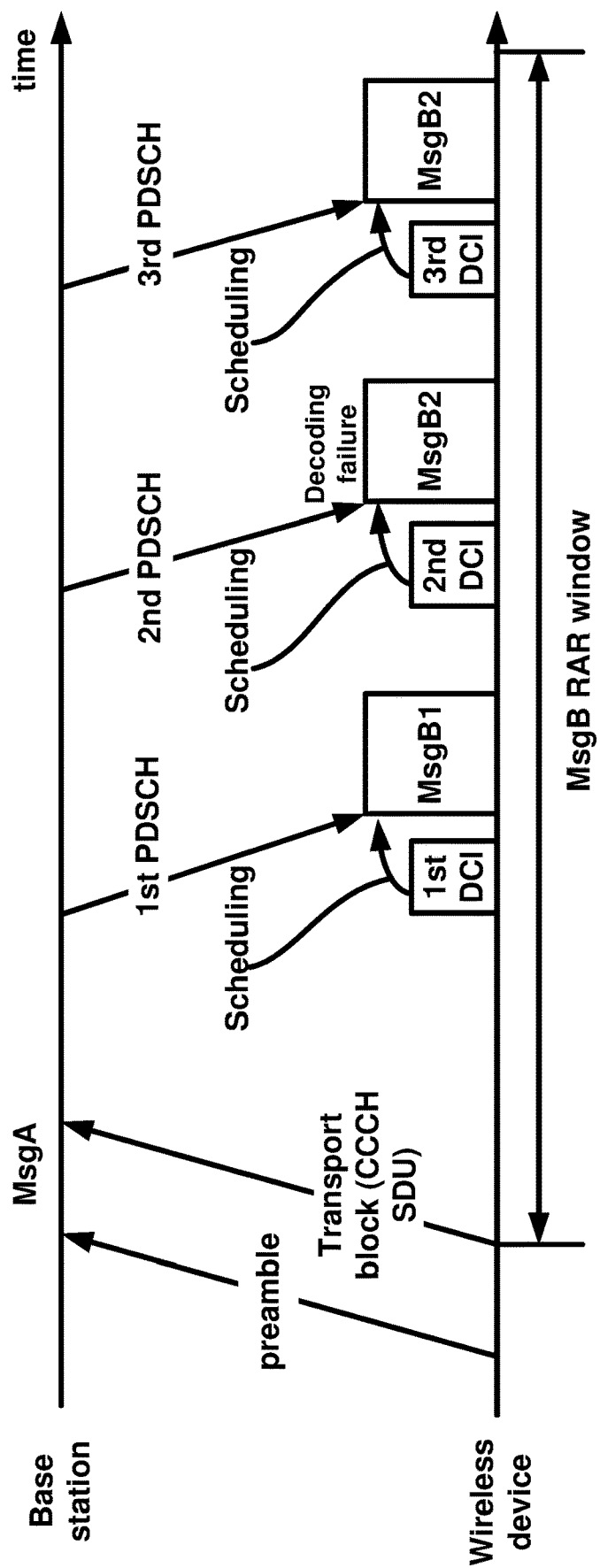
FIG. 29 is an example of two-step RA procedure as per an aspect of an example embodiment of the present disclosure.

FIG. 28 and FIG. 29 are examples of two-step RA procedure as per an aspect of an example embodiment of the present disclosure. In an example, a wireless device initiating the two-step RA procedure may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start an MsgB RAR window (or a timer) e.g., after or in response to transmitting the MsgA. The wireless device may attempt to receive (and/or successfully decode) MsgB1 and MsgB2 during the MsgB RAR window (or while the timer is running). The wireless device may determine to (re)transmit MsgA if the wireless device does not receive (and/or fails to decode) at least one of MsgB1 and/or MsgB2.

In an example, FIG. 28 is an example illustrating that MsgB2 is scheduled based on a downlink assignment indicated by MsgB1 (or a first PDSCH). A wireless device may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start an MsgB RAR window (or a timer) e.g., after or in response to transmitting the MsgA. The wireless device may receive, during the MsgB RAR window (or while the timer is running), a first PDCCH comprising a first DCI scheduling a first PDSCH. The first PDCCH may be addressed to (e.g., scrambled with) a particular RNTI. For example, the wireless device may determine the particular RNTI based on time and/or frequency radio resource used for transmissions of Preamble and/or Transport Block. The wireless device may determine the particular RNTI further based on an RAPID of Preamble and/or DMRS information (e.g., port number, sequence number, etc.) of Transport Block. The first DCI may comprise a first downlink assignment scheduling (or indicating) a DL transmission of the first PDSCH. The wireless device may receive the first PDSCH using the first downlink assignment. The first PDSCH may comprise (or may be passed in the form of) an MAC PDU comprising MsgB1. There may be a plurality of MsgB1s multiplexed in the MAC PDU. The wireless device may identify the MsgB1 from the plurality of MsgB1s based on the RAPID of Preamble. For example, the wireless device determines, among the plurality of MsgB1s, the MsgB1 as a response of MsgA, e.g., if the RAPID indicated by a field in the MsgB1 is matched to a preamble identifier of the Preamble. The MsgB1 may further comprise a contention resolution identifier. In this case, the wireless device may identify the MsgB1 from the plurality of MsgB1s based on the preamble identifier of the of Preamble and/or the wireless device identifier. For example, the wireless device determines, among the plurality of MsgB1s, the MsgB1 as a response of MsgA, e.g., if the RAPID indicated by a first field in the MsgB1 is matched to a preamble identifier of the Preamble and/or the contention resolution identifier indicated by a second field in the MsgB1 is matched to the wireless device identifier transmitted to the base station via the Transport block (or the RRC message). The MsgB1 may further comprise a second downlink assignment. The second downlink assignment may comprise a DL scheduling information based on which the wireless device may receive a second PDSCH. For example, the DL scheduling information indicates at least one of: time and/or frequency radio resources indication (e.g., in terms of time and/or frequency indexes) of DL transmission of the second PDSCH, a size (or length) of transport block (or packet, or message) transmitted via the second PDSCH, and/or a modulation and coding scheme of the second PDSCH. The second PDSCH that the wireless device receives from the base station may comprise the MsgB2. The MsgB2 may comprise a response of the RRC message transmitted via Transport block. For example, the MsgB2 comprises at least one of: an RRC (re)establishment, RRC setup, or RRC resume that may be a response of the CCCH SDU (e.g., RRC (re)establishment request, RRC setup request, or RRC resume request, respectively. The wireless device may fail to receive the second PDSCH during the MsgB RAR window. For example, the wireless device may fail to detect (or may miss to detect) the second PDSCH during the MsgB RAR window. In this case, the wireless device may attempt to receive (and/or decode) the MsgB2 one or more times during the MsgB RAR window. The wireless device may start to (or continue to) monitor a downlink control channel for a next PDSCH (e.g., a third PDSCH). For example, the wireless device may start to (or continue to) monitor a downlink control channel in response to failing to decode the second PDSCH. For example, the wireless device may transmit, via a first PUCCH a first NACK of reception failure of the second PDSCH. The resource allocation of the first PUCCH may be indicated by the first DCI scheduling the first PDSCH. For example, the first DCI indicates TPC command for the first PUCCH, PUCCH resource indicator, HARQ (e.g., NACK) feedback timing indicator for the first PDSCH. For example, the first DCI may comprise the first downlink assignment for the first PDSCH and the resource allocation of the first PUCCH for the second PDSCH. The wireless device may start to (or continue to) monitor a downlink control channel in response to transmitting the first NACK via the first PUCCH. The wireless device may detect, via the downlink control channel, a third PDCCH comprising a third DCI during the MsgB RAR window. The third PDCCH may be addressed to a particular RNTI. For example, the particular RNTI is C-RNTI indicated by MsgB1. The third DCI may comprise a third downlink assignment scheduling a DL transmission of a third PDSCH comprising the MsgB2. The third DCI may further comprise a resource allocation of a third PUCCH. For example, the wireless device may transmit ACK or NACK via the third PUCCH if the wireless device decodes the third PDSCH successfully or fails to decode third PDSCH, respectively. The wireless device may repeat this process during the MsgB RAR window until the wireless device successfully decodes at least one PDSCH comprising the MsgB2. For example, if the wireless device fails to decode the third PDSCH, the wireless device may start to (or continue to) monitor the downlink control channel for a fourth PDSCH and so on. A PDCCH scheduling a PDSCH comprising MsgB2 may be addressed to the C-RNTI. A transmission timing of a PUCCH (e.g., any PUCCH transmitted during the MsgB RAR window) comprising an ACK or NACK of reception indication of a PDSCH (e.g., any PDSCH received during the MsgB RAR window) comprising MsgB2 may be determined (or adjusted) based on a TA command in the MsgB1. The wireless device may determine to retransmit MsgA if the wireless device does not receive MsgB2 (e.g., fails to decode any PDSCH comprising MsgB2) during the MsgB RAR window.

In FIG. 28, the wireless device may employ an HARQ to decode one or more PDSCHs (e.g., the first PDSCH, the second PDSCH, and/or the third PDSCH). For example, the second downlink assignment indicated by MsgB1 may indicate at least one of a redundant version (RV) of transport block of the second PDSCH. The wireless device may receive the third PDCCH scheduling the third PDSCH. The third PDCCH may indicate a third RV of transport block of the third PDSCH. The wireless device may combine the first transport block (or the first PDSCH) and the third transport block (or the third PDSCH) using a soft combining based on the first RV and the third RV. The RV pattern may be predefined or semi-statically configured by SIB or RRC message. A HARQ process number of this PDSCH combining may be predefined or semi-statically configured (via SIB or RRC). A HARQ process number of this PDSCH combining may be indicated by downlink assignments (e.g., a second downlink assignment in MsgB1 and/or a third downlink assignment in the third DCI). A new data indicator (NDI) may be employed for the wireless device to determine whether the wireless device flush the HARQ buffer of the HARQ process. For example, the wireless device combines one or more PDSCHs using the soft combining, e.g., if the HARQ process numbers corresponding to the one or more PDSCHs are the same and/or NDI has not been toggled. For example, an NDI indicated by N-th downlink assignment is toggled (e.g., N>1), the wireless device may flush the HARQ buffer corresponding to the HARQ process number predefined, semi-statically configured, or indicated by N-th downlink assignment (or DCI). For example, an NDI indicated by N-th downlink assignment (or DCI) is not toggled, the wireless device may attempt soft combining the received signal (e.g., transport block(s)) in the HARQ buffer with N-th PDSCH scheduled by the N-th downlink assignment.

In an example, FIG. 29 is an example illustrating that MsgB2 is scheduled based on a downlink assignment indicated by a DCI. A wireless device may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start an MsgB RAR window (or a timer) e.g., after or in response to transmitting the MsgA. The wireless device may receive, during the MsgB RAR window (or while the timer is running), a first PDCCH comprising a first DCI scheduling a first PDSCH. The first PDCCH may be addressed to (e.g., scrambled with) a particular RNTI. For example, the wireless device may determine the particular RNTI based on time and/or frequency radio resource used for transmissions of Preamble and/or Transport Block. The wireless device may determine the particular RNTI further based on an RAPID of Preamble and/or DMRS information (e.g., port number, sequence number, etc.) of Transport Block. The first DCI may comprise a first downlink assignment scheduling (or indicating) a DL transmission of the first PDSCH. The wireless device may receive the first PDSCH using the first downlink assignment. The first PDSCH may comprise (or may be passed in the form of) an MAC PDU comprising MsgB1. There may be a plurality of MsgB1s multiplexed in the MAC PDU. The wireless device may identify the MsgB1 from the plurality of MsgB1s based on the RAPID of Preamble. For example, the wireless device determines, among the plurality of MsgBIs, the MsgB1 as a response of MsgA, e.g., if the RAPID indicated by a field in the MsgB1 is matched to a preamble identifier of the Preamble. The MsgB1 may further comprise a contention resolution identifier. In this case, the wireless device may identify the MsgB1 from the plurality of MsgB1s based on the preamble identifier of the of Preamble and/or the wireless device identifier. For example, the wireless device determines, among the plurality of MsgB1s, the MsgB1 as a response of MsgA, e.g., if the RAPID indicated by a first field in the MsgB1 is matched to a preamble identifier of the Preamble and/or the contention resolution identifier indicated by a second field in the MsgB1 is matched to the wireless device identifier transmitted to the base station via the Transport block (or the RRC message). The wireless device may monitor, during the MsgB RAR window, the downlink control channel for a second PDSCH. For example, the wireless device may start to (or continue to) monitor the downlink control channel for the second PDSCH after or in response to identifying the MsgB1 (e.g., as described above). The wireless device may detect/receive a second PDCCH comprising a second DCI. For example, the second PDCCH may be addressed to a particular RNTI. For example, the particular RNTI is C-RNTI indicated by the MsgB1. The second DCI may comprise a second DL assignment. The second DL assignment may comprise a DL transmission scheduling information based on which the wireless device may receive a second PDSCH. For example, the DL transmission scheduling information indicates at least one of: time and/or frequency radio resources indication (e.g., in terms of time and/or frequency indexes) of DL transmission of the second PDSCH, a size (or length) of transport block (or packet, or message) transmitted via the second PDSCH, and/or a modulation and coding scheme of the second PDSCH. The second PDSCH that the wireless device receives from the base station may comprise the MsgB2. The MsgB2 may comprise a response of the RRC message transmitted via Transport block. For example, the MsgB2 comprises at least one of: an RRC (re)establishment, RRC setup, or RRC resume that may be a response of the CCCH SDU (e.g., RRC (re)establishment request, RRC setup request, or RRC resume request, respectively. The wireless device may receive the second PDSCH during the MsgB RAR window but fail to decode the second PDSCH. In this case, the wireless device may attempt to receive (and/or decode) the MsgB2 one or more times during the MsgB RAR window. The wireless device may start to (or continue to) monitor the downlink control channel for a next PDSCH (e.g., a third PDSCH). For example, the wireless device may start to (or continue to) monitor a downlink control channel in response to failing to decode the second PDSCH. For example, the wireless device may transmit, via a second PUCCH a second NACK of reception failure of the second PDSCH. The resource allocation of the second PUCCH may be indicated by the second DCI scheduling the second PDSCH. For example, the second DCI indicates TPC command for the first PUCCH, PUCCH resource indicator, HARQ (e.g., NACK) feedback timing indicator for the first PDSCH. For example, the second DCI may comprise the second downlink assignment for the second PDSCH and the resource allocation of the second PUCCH for the second PDSCH. The wireless device may start to (or continue to) monitor a downlink control channel in response to transmitting the second NACK via the second PUCCH. The wireless device may detect, via the downlink control channel, a third PDCCH comprising a third DCI during the MsgB RAR window. The third DCI may comprise a third downlink assignment scheduling a DL transmission of a third PDSCH comprising the MsgB2. The third DCI may further comprise a resource allocation of a third PUCCH. For example, the wireless device may transmit ACK or NACK via the third PUCCH if the wireless device decodes the third PDSCH successfully or fails to decode third PDSCH, respectively. The wireless device may repeat this process during the MsgB RAR window until the wireless device successfully decodes at least one PDSCH comprising the MsgB2. For example, if the wireless device fails to decode the third PDSCH, the wireless device may start to (or continue to) monitor the downlink control channel for a fourth PDSCH and so on. The wireless device may determine to retransmit MsgA if the wireless device does not receive MsgB2 (e.g., fails to decode one or more PDSCHs comprising MsgB2) during the MsgB RAR window.

In FIG. 29, the wireless device may employ an HARQ to decode one or more PDSCHs (e.g., the first PDSCH, the second PDSCH, and/or the third PDSCH). For example, the second downlink assignment indicated by the second DCI may indicate a second RV of transport block of the second PDSCH. The wireless device may receive the third PDCCH scheduling the third PDSCH. The third PDCCH may indicate a third RV of transport block of the third PDSCH. The wireless device may combine the second transport block (or the second PDSCH) and the third transport block (or the third PDSCH) using a soft combining based on the second RV and the third RV. The RV pattern may be predefined or semi-statically configured by SIB or RRC message. A HARQ process number of this PDSCH combining may be predefined or semi-statically configured (via SIB or RRC). A HARQ process number of this PDSCH combining may be indicated by downlink assignments (e.g., the second downlink assignment in the first DCI and/or the third downlink assignment in the third DCI). An NDI may be employed for the wireless device to determine whether the wireless device flush the HARQ buffer of the HARQ process. For example, the wireless device combines one or more PDSCHs using the soft combining, e.g., if the HARQ process numbers corresponding to the one or more PDSCHs are the same and/or NDI has not been toggled. For example, an NDI indicated by N-th downlink assignment is toggled (e.g., N>1), the wireless device may flush the HARQ buffer corresponding to the HARQ process number predefined, semi-statically configured, or indicated by N-th downlink assignment (or DCI). For example, an NDI indicated by N-th downlink assignment (or DCI) is not toggled (e.g., N>1), the wireless device may attempt soft combining the received signal (e.g., transport block(s)) in the HARQ buffer with N-th PDSCH scheduled by the N-th downlink assignment (e.g., N>1).

In an example, a wireless device may transmit a message comprising a preamble and a transport block. The wireless device may receive a first response comprising: a contention resolution identifier of the wireless device; a wireless device identifier; and a downlink assignment scheduling a second response. The wireless device may determine a decoding failure of the second response received based on the downlink assignment. In response to the determining the decoding failure, the wireless device may adjust a time interval to monitor for the second response. The wireless device may receive the second response during the adjusted time interval. The wireless device may transmit an uplink control signal in response to a decoding success of the second response. For example, the transport block comprises one of a radio resource connection setup request, a radio resource connection resume request, or a radio resource connection (re)establishment request. For example, the second response comprises one of a radio resource connection setup, a radio resource connection resume, or a radio resource connection (re)establishment.

In an example, a wireless device may transmit a first message comprising a first preamble and a first transport block. The wireless device may receive a first response comprising: a contention resolution identifier of the wireless device; a wireless device identifier; and a downlink assignment scheduling a second response. The wireless device may determine a decoding failure of the second response received based on the downlink assignment. In response to the decoding failure, the wireless device may adjust a time interval to monitor for the second response. The wireless device may determine that no second response has been received during the adjusted time interval. The wireless device may transmit a second message comprising a second transport block, wherein the second transport block comprises the wireless device identifier. For example, the transport block comprises one of a radio resource connection setup request, a radio resource connection resume request, or a radio resource connection (re)establishment request. For example, the second response comprises one of a radio resource connection setup, a radio resource connection resume, or a radio resource connection (re)establishment. For example, the second message further comprises a second preamble.

Figure 30:
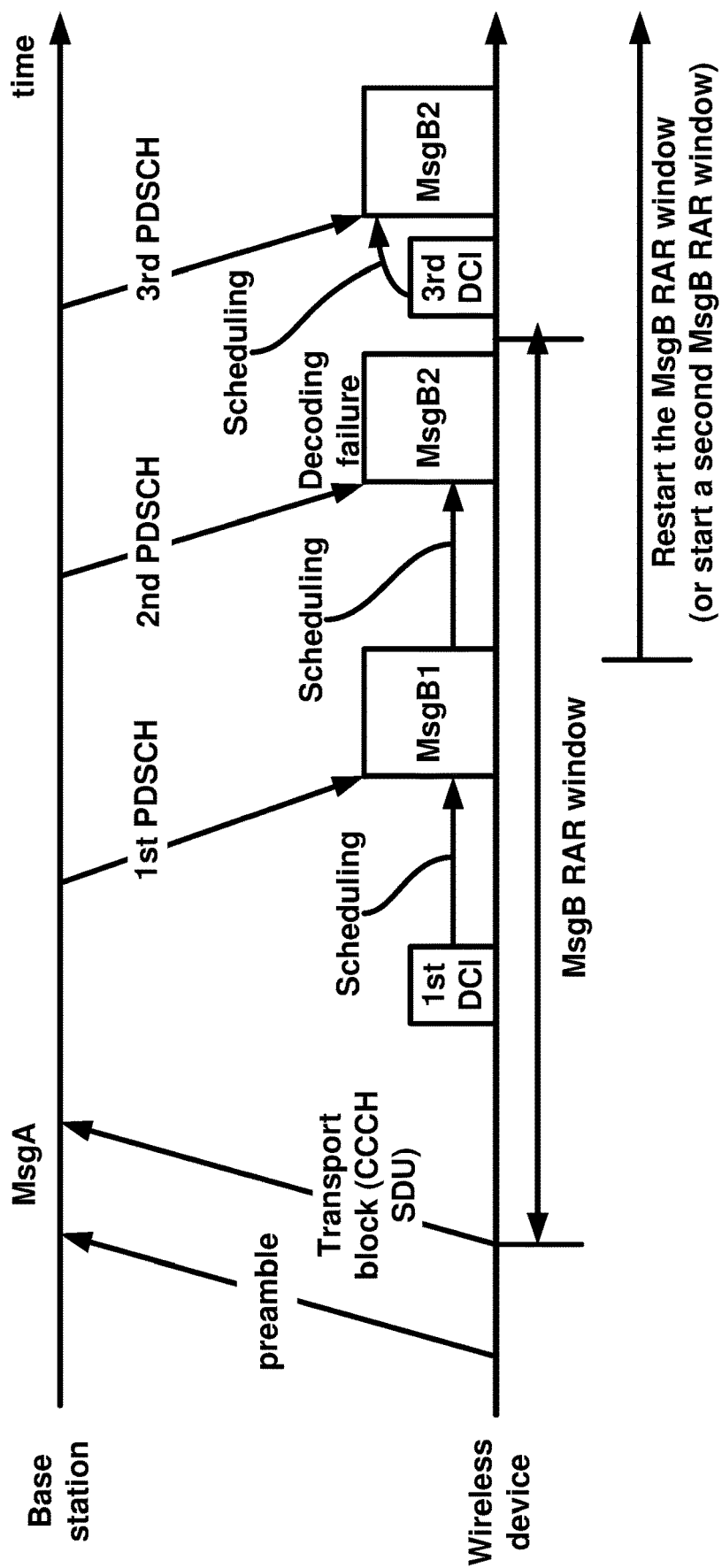
FIG. 30 is an example of two-step RA procedure as per an aspect of an example embodiment of the present disclosure.
Figure 31:
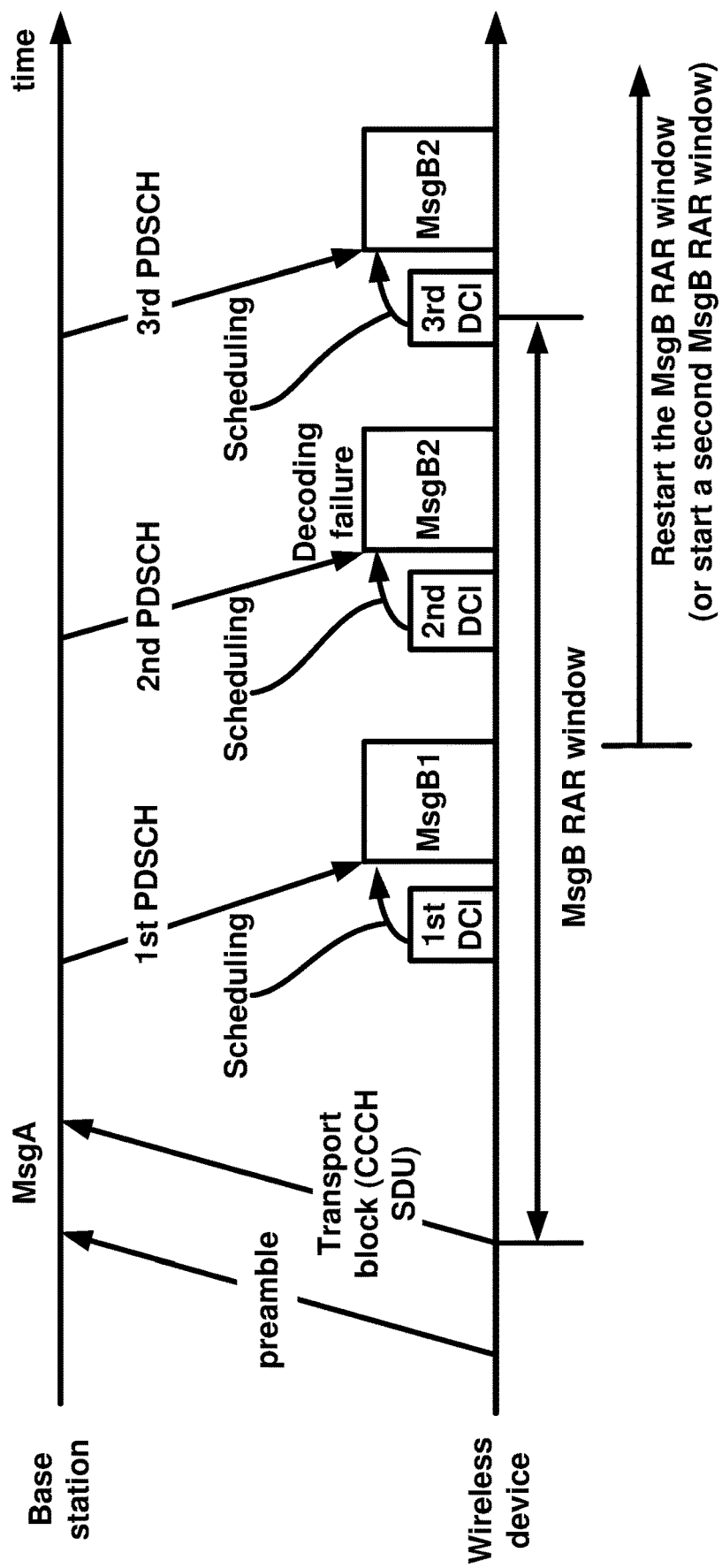
FIG. 31 is an example of two-step RA procedure as per an aspect of an example embodiment of the present disclosure.

FIG. 30 and FIG. 31 are examples of two-step RA procedure as per an aspect of an example embodiment of the present disclosure. In an example, a wireless device initiating the two-step RA procedure may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start an MsgB RAR window (or a timer) e.g., after or in response to transmitting the MsgA. The wireless device may attempt to receive (and/or successfully decode) MsgB1 during the MsgB RAR window (or while the timer is running). The wireless device may attempt to receive (and/or successfully decode) MsgB2 during an adjusted (or extended) MsgB RAR window (or while an adjusted or extended timer is running). The wireless device may determine to (re)transmit MsgA if the wireless device does not receive (and/or fails to decode) MsgB1, e.g., during the MsgB RAR window. The wireless device may determine to (re)transmit MsgA if the wireless device fails to receive (and/or fails to decode) MsgB2 with a number of attempts. The number of attempts may be predefined or semi-statically configured by SIB or RRC message.

In an example, FIG. 30 is an example illustrating that MsgB2 is scheduled based on a downlink assignment indicated by MsgB1 (or a first PDSCH). A wireless device may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start an MsgB RAR window (or a timer) e.g., after or in response to transmitting the MsgA. The wireless device may receive, during the MsgB RAR window (or while the timer is running), a first PDCCH comprising a first DCI scheduling a first PDSCH. The first PDCCH may be addressed to (e.g., scrambled with) a particular RNTI. For example, the wireless device may determine the particular RNTI based on time and/or frequency radio resource used for transmissions of Preamble and/or Transport Block. The wireless device may determine the particular RNTI further based on an RAPID of Preamble and/or DMRS information (e.g., port number, sequence number, etc.) of Transport Block. The first DCI may comprise a first downlink assignment scheduling (or indicating) a DL transmission of the first PDSCH. The wireless device may receive the first PDSCH using the first downlink assignment. The first PDSCH may comprise (or may be parsed in the form of) an MAC PDU comprising MsgB1. There may be a plurality of MsgB1s multiplexed in the MAC PDU. The wireless device may identify the MsgB1 from the plurality of MsgB1s based on the RAPID of Preamble. For example, the wireless device determines, among the plurality of MsgB1s, the MsgB1 as a response of MsgA, e.g., if the RAPID indicated by a field in the MsgB1 is matched to a preamble identifier of the Preamble. The MsgB1 may further comprise a contention resolution identifier. In this case, the wireless device may identify the MsgB1 from the plurality of MsgB1s based on the preamble identifier of the of Preamble and/or the wireless device identifier. For example, the wireless device determines, among the plurality of MsgB1s, the MsgB1 as a response of MsgA, e.g., if the RAPID indicated by a first field in the MsgB1 is matched to a preamble identifier of the Preamble and/or the contention resolution identifier indicated by a second field in the MsgB1 is matched to the wireless device identifier transmitted to the base station via the Transport block (or the RRC message). The MsgB1 may further comprise a second downlink assignment. The second downlink assignment may comprise a DL scheduling information based on which the wireless device may receive a second PDSCH. For example, the DL scheduling information indicates at least one of: time and/or frequency radio resources indication (e.g., in terms of time and/or frequency indexes) of DL transmission of the second PDSCH, a size (or length) of transport block (or packet, or message) transmitted via the second PDSCH, and/or a modulation and coding scheme of the second PDSCH. The second PDSCH that the wireless device receives from the base station may comprise the MsgB2. The MsgB2 may comprise a response of the RRC message transmitted via Transport block. For example, the MsgB2 comprises at least one of: an RRC (re)establishment, RRC setup, or RRC resume that may be a response of the CCCH SDU (e.g., RRC (re)establishment request, RRC setup request, or RRC resume request, respectively. The wireless device may monitor a downlink channel for the second PDSCH during an adjusted (or extended) window. For example, the adjusted (or extended) window may be implemented by restarting the MsgB window. For example, the adjusted (or extended) window may be implemented by (re)starting a second MsgB window. For example, a size (or time duration) of the MsgB window may be predefined or semi-statically configured by SIB or RRC message. For example, a size (or time duration) of the second MsgB window may be predefined or semi-statically configured by SIB or RRC message. For example, the wireless device may use a size (or time duration) of the MsgB window as a size (or time duration) of the second MsgB window if the size (or time duration) of the second MsgB window is not semi-statically configured. For example, the wireless device may (re)start the MsgB window (or the second MsgB) after or in response to identifying MsgB1 from the first PDSCH (e.g., from an MAC PDU parsed (formed, assembled and/or constructed) based on the first PDSCH. For example, the wireless device may (re)start the MsgB window (or the second MsgB) after or in response to determining the contention resolution is successful. For example, the wireless device determines that the contention resolution is successful if the RAPID in the MsgB1 is matched to a preamble identifier of Preamble of the MsgA and/or the contention resolution identifier (if exist) in the MsgB1 is matched to the wireless device identifier. The extended window may enable for the base station to allocate DL radio resources (or schedule DL transmissions) flexibly.

The wireless device may attempt to receive, based on the second downlink assignment, the second PDSCH during the adjusted (or extended) window. For example, the wireless device may fail to detect (or receive) the second PDSCH during the adjusted (or extended) window. In this case, the wireless device may attempt to receive (and/or decode) the MsgB2 one or more times. There may be one or more ways that the wireless device attempts to receive (and/or decode) the MsgB2 one or more times. In an example, the wireless device may not adjust (extend) the adjusted (or extended) window anymore. The wireless device may start to (or continue to) monitor a downlink control channel for a next PDSCH (e.g., a third PDSCH). For example, the wireless device may start to (or continue to) monitor a downlink control channel in response to failing to decode the second PDSCH. For example, the wireless device may transmit, via a first PUCCH a first NACK of reception failure of the second PDSCH. The resource allocation of the first PUCCH may be indicated by the first DCI scheduling the first PDSCH. For example, the first DCI indicates TPC command for the first PUCCH, PUCCH resource indicator, HARQ (e.g., NACK) feedback timing indicator for the first PDSCH. For example, the first DCI may comprise the first downlink assignment for the first PDSCH and the resource allocation of the first PUCCH for the second PDSCH. The wireless device may start to (or continue to) monitor a downlink control channel in response to transmitting the first NACK via the first PUCCH. The wireless device may detect, via the downlink control channel, a third PDCCH comprising a third DCI during the adjusted (or extended) window. The third PDCCH may be addressed to a particular RNTI. For example, the particular RNTI is C-RNTI indicated by MsgB1. The third DCI may comprise a third downlink assignment scheduling a DL transmission of a third PDSCH comprising the MsgB2. The third DCI may further comprise a resource allocation of a third PUCCH. For example, the wireless device may transmit ACK or NACK via the third PUCCH if the wireless device decodes the third PDSCH successfully or fails to decode third PDSCH, respectively. The wireless device may repeat this process during the adjusted (or extended) window until the wireless device successfully decodes at least one PDSCH comprising the MsgB2. For example, if the wireless device fails to decode the third PDSCH, the wireless device may start to (or continue to) monitor the downlink control channel for a fourth PDSCH and so on. A PDCCH scheduling a PDSCH comprising MsgB2 may be addressed to the C-RNTI. A transmission timing of a PUCCH (e.g., any PUCCH transmitted during the adjusted (or extended) window) comprising an ACK or NACK of reception indication of a PDSCH (e.g., any PDSCH comprising MsgB2) may be determined (or adjusted) based on a TA command in the MsgB1. The wireless device may determine to retransmit MsgA if the wireless device does not receive MsgB2 (e.g., fails to decode any PDSCH comprising MsgB2) during the adjusted (or extended) window.

The wireless device may receive, based on the second downlink assignment, the second PDSCH during the adjusted (or extended) window. The wireless device may fail to receive the second PDSCH during the adjusted (or extended) window. For example, the wireless device may fail to detect (or may miss to detect) the second PDSCH during the adjusted (or extended) window. In this case, the wireless device may attempt to receive (and/or decode) the MsgB2 one or more times. There may be one or more ways that the wireless device attempts to receive (and/or decode) the MsgB2 one or more times. In an example, the wireless device may adjust (extend) the adjusted (or extended) window for each of the one or more attempts to receive (and/or decode) the MsgB2.

In an example, the wireless device may (re)start the MsgB RAR window (or a second MsgB RAR window) in response to a determination of decoding failure of PDSCH comprising MsgB2. For example, the wireless device (re)start the MsgB RAR window (or a second MsgB RAR window) in response to a determination of decoding failure of the second PDSCH comprising MsgB2. The wireless device may start to (or continue to) monitor a downlink control channel for a next PDSCH (e.g., a third PDSCH) during the (re)started MsgB RAR window (or the (re)started second MsgB RAR window). For example, the wireless device may start to (or continue to) monitor a downlink control channel in response to failing to decode the second PDSCH. For example, the wireless device may transmit, via a first PUCCH a first NACK of reception failure of the second PDSCH. The resource allocation of the first PUCCH may be indicated by the first DCI scheduling the first PDSCH. For example, the first DCI indicates TPC command for the first PUCCH, PUCCH resource indicator, HARQ (e.g., NACK) feedback timing indicator for the first PDSCH. For example, the first DCI may comprise the first downlink assignment for the first PDSCH and the resource allocation of the first PUCCH for the second PDSCH. For example, the wireless device (re)start the MsgB RAR window (or a second MsgB RAR window) in response to transmitting the first NACK via the first PUCCH. The wireless device may start to (or continue to) monitor a downlink control channel in response to transmitting the first NACK via the first PUCCH. The wireless device may detect, via the downlink control channel, a third PDCCH comprising a third DCI during the MsgB RAR window. The third PDCCH may be addressed to a particular RNTI. For example, the particular RNTI is C-RNTI indicated by MsgB1. The third DCI may comprise a third downlink assignment scheduling a DL transmission of a third PDSCH comprising the MsgB2. The third DCI may further comprise a resource allocation of a third PUCCH. For example, the wireless device may transmit ACK or NACK via the third PUCCH if the wireless device decodes the third PDSCH successfully or fails to decode third PDSCH, respectively. The wireless device may repeat this process until the wireless device successfully decodes at least one PDSCH comprising the MsgB2. The wireless device may stop to repeat this process if a number of decoding failures of PDSCH comprising MsgB2 is greater than a first value (predefined or semi-configured by SIB or RRC message). For example, the wireless device may repeat this process if the number of decoding failures of PDSCH comprising MsgB2 is smaller than or equal to the first value (predefined or semi-configured by SIB or RRC message). For example, if the wireless device fails to decode the third PDSCH, the wireless device may device (re)start the (re)started MsgB RAR window (or the (re)started second MsgB RAR window) in response to a determination of decoding failure of the third PDSCH comprising MsgB2 or in response to transmitting, via a second PUCCH, a second NACK of reception failure of the third PDSCH. The wireless device may start to (or continue to) monitor the downlink control channel for a fourth PDSCH during the (re)started MsgB RAR window (or the (re)started second MsgB RAR window) and so on. A PDCCH scheduling a PDSCH comprising MsgB2 may be addressed to the C-RNTI. A transmission timing of a PUCCH (e.g., any PUCCH transmitted during the adjusted (or extended) window) comprising an ACK or NACK of reception indication of a PDSCH (e.g., any PDSCH comprising MsgB2) may be determined (or adjusted) based on a TA command in the MsgB1. The wireless device may determine to retransmit MsgA if a number of decoding failures of PDSCH comprising MsgB2 is greater than a first value (predefined or semi-configured by SIB or RRC message).

In FIG. 30, the wireless device may employ an HARQ to decode one or more PDSCHs (e.g., the first PDSCH, the second PDSCH, and/or the third PDSCH). For example, the first downlink assignment indicated by MsgB1 may indicate at least one of a redundant version (RV) of transport block of the second PDSCH. The wireless device may receive the third PDCCH scheduling the third PDSCH. The third PDCCH may indicate a third RV of transport block of the third PDSCH. The wireless device may combine the first transport block (or the first PDSCH) and the third transport block (or the third PDSCH) using a soft combining based on the first RV and the third RV. The RV pattern may be predefined or semi-statically configured by SIB or RRC message. A HARQ process number of this PDSCH combining may be predefined or semi-statically configured (via SIB or RRC). A HARQ process number of this PDSCH combining may be indicated by downlink assignments (e.g., a first downlink assignment in MsgB1 and/or a third downlink assignment in the third DCI). A new data indicator (NDI) may be employed for the wireless device to determine whether the wireless device flush the HARQ buffer of the HARQ process. For example, the wireless device combines one or more PDSCHs using the soft combining, e.g., if the HARQ process numbers corresponding to the one or more PDSCHs are the same and/or NDI has not been toggled. For example, an NDI indicated by N-th downlink assignment is toggled, the wireless device may flush the HARQ buffer corresponding to the HARQ process number predefined, semi-statically configured, or indicated by N-th downlink assignment (or DCI). For example, an NDI indicated by N-th downlink assignment (or DCI) is not toggled, the wireless device may attempt soft combining the received signal (e.g., transport block(s)) in the HARQ buffer with N-th PDSCH scheduled by the N-th downlink assignment.

In an example, FIG. 31 is an example illustrating that MsgB2 is scheduled based on a downlink assignment indicated by MsgB1 (or a first PDSCH). A wireless device may transmit MsgA comprising Preamble and Transport block. The Transport block may comprise an RRC message (e.g., CCCH SDU). For example, the RRC message comprise one of: an RRC (re)establishment request, RRC setup request, and/or RRC resume request. The wireless device may start to monitor a downlink control channel for MsgB1 and MsgB2, e.g., after or in response to transmitting the MsgA. The Transport block (or the RRC message) may comprise a wireless device identifier that may be used for a contention resolution. The wireless device may start an MsgB RAR window (or a timer) e.g., after or in response to transmitting the MsgA. The wireless device may receive, during the MsgB RAR window (or while the timer is running), a first PDCCH comprising a first DCI scheduling a first PDSCH. The first PDCCH may be addressed to (e.g., scrambled with) a particular RNTI. For example, the wireless device may determine the particular RNTI based on time and/or frequency radio resource used for transmissions of Preamble and/or Transport Block. The wireless device may determine the particular RNTI further based on an RAPID of Preamble and/or DMRS information (e.g., port number, sequence number, etc.) of Transport Block. The first DCI may comprise a first downlink assignment scheduling (or indicating) a DL transmission of the first PDSCH. The wireless device may receive the first PDSCH using the first downlink assignment. The first PDSCH may comprise (or may be parsed in the form of) an MAC PDU comprising MsgB1. There may be a plurality of MsgB1s multiplexed in the MAC PDU. The wireless device may identify the MsgB1 from the plurality of MsgB1s based on the RAPID of Preamble. For example, the wireless device determines, among the plurality of MsgB1s, the MsgB1 as a response of MsgA, e.g., if the RAPID indicated by a field in the MsgB1 is matched to a preamble identifier of the Preamble. The MsgB1 may further comprise a contention resolution identifier. In this case, the wireless device may identify the MsgB1 from the plurality of MsgB1s based on the preamble identifier of the of Preamble and/or the wireless device identifier. For example, the wireless device determines, among the plurality of MsgB1s, the MsgB1 as a response of MsgA, e.g., if the RAPID indicated by a first field in the MsgB1 is matched to a preamble identifier of the Preamble and/or the contention resolution identifier indicated by a second field in the MsgB1 is matched to the wireless device identifier transmitted to the base station via the Transport block (or the RRC message). The wireless device may monitor a downlink channel for a second PDSCH. For example, the wireless device may start to (or continue to) monitor the downlink control channel for the second PDSCH after or in response to identifying the MsgB1 (e.g., as described above). The wireless device may monitor the downlink control channel for the second PDSCH during an adjusted (or extended) window. For example, the adjusted (or extended) window may be implemented by restarting the MsgB window. For example, the adjusted (or extended) window may be implemented by (re)starting a second MsgB window. For example, a size (or time duration) of the MsgB window may be predefined or semi-statically configured by SIB or RRC message. For example, a size (or time duration) of the second MsgB window may be predefined or semi-statically configured by SIB or RRC message. For example, the wireless device may use a size (or time duration) of the MsgB window as a size (or time duration) of the second MsgB window if the size (or time duration) of the second MsgB window is not semi-statically configured. For example, the wireless device may (re)start the MsgB window (or the second MsgB) after or in response to identifying MsgB1 from the first PDSCH (e.g., from an MAC PDU parsed (formed, assembled and/or constructed) based on the first PDSCH). For example, the wireless device may (re)start the MsgB window (or the second MsgB) after or in response to determining the contention resolution is successful. For example, the wireless device determines that the contention resolution is successful if the RAPID in the MsgB1 is matched to a preamble identifier of Preamble of the MsgA and/or the contention resolution identifier (if exist) in the MsgB1 is matched to the wireless device identifier. The extended window may enable for the base station to allocate DL radio resources (or schedule DL transmissions) flexibly.

The wireless device may detect/receive, during the adjusted (or extended) window, a second PDCCH comprising a second DCI. For example, the second PDCCH may be addressed to a particular RNTI. For example, the particular RNTI is C-RNTI indicated by the MsgB1. The second DCI may comprise a second downlink assignment. The second downlink assignment may comprise a DL scheduling information based on which the wireless device may receive a second PDSCH. For example, the DL scheduling information indicates at least one of: time and/or frequency radio resources indication (e.g., in terms of time and/or frequency indexes) of DL transmission of the second PDSCH, a size (or length) of transport block (or packet, or message) transmitted via the second PDSCH, and/or a modulation and coding scheme of the second PDSCH. The second PDSCH that the wireless device receives from the base station may comprise the MsgB2. The MsgB2 may comprise a response of the RRC message transmitted via Transport block. For example, the MsgB2 comprises at least one of: an RRC (re)establishment, RRC setup, or RRC resume that may be a response of the CCCH SDU (e.g., RRC (re)establishment request, RRC setup request, or RRC resume request, respectively.

The wireless device may attempt to receive, based on the second downlink assignment, the second PDSCH during the adjusted (or extended) window. For example, the wireless device may fail to detect (or receive) the second PDSCH during the adjusted (or extended) window. In this case, the wireless device may attempt to receive (and/or decode) the MsgB2 one or more times. There may be one or more ways that the wireless device attempts to receive (and/or decode) the MsgB2 one or more times. In an example, the wireless device may not adjust (extend) the adjusted (or extended) window anymore. The wireless device may start to (or continue to) monitor a downlink control channel for a next PDSCH (e.g., a third PDSCH). For example, the wireless device may start to (or continue to) monitor a downlink control channel in response to failing to decode the second PDSCH. For example, the wireless device may transmit, via a second PUCCH a second NACK of reception failure of the second PDSCH. The resource allocation of the second PUCCH may be indicated by the second DCI scheduling the second PDSCH. For example, the second DCI indicates TPC command for the second PUCCH, PUCCH resource indicator, HARQ (e.g., NACK) feedback timing indicator for the second PDSCH. For example, the second DCI may comprise the second downlink assignment for the second PDSCH and the resource allocation of the second PUCCH for the second PDSCH. The wireless device may start to (or continue to) monitor a downlink control channel in response to transmitting the second NACK via the second PUCCH. The wireless device may detect, via the downlink control channel, a third PDCCH comprising a third DCI during the adjusted (or extended) window. The third PDCCH may be addressed to a particular RNTI. For example, the particular RNTI is C-RNTI indicated by MsgB1. The third DCI may comprise a third downlink assignment scheduling a DL transmission of a third PDSCH comprising the MsgB2. The third DCI may further comprise a resource allocation of a third PUCCH. For example, the wireless device may transmit ACK or NACK via the third PUCCH if the wireless device decodes the third PDSCH successfully or fails to decode third PDSCH, respectively. The wireless device may repeat this process during the adjusted (or extended) window until the wireless device successfully decodes at least one PDSCH comprising the MsgB2. For example, if the wireless device fails to decode the third PDSCH, the wireless device may start to (or continue to) monitor the downlink control channel for a fourth PDSCH and so on. A PDCCH scheduling a PDSCH comprising MsgB2 may be addressed to the C-RNTI. A transmission timing of a PUCCH (e.g., any PUCCH transmitted during the adjusted (or extended) window) comprising an ACK or NACK of reception indication of a PDSCH (e.g., any PDSCH comprising MsgB2) may be determined (or adjusted) based on a TA command in the MsgB1. The wireless device may determine to retransmit MsgA if the wireless device does not receive MsgB2 (e.g., fails to decode any PDSCH comprising MsgB2) during the adjusted (or extended) window.

The wireless device may receive, based on the second downlink assignment, the second PDSCH during the adjusted (or extended) window. The wireless device may fail to receive the second PDSCH during the adjusted (or extended) window. For example, the wireless device may fail to detect (or may miss to detect) the second PDSCH during the adjusted (or extended) window. In this case, the wireless device may attempt to receive (and/or decode) the MsgB2 one or more times. There may be one or more ways that the wireless device attempts to receive (and/or decode) the MsgB2 one or more times. In an example, the wireless device may adjust (extend) the adjusted (or extended) window for each of the one or more attempts to receive (and/or decode) the MsgB2.

Figure 32:
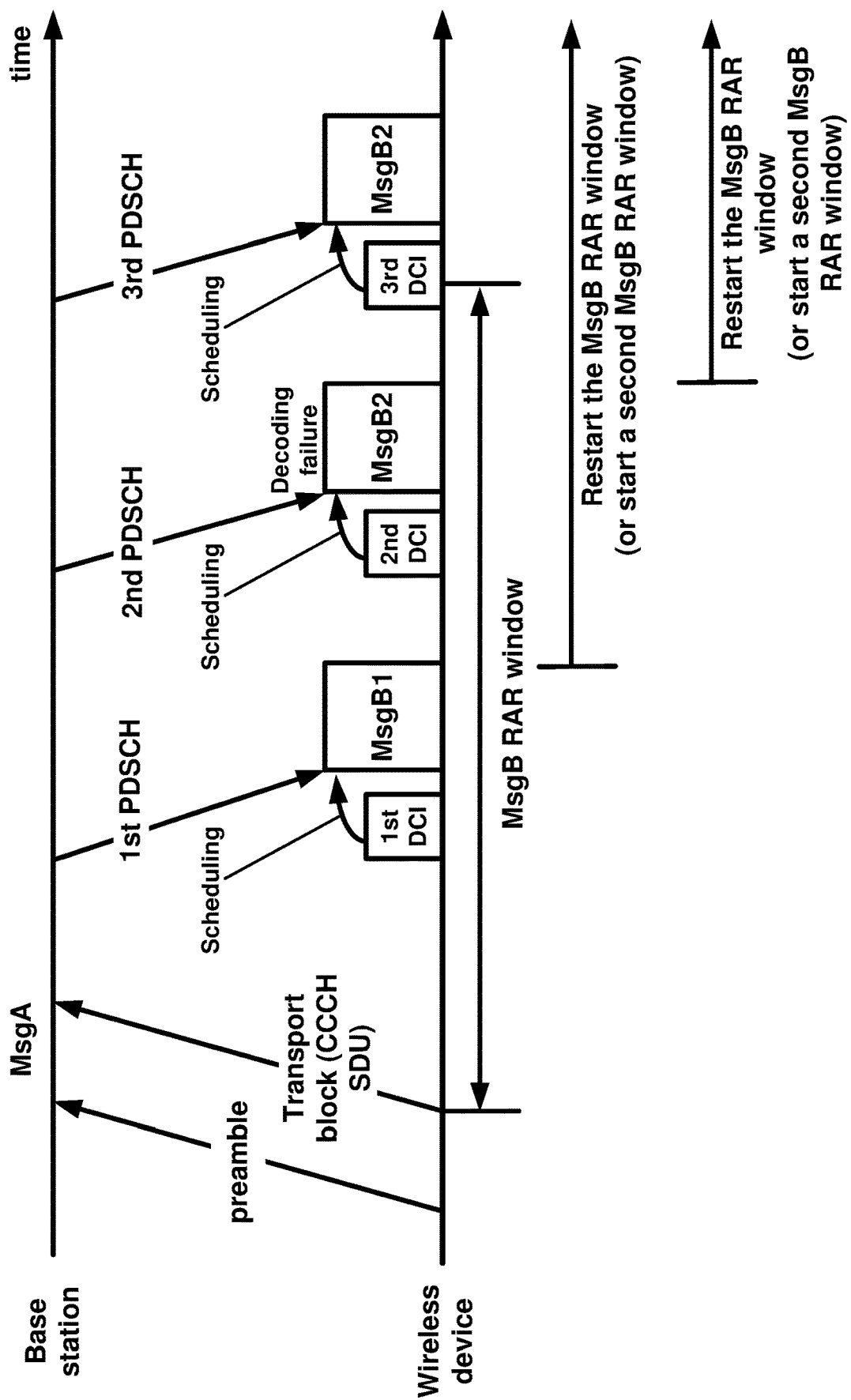
FIG. 32 is an example of two-step RA procedure as per an aspect of an example embodiment of the present disclosure.

FIG. 32 is an example of two-step RA procedure as per an aspect of an example embodiment of the present disclosure. In an example, the wireless device may (re)start the MsgB RAR window (or a second MsgB RAR window) in response to a determination of decoding failure of a PDSCH (e.g., any PDSCH comprising MsgB2). For example, the wireless device (re)start the MsgB RAR window (or a second MsgB RAR window) in response to a determination of decoding failure of the second PDSCH comprising MsgB2. The wireless device may start to (or continue to) monitor a downlink control channel for a next PDSCH (e.g., a third PDSCH) during the (re)started MsgB RAR window (or the (re)started second MsgB RAR window). For example, the wireless device may start to (or continue to) monitor a downlink control channel in response to failing to decode the second PDSCH. For example, the wireless device may transmit, via a second PUCCH a second NACK of reception failure of the second PDSCH. The resource allocation of the second PUCCH may be indicated by the second DCI scheduling the second PDSCH. For example, the second DCI indicates TPC command for the second PUCCH, PUCCH resource indicator, HARQ (e.g., NACK) feedback timing indicator for the second PDSCH. For example, the second DCI may comprise the second downlink assignment for the second PDSCH and the resource allocation of the second PUCCH for the second PDSCH. For example, the wireless device (re)start the MsgB RAR window (or the second MsgB RAR window) in response to transmitting the second NACK via the second PUCCH. The wireless device may start to (or continue to) monitor a downlink control channel in response to transmitting the second NACK via the second PUCCH. The wireless device may detect, via the downlink control channel, a third PDCCH comprising a third DCI during the (re)started MsgB RAR window (or the (re)started second MsgB RAR window). The third PDCCH may be addressed to a particular RNTI. For example, the particular RNTI is C-RNTI indicated by MsgB1. The third DCI may comprise a third downlink assignment scheduling a DL transmission of a third PDSCH comprising the MsgB2. The third DCI may further comprise a resource allocation of a third PUCCH. For example, the wireless device may transmit ACK or NACK via the third PUCCH if the wireless device decodes the third PDSCH successfully or fails to decode third PDSCH, respectively. The wireless device may repeat this process until the wireless device successfully decodes at least one PDSCH comprising the MsgB2. The wireless device may stop to repeat this process if a number of decoding failures of PDSCH comprising MsgB2 is greater than a first value (predefined or semi-configured by SIB or RRC message). For example, the wireless device may repeat this process if the number of decoding failures of PDSCH comprising MsgB2 is smaller than or equal to the first value (predefined or semi-configured by SIB or RRC message). For example, if the wireless device fails to decode the third PDSCH, the wireless device may device (re)start the (re)started MsgB RAR window (or the (re)started second MsgB RAR window) in response to a determination of decoding failure of the third PDSCH comprising MsgB2 or in response to transmitting, via a third PUCCH, a third NACK of reception failure of the third PDSCH. The wireless device may start to (or continue to) monitor the downlink control channel for a fourth PDSCH during the (re)started MsgB RAR window (or the (re)started second MsgB RAR window) and so on. A PDCCH scheduling a PDSCH comprising MsgB2 may be addressed to the C-RNTI. A transmission timing of a PUCCH (e.g., any PUCCH transmitted during the adjusted (or extended) window) comprising an ACK or NACK of reception indication of a PDSCH (e.g., any PDSCH comprising MsgB2) may be determined (or adjusted) based on a TA command in the MsgB1. The wireless device may determine to retransmit MsgA if a number of decoding failures of PDSCH comprising MsgB2 is greater than a first value (predefined or semi-configured by SIB or RRC message).

The wireless device may employ an HARQ to decode one or more PDSCHs (e.g., the first PDSCH, the second PDSCH, and/or the third PDSCH). For example, the first downlink assignment indicated by MsgB1 may indicate at least one of a redundant version (RV) of transport block of the second PDSCH. The wireless device may receive the third PDCCH scheduling the third PDSCH. The third PDCCH may indicate a third RV of transport block of the third PDSCH. The wireless device may combine the first transport block (or the first PDSCH) and the third transport block (or the third PDSCH) using a soft combining based on the first RV and the third RV. The RV pattern may be predefined or semi-statically configured by SIB or RRC message. A HARQ process number of this PDSCH combining may be predefined or semi-statically configured (via SIB or RRC). A HARQ process number of this PDSCH combining may be indicated by downlink assignments (e.g., a first downlink assignment in MsgB1 and/or a third downlink assignment in the third DCI). A new data indicator (NDI) may be employed for the wireless device to determine whether the wireless device flush the HARQ buffer of the HARQ process. For example, the wireless device combines one or more PDSCHs using the soft combining, e.g., if the HARQ process numbers corresponding to the one or more PDSCHs are the same and/or NDI has not been toggled. For example, an NDI indicated by N-th downlink assignment is toggled, the wireless device may flush the HARQ buffer corresponding to the HARQ process number predefined, semi-statically configured, or indicated by N-th downlink assignment (or DCI). For example, an NDI indicated by N-th downlink assignment (or DCI) is not toggled, the wireless device may attempt soft combining the received signal (e.g., transport block(s)) in the HARQ buffer with N-th PDSCH scheduled by the N-th downlink assignment.

In an example, a wireless device may transmit a message comprising a preamble and a transport block. The wireless device may receive a first response and a second response, wherein the first response comprises: a contention resolution identifier of the wireless device; and a wireless device identifier used for receiving the second response. The wireless device may determine a decoding failure of the second response. Based on a decoding failure of the second response, the wireless device may adjust a time interval to monitor for the second response. The wireless device may receive a retransmission of the second response during the adjusted time interval. The wireless device may transmit an uplink control signal in response to a decoding success of the retransmission of the second response. For example, the transport block comprises one of a radio resource connection setup request, a radio resource connection resume request, or a radio resource connection (re)establishment request. For example, the second response comprises one of a radio resource connection setup, a radio resource connection resume, or a radio resource connection (re)establishment. For example, the second message further comprises a second preamble.

In an example, a wireless device may transmit a first message comprising a first preamble and a first transport block. The wireless device may receive a first response and a second response, wherein the first response comprises: a contention resolution identifier of the wireless device; and a wireless device identifier used for receiving the second response. The wireless device may determine a decoding failure of the second response. Based on a decoding failure of the second response, the wireless device may adjust a time interval to monitor for the second response. The wireless device may determine that no retransmission of the second response has been received during the adjusted time interval. The wireless device may transmit a second message comprising a second transport block, wherein the second transport block comprises the wireless device identifier. For example, the transport block comprises one of a radio resource connection setup request, a radio resource connection resume request, or a radio resource connection (re) establishment request. For example, the second response comprises one of a radio resource connection setup, a radio resource connection resume, or a radio resource connection (re)establishment. For example, the second message further comprises a second preamble. For example, the second message further comprises a second preamble.

Examples of several of the various embodiments of the present disclosure are described herein with reference to the drawings. According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 33:
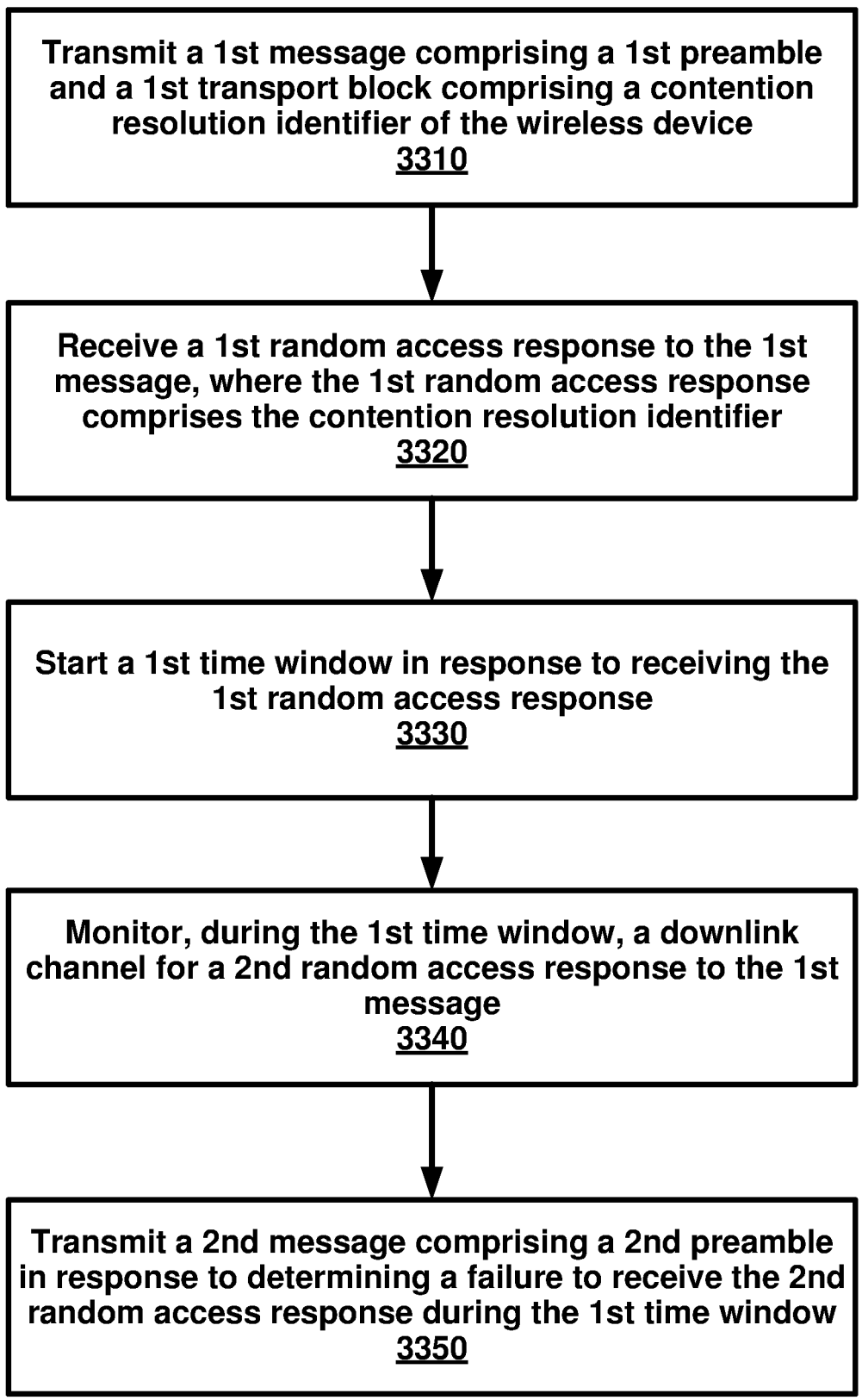
FIG. 33 is a flow diagram as per an aspect of an example embodiment of the present disclosure.

FIG. 33 is a flow diagram as per an aspect of an example embodiment of the present disclosure. At 3310, a wireless device may transmit a first message comprising a first preamble and a first transport block comprising a contention resolution identifier of the wireless device. At 3320, the wireless device may receive a first random access response to the first message, wherein the first random access response comprises the contention resolution identifier. At 3330, the wireless device may start a first time window in response to receiving the first random access response. At 3340, the wireless device may monitor, during the first time window, a downlink channel for a second random access response to the first message. At 3350, the wireless device may transmit a second message comprising a second preamble in response to determining a failure to receive the second random access response during the first time window.

According to an example embodiment, the wireless device may receive configuration parameters indicating a duration of a first time window. According to an example embodiment, the first transport block may comprise one of a radio resource connection setup request, a radio resource connection resume request, a radio resource connection establishment request, or a radio resource connection re-establishment request. According to an example embodiment, the second random access response may comprise one of a radio resource connection setup, a radio resource connection resume, a radio resource connection establishment, or a radio resource connection re-establishment. According to an example embodiment, the wireless device may start a second time window in response to transmitting the first message. According to an example embodiment, the wireless device may monitor, during the second time window, the downlink channel for the first random access response. According to an example embodiment, the wireless device may receive, based on a random access radio network identifier, first downlink control information indicating a first downlink assignment of the first random access response. According to an example embodiment, the first random access response may further comprise a cell radio network temporary identifier (C-RNTI) of the wireless device. According to an example embodiment, the wireless device may receive, during the first time window and based on the C-RNTI, second downlink control information indicating a second downlink assignment of the second random access response. According to an example embodiment, the second message may be transmitted as a retransmission of the first message. According to an example embodiment, the second message may further comprise a second transport block. According to an example embodiment, the wireless device may receive one or more downlink packets during the first time window. According to an example embodiment, the wireless device may determine decoding failure of the second random access response using the one or more downlink packets.

Figure 34:
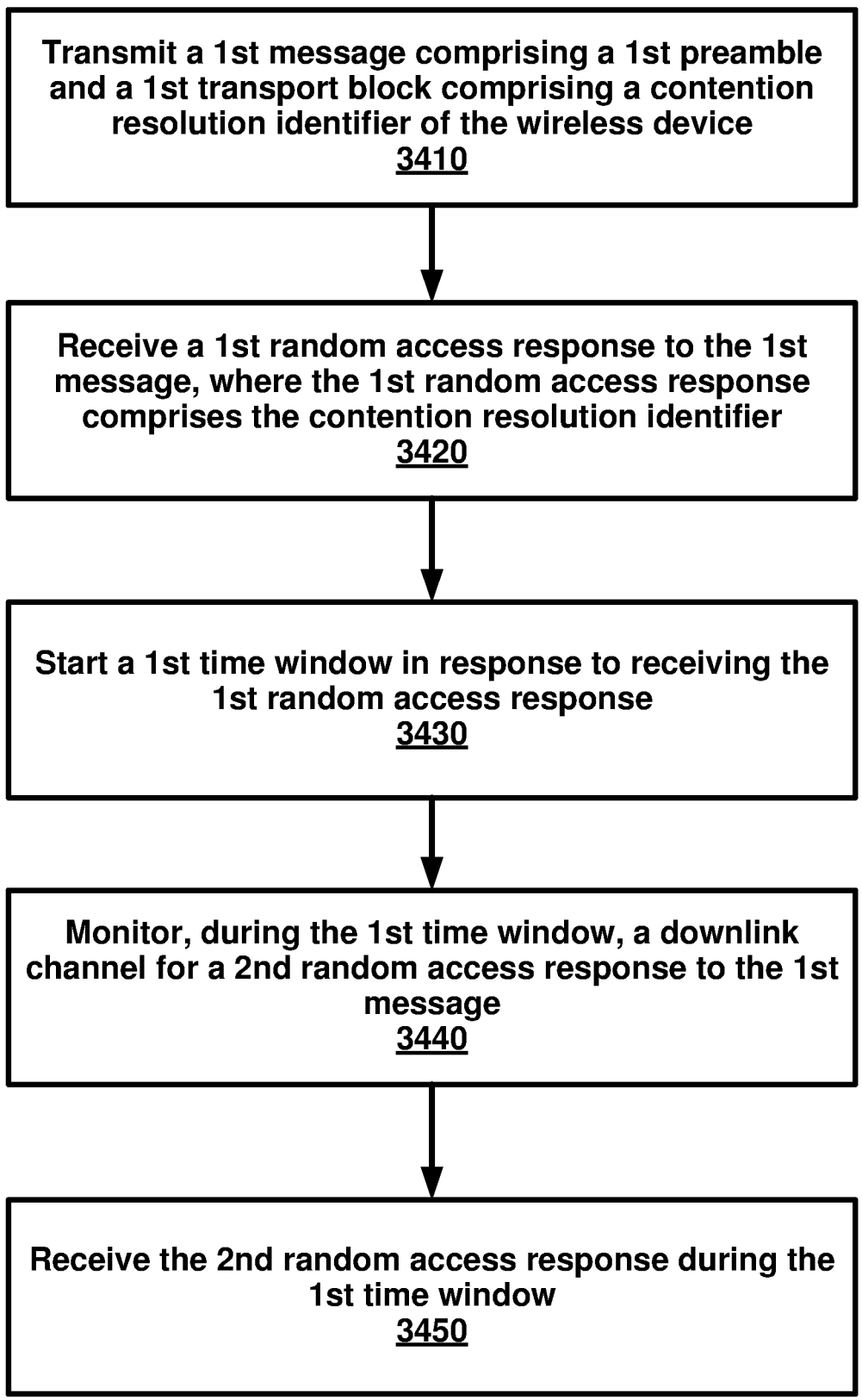
FIG. 34 is a flow diagram as per an aspect of an example embodiment of the present disclosure.

FIG. 34 is a flow diagram as per an aspect of an example embodiment of the present disclosure. At 3410, a wireless device may transmit a first message comprising a first preamble and a first transport block comprising a contention resolution identifier of the wireless device. At 3420, the wireless device may receive a first random access response to the first message. The first random access response may comprise the contention resolution identifier. At 3430, the wireless device may start a first time window in response to receiving the first random access response. At 3440, the wireless device may monitor, during the first time window, a downlink channel for a second random access response to the first message. At 3450, the wireless device may receive the second random access response during the first time window.

According to an example embodiment, the wireless device may receive configuration parameters indicating a duration of a first time window. According to an example embodiment, the first transport block may comprise one of a radio resource connection setup request, a radio resource connection resume request, or a radio resource connection (re-)establishment request. According to an example embodiment, the second random access response may comprise one of a radio resource connection setup, a radio resource connection resume, or a radio resource connection (re-)establishment. According to an example embodiment, the wireless device may start a second time window in response to transmitting the first message. According to an example embodiment, the wireless device may monitor, during the second time window, the downlink channel for the first random access response. According to an example embodiment, the wireless device may receive, based on a random access radio network identifier, first downlink control information indicating a first downlink assignment of the first random access response. According to an example embodiment, the first random access response may further comprise a cell radio network temporary identifier (C-RNTI) of the wireless device. According to an example embodiment, the wireless device may receive, during the first time window and based on the C-RNTI, second downlink control information indicating a second downlink assignment of the second random access response. According to an example embodiment, the wireless device may determine a success to decode the second random access response. According to an example embodiment, the wireless device may transmit an uplink control signal in response to the success. The uplink control signal transmitted in response to the success may indicate the success. According to an example embodiment, the wireless device may determine a failure to decode the second random access response. According to an example embodiment, the wireless device may transmit an uplink control signal in response to the failure. The uplink control signal transmitted in response to the failure may indicate the failure. According to an example embodiment, the wireless device may monitor the downlink channel for the second random access in response to transmitting the uplink control signal. According to an example embodiment, the wireless device may determine retransmission of the first message in response to an expiry of the first time window and the failure. According to an example embodiment, the wireless device may transmit, based on the determining the retransmission, a second message comprising a second preamble.

The invention claimed is:

1. A method, comprising:
   transmitting, by a wireless device, a first message comprising a first preamble and a first transport block comprising a contention resolution identifier of the wireless device;
   receiving a first random access response to the first message, wherein the first random access response comprises the contention resolution identifier;
   starting a first time window in response to receiving the first random access response;
   monitoring, during the first time window, a downlink channel for a second random access response to the first message; and
   receiving the second random access response during the first time window.

2. The method of claim 1, further comprising receiving configuration parameters indicating a duration of the first time window.

3. The method of claim 1, wherein the first transport block comprises one of following requests:
   a radio resource connection setup request;
   a radio resource connection resume request; or
   a radio resource connection re-establishment request.

4. The method of claim 1, wherein the second random access response comprises one of following instructions:
   a radio resource connection setup;
   a radio resource connection resume; or
   a radio resource connection re-establishment.

5. The method of claim 1, further comprising:
   starting a second time window in response to transmitting the first message;
   monitoring, during the second time window, the downlink channel for the first random access response; and
   receiving, based on a random access radio network identifier, first downlink control information indicating a first downlink assignment of the first random access response.

6. The method of claim 1, wherein the first random access response further comprises a cell radio network temporary identifier (C-RNTI) of the wireless device.

7. The method of claim 6, further comprising receiving, during the first time window and based on the C-RNTI, second downlink control information indicating a second downlink assignment of the second random access response.

8. The method of claim 1, further comprising:
   determining a success or a failure to decode the second random access response; and
   transmitting an uplink control signal in response to the success or the failure, wherein the uplink control signal is indicative of the success or the failure.

9. The method of claim 8, further comprising:
   monitoring the downlink channel for the second random access in response to transmitting the uplink control signal.

10. The method of claim 8, further comprising:
    determining retransmission of the first message in response to an expiry of the first time window and the failure; and
    transmitting, based on the determining the retransmission, a second message comprising a second preamble.

11. A wireless device, comprising:
    one or more processors; and
    memory storing instructions that, when executed by the one or more processors, cause the wireless device to:

transmit a first message comprising a first preamble and a first transport block comprising a contention resolution identifier of the wireless device;

receive a first random access response to the first message, wherein the first random access response comprises the contention resolution identifier;

start a first time window in response to receiving the first random access response;

monitor, during the first time window, a downlink channel for a second random access response to the first message; and receive the second random access response during the first time window.

12. The wireless device of claim 11, wherein the instructions, when executed by the one or more processors, further cause the wireless device to receive configuration parameters indicating a duration of the first time window.

13. The wireless device of claim 11, wherein the first transport block comprises one of following requests:
   a radio resource connection setup request;
   a radio resource connection resume request; or
   a radio resource connection re-establishment request.

14. The wireless device of claim 11, wherein the second random access response comprises one of following instructions:
   a radio resource connection setup;
   a radio resource connection resume; or
   a radio resource connection re-establishment.

15. The wireless device of claim 11, wherein the instructions, when executed by the one or more processors, further cause the wireless device to:
   start a second time window in response to transmitting the first message;
   monitor, during the second time window, the downlink channel for the first random access response; and
   receive, based on a random access radio network identifier, first downlink control information indicating a first downlink assignment of the first random access response.

16. The wireless device of claim 11, wherein the first random access response further comprises a cell radio network temporary identifier (C-RNTI) of the wireless device.

17. The wireless device of claim 16, wherein the instructions, when executed by the one or more processors, further cause the wireless device to receive, during the first time window and based on the C-RNTI, second downlink control information indicating a second downlink assignment of the second random access response.

18. The wireless device of claim 11, wherein the instructions, when executed by the one or more processors, further cause the wireless device to:
   determine a success or a failure to decode the second random access response; and
   transmit an uplink control signal in response to the success or the failure, wherein the uplink control signal is indicative of the success or the failure.

19. The wireless device of claim 18, wherein the instructions, when executed by the one or more processors, further cause the wireless device to:
   determine retransmission of the first message in response to an expiry of the first time window and the failure; and
   transmit, based on the determining the retransmission, a second message comprising a second preamble.

20. A system, comprising:
a base station; and
a wireless device comprising:
one or more processors; and
memory storing instructions that, when executed by the one or more processors, cause the wireless device to:
transmit, to the base station, a first message comprising a first preamble and a first transport block comprising a contention resolution identifier of the wireless device;
receive a first random access response to the first message, wherein the first random access response comprises the contention resolution identifier;
start a first time window in response to receiving the first random access response;
monitor, during the first time window, a downlink channel for a second random access response to the first message; and
receive the second random access response during the first time window.

* * * * *